(12) United States Patent
Wetekamp et al.

(10) Patent No.: US 7,591,141 B2
(45) Date of Patent: Sep. 22, 2009

(54) ELECTRONIC CONTROL SYSTEM FOR INSULATED ICE COMPARTMENT FOR BOTTOM MOUNT REFRIGERATOR

(75) Inventors: Robert L. Wetekamp, Cedar Rapids, IA (US); Kyle B. Van Meter, Coralville, IA (US); Alan G. Tarrant, Newton, IA (US); Ryan D. Schuchart, Cedar Rapids, IA (US); Mauro M. Oliveira, Cedar Rapids, IA (US); Alvin V. Miller, Swisher, IA (US); Brent A. Koppenhaver, Newton, IA (US); Carl J. Franken, Newton, IA (US); Nelson J. Ferragut, II, Williamsburg, IA (US); Tim L. Coulter, Cedar Rapids, IA (US); Greg Berardi, Newton, IA (US); Thomas Carl Anell, Knoxville, IL (US)

(73) Assignee: Maytag Corporation, Benton Harbor, MI (US)

( * ) Notice: Subject to any disclaimer, the term of this patent is extended or adjusted under 35 U.S.C. 154(b) by 601 days.

(21) Appl. No.: 11/331,941

(22) Filed: Jan. 13, 2006

(65) Prior Publication Data
US 2006/0260333 A1 Nov. 23, 2006

Related U.S. Application Data

(63) Continuation-in-part of application No. 11/139,237, filed on May 27, 2005, now Pat. No. 7,337,620, and a continuation-in-part of application No. 11/131,701, filed on May 18, 2005, now Pat. No. 7,284,390.

(51) Int. Cl.
*F25D 17/08* (2006.01)
(52) U.S. Cl. ............... 62/187; 62/208; 62/340; 62/441

(58) Field of Classification Search ............... 62/187, 62/135, 208–209, 340–356, 440–441
See application file for complete search history.

(56) References Cited

U.S. PATENT DOCUMENTS 2,139,441 A 12/1938 Clarke (Continued)

FOREIGN PATENT DOCUMENTS

EP 657706 A1 6/1995

(Continued)

OTHER PUBLICATIONS

Adamski, Joseph R., U.S. Appl. No. 11/236,126, filed Sep. 27, 2005, Apparatus and Method for Dispensing Ice From a Bottom Mount Refrigerator.

(Continued)

*Primary Examiner*—William E Tapolcai
(74) *Attorney, Agent, or Firm*—Kirk W. Goodwin; McKee, Woorhees & Sease PLC

(57) ABSTRACT

A refrigerator includes a refrigerator cabinet, a fresh food compartment disposed within the cabinet, a freezer compartment disposed within the cabinet, an ice compartment disposed within the cabinet, and an electronic control system associated with the refrigerator and adapted to monitor and control the fresh food compartment, the freezer compartment and the ice compartment. The control system provides for energy efficient control and operation through various means, including by monitoring state of an ice maker associated with the ice compartment and controlling temperature within compartments of the refrigerator based on the ice maker state. The control system can also use correlations in determining appropriate temperatures for different compartments within the refrigerator.

28 Claims, 48 Drawing Sheets

U.S. PATENT DOCUMENTS

| | | | |
|---|---|---|---|
| 2,223,947 A | 12/1940 | Blood et al. | |
| 2,256,551 A | 9/1941 | Colvin | |
| 2,400,634 A | 5/1946 | Earle | |
| 2,410,334 A | 10/1946 | Brace | |
| 2,493,488 A | 1/1950 | Jordan et al. | |
| 2,544,394 A | 3/1951 | Muffly | |
| 2,605,621 A | 8/1952 | Kellershon | |
| 2,692,809 A * | 10/1954 | Kesling | 312/405 |
| 2,717,505 A | 9/1955 | Andersson | |
| 2,765,633 A | 10/1956 | Muffly | |
| 2,774,224 A | 12/1956 | Bayston | |
| 2,779,165 A | 1/1957 | Pichler | |
| 2,795,117 A | 6/1957 | Herndon, Jr. et al. | |
| 2,907,180 A | 10/1959 | Mann | |
| 3,046,754 A | 7/1962 | Kniffin | |
| 3,100,970 A | 8/1963 | Elfving | |
| 3,126,714 A | 3/1964 | Zuercher, Jr. | |
| 3,146,601 A | 9/1964 | Gould | |
| 3,146,606 A | 9/1964 | Grimes et al. | |
| 3,182,464 A | 5/1965 | Archer | |
| 3,192,726 A | 7/1965 | Newton | |
| 3,225,559 A | 12/1965 | Fischer | |
| 3,226,939 A | 1/1966 | Harbison | |
| 3,270,519 A | 9/1966 | Pohl, Jr. | |
| 3,308,631 A | 3/1967 | Kniffin | |
| 3,382,682 A | 5/1968 | Frohbieter | |
| 3,440,308 A | 4/1969 | Carbary et al. | |
| 3,541,806 A | 11/1970 | Jacobs | |
| 3,581,516 A | 6/1971 | Buchser | |
| 3,602,007 A | 8/1971 | Drieci | |
| 3,633,374 A | 1/1972 | Canter | |
| 3,654,772 A | 4/1972 | Curry, III | |
| 3,745,779 A | 7/1973 | Bright | |
| 3,747,363 A | 7/1973 | Grimm | |
| 3,775,994 A | 12/1973 | Linstromberg | |
| 3,788,089 A | 1/1974 | Graves | |
| 3,789,620 A | 2/1974 | Benasutti | |
| 3,821,881 A | 7/1974 | Harkias | |
| 3,834,177 A | 9/1974 | Scarlett | |
| 3,850,008 A | 11/1974 | Frazier | |
| 3,866,434 A | 2/1975 | Pugh | |
| 3,889,888 A | 6/1975 | Prada | |
| 4,003,214 A | 1/1977 | Schumacher | |
| 4,007,600 A | 2/1977 | Simms | |
| 4,020,644 A | 5/1977 | True, Jr. | |
| 4,100,761 A | 7/1978 | Linstromberg | |
| 4,118,451 A | 10/1978 | Schaus | |
| 4,142,373 A | 3/1979 | Weibel | |
| 4,142,377 A | 3/1979 | Fogt | |
| 4,142,378 A | 3/1979 | Bright | |
| 4,227,383 A | 10/1980 | Horvay | |
| 4,250,923 A | 2/1981 | Johnson | |
| 4,280,682 A | 7/1981 | Zukausky | |
| 4,285,212 A | 8/1981 | Prada | |
| 4,306,757 A | 12/1981 | Horvay | |
| 4,332,146 A | 6/1982 | Yamazaki | |
| 4,487,024 A | 12/1984 | Fletcher et al. | |
| 4,548,049 A * | 10/1985 | Rajgopal | 62/275 |
| 4,587,810 A | 5/1986 | Fletcher | |
| 4,614,088 A | 9/1986 | Brooks | |
| 4,644,753 A | 2/1987 | Burke | |
| 4,727,720 A | 3/1988 | Wernicki | |
| 4,754,615 A | 7/1988 | Linstromberg | |
| 4,756,165 A | 7/1988 | Chestnut et al. | |
| 4,799,362 A | 1/1989 | Chestnut | |
| 4,831,840 A | 5/1989 | Fletcher | |
| 4,872,317 A * | 10/1989 | Reed | 62/135 |
| 4,889,316 A | 12/1989 | Donahue, Jr. | |
| 4,916,921 A | 4/1990 | Fletcher | |
| 4,922,725 A | 5/1990 | Rasmussen | |
| 4,961,320 A | 10/1990 | Gutmann | |
| 5,010,738 A | 4/1991 | Brown | |
| 5,033,636 A | 7/1991 | Jenkins | |
| 5,090,208 A | 2/1992 | Aono et al. | |
| RE34,174 E | 2/1993 | Brown | |
| 5,198,244 A | 3/1993 | Rice | |
| 5,211,462 A | 5/1993 | Bien | |
| 5,219,225 A | 6/1993 | Ball | |
| 5,261,248 A | 11/1993 | Willis | |
| 5,272,888 A | 12/1993 | Fisher | |
| 5,273,219 A | 12/1993 | Beach | |
| 5,310,090 A | 5/1994 | Taylor | |
| 5,327,856 A | 7/1994 | Schroeder | |
| 5,357,769 A | 10/1994 | Crabtree et al. | |
| 5,375,413 A * | 12/1994 | Fredell et al. | 62/187 |
| 5,375,432 A | 12/1994 | Cur | |
| 5,596,182 A | 1/1997 | Edwards | |
| 5,642,628 A | 7/1997 | Whipple, III et al. | |
| 5,711,159 A | 1/1998 | Whipple, III | |
| 5,758,512 A | 6/1998 | Peterson et al. | |
| 5,787,723 A | 8/1998 | Mueller et al. | |
| 5,810,331 A | 9/1998 | Smock | |
| 5,823,001 A | 10/1998 | Patrick | |
| 5,829,263 A | 11/1998 | Park | |
| 5,834,126 A | 11/1998 | Sheu | |
| 5,846,446 A | 12/1998 | Jackson | |
| 5,849,227 A | 12/1998 | Chikugo et al. | |
| 5,899,083 A | 5/1999 | Peterson et al. | |
| 6,019,447 A | 2/2000 | Jackovin | |
| 6,050,097 A | 4/2000 | Nelson | |
| 6,053,472 A | 4/2000 | DeLand | |
| 6,055,826 A | 5/2000 | Hiraoka et al. | |
| 6,062,826 A | 5/2000 | Morimoto | |
| 6,082,130 A | 7/2000 | Pastryk | |
| 6,090,281 A | 7/2000 | Buckner | |
| 6,091,062 A | 7/2000 | Pfahnl et al. | |
| 6,148,624 A | 11/2000 | Bishop | |
| 6,286,324 B1 | 9/2001 | Pastryk | |
| 6,312,608 B1 | 11/2001 | Buckner | |
| 6,314,745 B1 | 11/2001 | Janke | |
| 6,351,955 B1 | 3/2002 | Oltman et al. | |
| 6,351,958 B1 | 3/2002 | Pastryk | |
| 6,351,967 B1 | 3/2002 | Adachi | |
| 6,401,461 B1 | 6/2002 | Harrison et al. | |
| 6,412,286 B1 | 7/2002 | Park et al. | |
| 6,422,031 B1 | 7/2002 | Mandel et al. | |
| 6,425,425 B2 | 7/2002 | Bianchi et al. | |
| 6,438,988 B1 | 8/2002 | Paskey | |
| 6,464,854 B2 | 10/2002 | Andrews et al. | |
| 6,474,094 B2 | 11/2002 | Kim | |
| 6,604,377 B2 | 8/2003 | Watanabe et al. | |
| 6,612,116 B2 | 9/2003 | Fu et al. | |
| 6,694,754 B1 | 2/2004 | Schenk | |
| 6,708,726 B2 | 3/2004 | Hashimoto | |
| 6,725,680 B1 * | 4/2004 | Schenk et al. | 62/186 |
| 6,732,537 B1 | 5/2004 | Anell et al. | |
| 6,735,959 B1 | 5/2004 | Najewicz | |
| 6,755,166 B2 | 6/2004 | Chang | |
| 6,820,433 B2 | 11/2004 | Hwang | |
| 6,845,631 B1 | 1/2005 | Hallin et al. | |
| 6,880,355 B2 | 4/2005 | Jung | |
| 6,964,177 B2 | 11/2005 | Lee et al. | |
| 7,065,975 B1 | 6/2006 | Herndon et al. | |
| 7,076,967 B2 | 7/2006 | Lee et al. | |
| 2002/0121096 A1 | 9/2002 | Harrison et al. | |
| 2002/0124576 A1 | 9/2002 | Loibl et al. | |
| 2003/0010056 A1 | 1/2003 | Sakamoto et al. | |
| 2003/0046947 A1 | 3/2003 | Ohya et al. | |
| 2004/0148957 A1 | 8/2004 | Pohl | |
| 2004/0237565 A1 | 12/2004 | Lee et al. | |
| 2005/0061016 A1 | 3/2005 | Lee et al. | |
| 2006/0090496 A1 | 5/2006 | Adamski et al. | |

FOREIGN PATENT DOCUMENTS

| | | |
|---|---|---|
| EP | 1 445 558 | 11/2003 |
| EP | 1 482 263 A2 | 1/2004 |
| EP | 482 263 | 1/2004 |
| EP | 1 517 103 A2 | 3/2005 |
| EP | 1 519 131 A1 | 3/2005 |
| GB | 2 167 544 | 10/1985 |
| GB | 2 242 731 A | 10/1991 |
| JP | 500 69644 | 6/1975 |
| JP | 0356113417 A | 9/1981 |
| JP | 2002228316 | 8/2002 |
| WO | WO 03/102481 A1 | 12/2003 |
| WO | WO 2004/085937 A1 | 10/2004 |

OTHER PUBLICATIONS

Anderson, Ronald K., U.S. Appl. No. 11/140,100, filed May 27, 2005, Refrigerator With Improved Icemaker.

Brain, Marshall "How Refrigerators Work" http://home.howstuffworks.com/refrigerator.htm/printable 6 pages, Feb. 4, 2005.

Coulter, Tim, U.S. Appl. No. 11/139,237, filed May 27, 2005, Insulated Ice Compartment for Bottom Mount Refrigerator.

* cited by examiner

ELECTRONIC CONTROL SYSTEM FOR INSULATED ICE COMPARTMENT FOR BOTTOM MOUNT REFRIGERATOR

CROSS-REFERENCE TO RELATED APPLICATIONS

This application is a continuation-in-part application of U.S. application Ser. No. 11/139,237, filed May 27, 2005, entitled INSULATED ICE COMPARTMENT FOR BOTTOM MOUNT REFRIGERATOR, herein incorporated by reference in its entirety.

This application does not claim priority, but hereby incorporates by reference in their entirety, provisional application Ser. No. 60/613,241 filed Sep. 27, 2004, entitled APPARATUS AND METHOD FOR DISPENSING ICE FROM A BOTTOM MOUNT REFRIGERATOR, and U.S. application Ser. No. 11/131,701, filed May 18, 2005, entitled REFRIGERATOR WITH INTERMEDIATE TEMPERATURE ICEMAKING COMPARTMENT.

BACKGROUND OF THE INVENTION

Household refrigerators generally come in three structural styles: (1) a side-by-side model wherein the freezer and refrigerator compartments are side by side; (2) a top mount model wherein the freezer compartment is located above the refrigerator compartment; and (3) a bottom mount model wherein the freezer compartment is mounted below the refrigerator compartment. An icemaker is normally provided in the freezer compartment of all three models. A door mounted ice dispenser is often provided in a side-by-side refrigerator and in a top mount refrigerator so that a person can add ice to a glass without opening the freezer or refrigerator door. However, a door mounted ice dispenser normally is not been provided in bottom mount refrigerators, since the freezer door is too low, and there are difficulties in transporting ice from the freezer compartment to the refrigerator compartment which precludes a dispenser in the refrigerator compartment door. However, it is desirable to have an ice dispenser in the refrigerator compartment of a bottom mount refrigerator.

Providing an icemaking compartment within the fresh food compartment of a refrigerator presents numerous issues, both structural and functional. For example, the fresh food compartment is normally about 40° F., while an ice compartment needs to be less than 32° F. in order to make ice effectively and efficiently and is typically at, or about 0° F. Maintaining and controlling the temperature within the icemaking compartment requires insulation, seals, appropriate airflow, and a control system. Placing the icemaking compartment within the fresh food compartment of the refrigerator also requires consideration of electrical connections of the icemaker and the supply of water to the icemaker. The method of manufacturing of such an icemaking compartment within the fresh food compartment of a refrigerator also raises novel and unique considerations which are not factors for an icemaking compartment mounted in a freezer.

U.S. Pat. No. 6,735,959 issued to Najewicz discloses a thermoelectric icemaker placed within the fresh food compartment of a bottom mount refrigerator that may be dispensed through the fresh food door. Najewicz forms ice within the fresh food compartment using the thermoelectric icemaker even though the compartment is above a freezing temperature. Although Najewicz provides for a duct that runs from the freezer compartment to the thermoelectric icemaker, the cold air from the duct is used to remove heat from the thermoelectric icemaker. Najewicz has many problems that must be overcome in order to be practical including the removal of unfrozen water, rapid ice body formation, prolonged ice storage, etc. The present invention overcomes these problems.

BRIEF SUMMARY OF THE INVENTION

Therefore it is a primary object, feature, or advantage of the present invention to improve over the state of the art.

A further object, feature, or advantage of the present invention is the provision of an improved refrigerator having an icemaking compartment within the fresh food compartment.

Another object, feature, or advantage of the present invention is the provision of a refrigerator having a separate icemaking compartment maintained at a temperature between 0° and 32° F.

A further object, feature, or advantage of the present invention is the provision of a refrigerator having an insulated icemaking compartment remote from the freezer compartment.

Still another object, feature, or advantage of the present invention is the provision of a bottom mount refrigerator having an icemaking compartment integrally formed in the liner of the fresh food compartment.

Yet another object, feature, or advantage of the present invention is the provision of a bottom mount refrigerator having a modular icemaking compartment mounted in the fresh food compartment.

A further object, feature, or advantage of the present invention is the provision of a bottom mount refrigerator having an icemaking compartment in the fresh food compartment, and having an insulated and sealed front cover on the icemaking compartment which can be opened to provide access into the compartment.

Another object, feature, or advantage of the present invention is the provision of an icemaking compartment in the fresh food compartment of a bottom mount refrigerator with a single electrical connection within the icemaking compartment for the wire harness of the icemaker.

Another object, feature, or advantage of the present invention is the provision of an icemaking compartment in the fresh food compartment of a bottom mount refrigerator wherein the water fill tube for supplying water to the icemaker extends downwardly through a vertically disposed hole in the top wall of the refrigerator.

Still another object, feature, or advantage of the present invention is the provision of an icemaking compartment within the fresh food compartment of a bottom mount refrigerator wherein the water fill tube for the icemaker is exposed to ambient air to prevent freezing of water within the fill tube.

Yet another object, feature, or advantage of the present invention is the provision of a bottom mount refrigerator having a recessed cavity in the fresh food compartment in which a water tank is mounted.

A further object, feature, or advantage of the present invention is the provision of an icemaking compartment which is formed separately from and mounted into a fresh food compartment of a bottom mount refrigerator.

Another object, feature, or advantage of the present invention is the provision of a method of making a bottom mount refrigerator having an integral ice compartment formed in the liner of the fresh food compartment.

Still another object, feature, or advantage of the present invention is the provision of a control system for an ice compartment within the fresh food compartment of a refrigerator for controlling icemaking and dispensing.

Still another object, feature, or advantage of the present invention is the provision of a refrigerator having a fresh food compartment with an icemaking compartment therein, and an ice dispenser in the door of the fresh food compartment.

Another object, feature, or advantage of the present invention is the provision of a bottom mount refrigerator having an ice dispenser in the door of the refrigerator, also known as the fresh food, compartment.

Another object, feature, or advantage of the present invention is the provision of an icemaker in the refrigerator compartment of a bottom mount refrigerator, with a cold air duct to provide air from the freezer compartment to the icemaker.

Still another object, feature, or advantage of the present invention is the provision of an icemaker in the refrigerator compartment of a bottom mount refrigerator having efficient and timely icemaking capacity.

It is a further object, feature, or advantage of the present invention to provide a bottom mount refrigerator that dispenses ice and water through the door.

It is a still further object, feature, or advantage of the present invention to provide a refrigerator that is energy efficient.

Another object, feature, or advantage of the present invention is to provide a refrigerator that enhances safety.

Yet another object, feature, or advantage of the present invention is to provide a refrigerator that provides convenience to users.

A further object, feature, or advantage of the present invention is to provide a refrigerator that is aesthetically pleasing to users.

A still further object, feature, or advantage of the present invention is to provide a refrigerator with a control system design that minimizes the complexity and the number of components necessary.

Another object, feature, or advantage of the present invention is to provide a refrigerator with a drive for the ice box/fresh food compartment damper which provides feedback.

Yet another object, feature, or advantage of the present invention is to provide a refrigerator with compartment light cutout.

A further object, feature, or advantage of the present invention is to provide a refrigerator which disables the icemaker and dispenser when the fresh food compartment door opens.

A still further object, feature, or advantage of the present invention is to provide a refrigerator with a menu-driven interface.

Another object, feature, or advantage of the present invention is to provide a refrigerator with a variable speed fan.

One or more of these and/or other objects, features, or advantages of the present invention will become from the specification and claims that follow.

The bottom mount refrigerator of the present invention has an icemaker within an insulated icemaking compartment in the fresh food or refrigerator compartment. Cold air is supplied to the icemaking compartment from the freezer compartment via a cold air duct. A return air duct extends from the icemaking compartment to the freezer compartment. The icemaking compartment also includes a vent opening for venting air to the refrigerator compartment. A fan draws or forces air through the duct from the freezer compartment to the icemaking compartment. The temperature in the ice making compartment is between 0° F. to 32° F., which is colder than the temperature of the refrigerator compartment, but not as cold as the freezer compartment. The icemaking compartment is preferably located in an upper corner of the refrigerator compartment. The door of the refrigerator compartment includes an ice dispenser to supply ice to a person without opening the refrigerator compartment door. The door may include an ice bin for storing ice from the icemaker.

In the improved refrigerator of the present invention, the icemaking compartment is insulated. Preferably, the icemaking compartment is formed integrally with the liner of the fresh food compartment. Alternatively, the icemaking compartment is formed separately from and mounted in the fresh food compartment. The icemaking compartment includes inner and outer shells, with insulation therebetween, as well as an insulated front cover which provides an air-tight seal with the icemaking compartment when closed, and which can be opened to provide access to the icemaker and ice bin within the icemaking compartment. The water fill tube for the icemaking compartment extends through a vertically disposed hole in the top wall of the refrigerator, and is exposed to ambient air to prevent freezing of water within the tube. The refrigerator includes a recessed cavity in the back wall in which a water tank is mounted.

In the method of manufacturing the icemaking compartment of the present invention, the ice compartment is preferably formed in the liner of the fresh food compartment during the molding processing using oppositely disposed forces. A three-dimensional plug forms the icemaking compartment from a rear side of the fresh food compartment liner. A front wall of the icemaking compartment is then cutout, so that an ice box can be inserted through the cutout into the icemaking compartment.

A control system is provided for the refrigerator for controlling the making and dispensing of ice in the icemaking compartment within the fresh food compartment of the bottom mount refrigerator.

In one aspect of the invention, a refrigerator includes a refrigerator cabinet, a fresh food compartment disposed within the cabinet, a freezer compartment disposed within the cabinet, an ice compartment disposed within the cabinet, and an electronic control system associated with the refrigerator and adapted to monitor and control the fresh food compartment, the freezer compartment and the ice compartment. Preferably, the ice compartment is positioned remote from the freezer compartment. Preferably also, two side-by-side fresh food compartment doors provide access to the fresh food compartment. A freezer compartment door for providing access to the freezer compartment is preferably positioned below the two side-by-side fresh food compartment doors. A dispenser is associated with one of the two side-by-side fresh food compartment doors, the dispenser is adapted for dispensing ice from the ice compartment as well as water. The control system is adapted to disable the dispenser upon opening of the fresh food compartment door associated with the dispenser.

According to another aspect of the present invention, the refrigerator includes an ice compartment temperature sensor associated with the ice compartment and electrically connected to the electronic control system, a fresh food compartment temperature sensor associated with the fresh food compartment and electrically connected to the electronic control system, a freezer compartment temperature sensor associated with the freezer compartment and electrically connected to the electronic control system, and an ambient temperature sensor electrically connected to the electronic control system. The control system is preferably adapted for performing the step of calculating a desired performance temperature for each of the fresh food compartment, the freezer compartment, and the ice compartment using correlations. The control system may be adapted for performing the step of calculating a desired performance temperature for each of the fresh food compartment, the freezer compartment, and the ice compartment using correlations and weighting at least partially based on prior testing to thereby improve temperature stability and food preservation.

According to another aspect of the invention, the refrigerator may include a variable speed evaporator fan, and a variable speed evaporator fan output from the control system. The control system is adapted for setting the variable speed evaporator fan to a plurality of rates. The control system is adapted to set the variable speed evaporator fan at a first rate when the freezer is determined to require cooling and a second rate when the freezer is determined not to require cooling and the fresh food compartment is determined to require cooling, the second rate being lower than the first rate. The control system may also be adapted to set the variable speed evaporator fan at a first rate when the freezer is determined to require cooling and a second rate when the freezer is determined not to require cooling and the ice compartment is determined to require cooling, the second rate being lower than the first rate.

According to another aspect of the invention, there is a direct current (DC) mullion heater electrically connected to the control system for selectively providing heat to increase overall energy efficiency of the refrigerator.

According to another aspect of the invention, there is a cavity heater associated with a door of the refrigerator, the cavity heater electrically connected to the control system for selectively providing heat to increase overall energy efficiency of the refrigerator.

According to another aspect of the invention, there is a fresh food compartment light associated with the fresh food compartment to turn the fresh food compartment light off after a set time period during which the fresh food compartment door is open.

According to another aspect of the invention, there is a freezer compartment light associated with the freezer compartment to turn the freezer compartment light off after a set time period during which the freezer compartment door is open.

According to another aspect of the invention, the control system is adapted to disable the ice maker and a dispenser on the fresh food compartment door when the fresh food compartment door opens.

According to another aspect of the invention, the control system is adapted for performing the step of calculating a desired performance temperature for each of the fresh food compartment, the freezer compartment, and the ice compartment using correlations. The correlation is arrived at by prior testing in a plurality of environments and usage conditions.

According to another aspect of the invention there is a damper for controlling air flow and the electronic control system is adapted for monitoring damper state and if the damper state indicates the damper is not properly operating, a motor output associated with the damper is pulsed to heat and thereby free the damper. The step of monitoring can include monitoring lengths and sequence of a switch state associated with the damper and determining if the sequence is outside of a tolerance level and waiting for the sequence to be within the tolerance level before determining the damper state.

According to another aspect of the present invention a refrigerator is provided which includes a refrigerator cabinet, at least one compartment disposed within the refrigerator cabinet, a cooling system within the refrigerator cabinet, and an electronic control system associated with the refrigerator and adapted to monitor and control temperature within the at least one compartment, the electronic control system adapted to cycle on and off the cooling system based on a cut-in temperature and a cut-out temperature associated with at least one of the at least one compartment, the electronic control system further adapted to adjust the cut-in temperature and the cut-out temperature during operation of the refrigerator to thereby improve temperature performance and energy efficiency of the refrigerator.

According to another aspect of the present invention, a refrigerator is provided. The refrigerator includes a refrigerator cabinet, at least two compartments disposed within the refrigerator cabinet, each of the at least two compartments having a temperature sensor for sensing temperature, and an electronic control system associated with the refrigerator, operatively connected to each of the at least two temperature sensors for monitoring temperature within the at least two compartments, the electronic control system further adapted to synchronize cooling of the at least two compartments to thereby provide consistent power consumption patterns.

According to another aspect of the present invention a refrigerator is provided. The refrigerator includes a refrigerator cabinet, a compartment disposed within the refrigerator cabinet, a temperature sensor associated with the compartment, and an electronic control system operatively connected to the temperature sensor and adapted for calculating a desired performance temperature for the compartment using temperature data from the temperature sensor and temperature data based on prior testing from locations within the compartment different from a position of the temperature sensor within the compartment to thereby improve temperature stability and food preservation of the refrigerator without use of additional temperature sensors within the compartment. The step of calculating can include using correlation and weighting.

DETAILED DESCRIPTION OF THE PREFERRED EMBODIMENT

Figure 1:
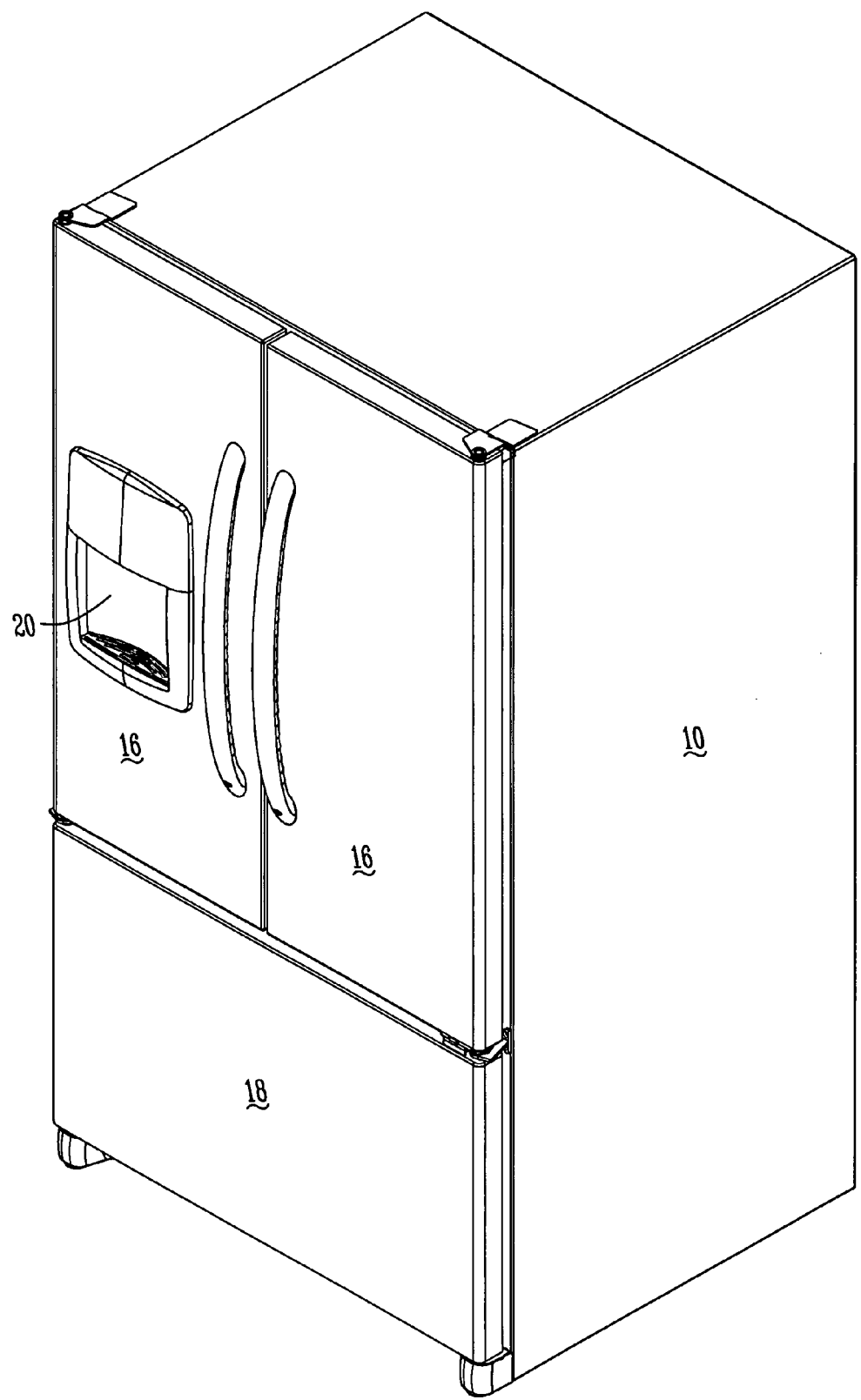
FIG. 1 is a perspective view of a bottom mount refrigerator according to the present invention.
Figure 2:
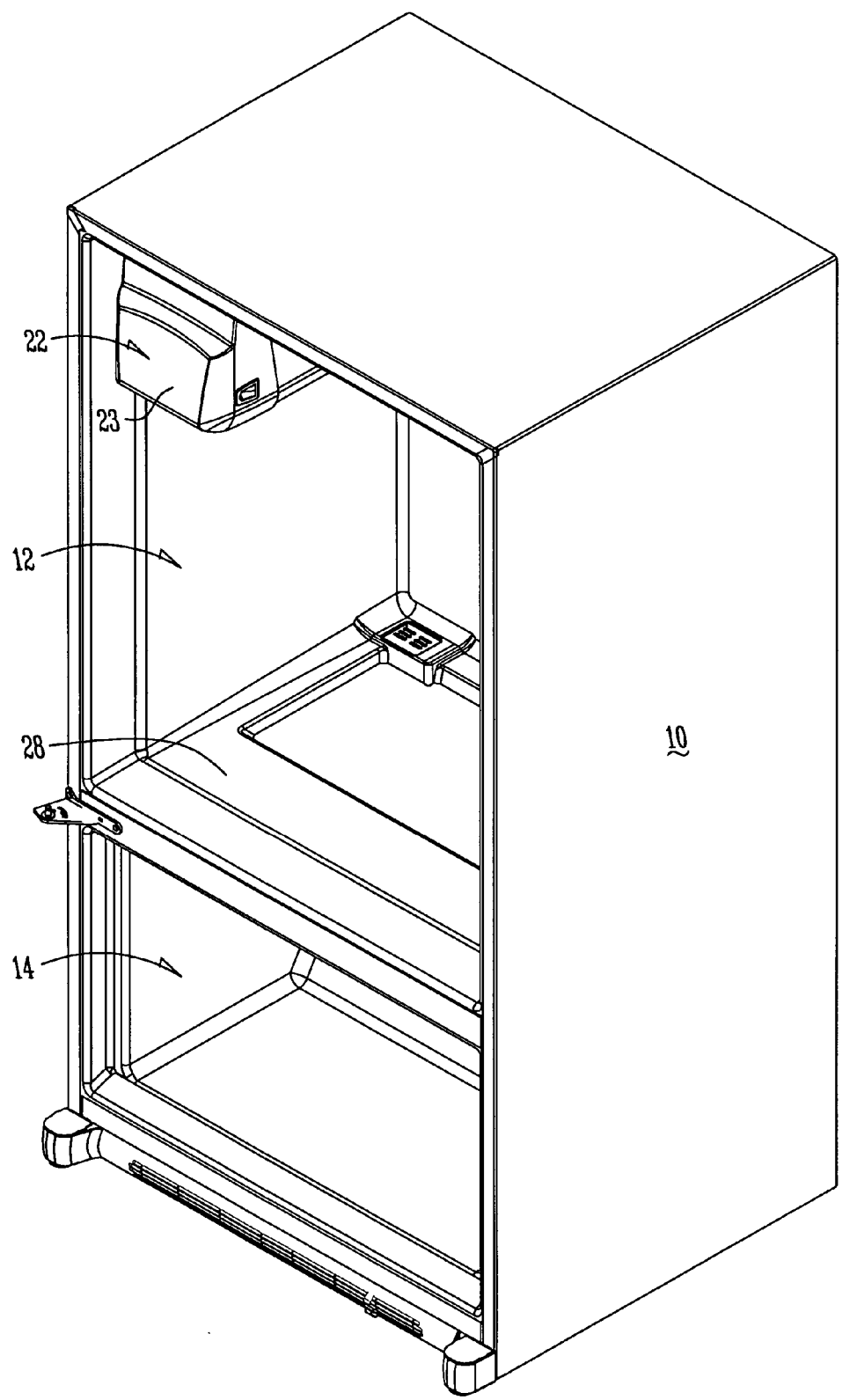
FIG. 2 is a perspective view of the bottom mount refrigerator having the doors removed.

A bottom mount refrigerator is generally designated in the drawings by the reference numeral 10. The refrigerator 10 includes a refrigerator or fresh food compartment 12 and a freezer compartment 14. Doors 16 are provided for the refrigerator compartment or fresh food compartment 12 and a door 18 is provided for the freezer compartment 14. One of the doors 16 includes an ice dispenser 20, which may also include a water dispenser.

Intermediate Temperature Icemaking Compartment

An icemaking compartment or intermediate compartment 22 is provided in the refrigerator compartment 12. The icemaking compartment 22 is shown to be in one of the upper corners of the refrigerator, or fresh food, compartment 12, but other locations are also within the scope of this invention. The icemaking compartment 22 has a front cover 23 that is insulated to prevent the cold air of the icemaking compartment 22 from passing into the refrigerator compartment and opening 21 is provided that mates with chute 19 of the ice dispenser 20. A seal may be provided between the opening 21 and chute 19 to prevent cold air from passing from the icemaking compartment to the refrigerator compartment 12. Chute 19 may be adapted to engage opening 21 upon closing of door 16. Chute 19 and opening 21 may be opposingly angled as to provide added sealing upon closing of door 16. Additionally, a intermediate piece maybe be used to improve the seal be between chute 19 and opening 21. For example, a resilient seal may be used to assist in achieving this seal. Alternatively, a spring or other elastic material or apparatus may be utilize between or about the junction of chute 19 and opening 21. Other alternatives for sealing between chute 19 and opening 21 should be evident to one skilled in the art.

Additionally, chute 19 should have a blocking mechanism located within or about it to assist in preventing or decreasing the flow of air or heat transfer within chute 19. For example, a flipper door that operates by a solenoid may be placed at the opening 21 to prevent cold air from leaving the icemaking compartment 22 and entering into the refrigerator compartment.

Preferably, the icemaking compartment 22 includes an icemaker 50 (as described below) that forms ice in an environment that is below freezing.

The icemaking compartment 22 may be integrally formed adjacent the refrigerator compartment 12 during the liner forming process and insulation filling process. In such a process the intermediate compartment may be separated on at least one side from the fresh food compartment by the refrigerator liner. Alternatively, the icemaking compartment 22 may be made or assembled remotely from the fresh food compartment and installed in the fresh food compartment 12. For example, this compartment 22 may be slid into the refrigerator compartment 12 on overhead rails (not shown) or other mounting. These methods are discussed subsequently.

The refrigerator 10 includes an evaporator 24 which cools the refrigerator compartment 12 and the freezer compartment 14. Normally, the refrigerator compartment 12 will be maintained at about 40° F. and the freezer compartment 14 will be maintained at approximately 0° F. The icemaking compartment is maintained at a temperature below 32° F. or less in order to form ice, but is preferably not as cold as the freezer compartment 14. Preferably this temperature is in the range of 20° F. The walls of the icemaking compartment are insulated to facilitate temperature control among other aspects. Grates or air vents 26 are provided in the wall 28 between the refrigerator compartment 12 and the freezer compartment 14 to allow air circulation between the compartments.

Air Ducts

Figure 5:
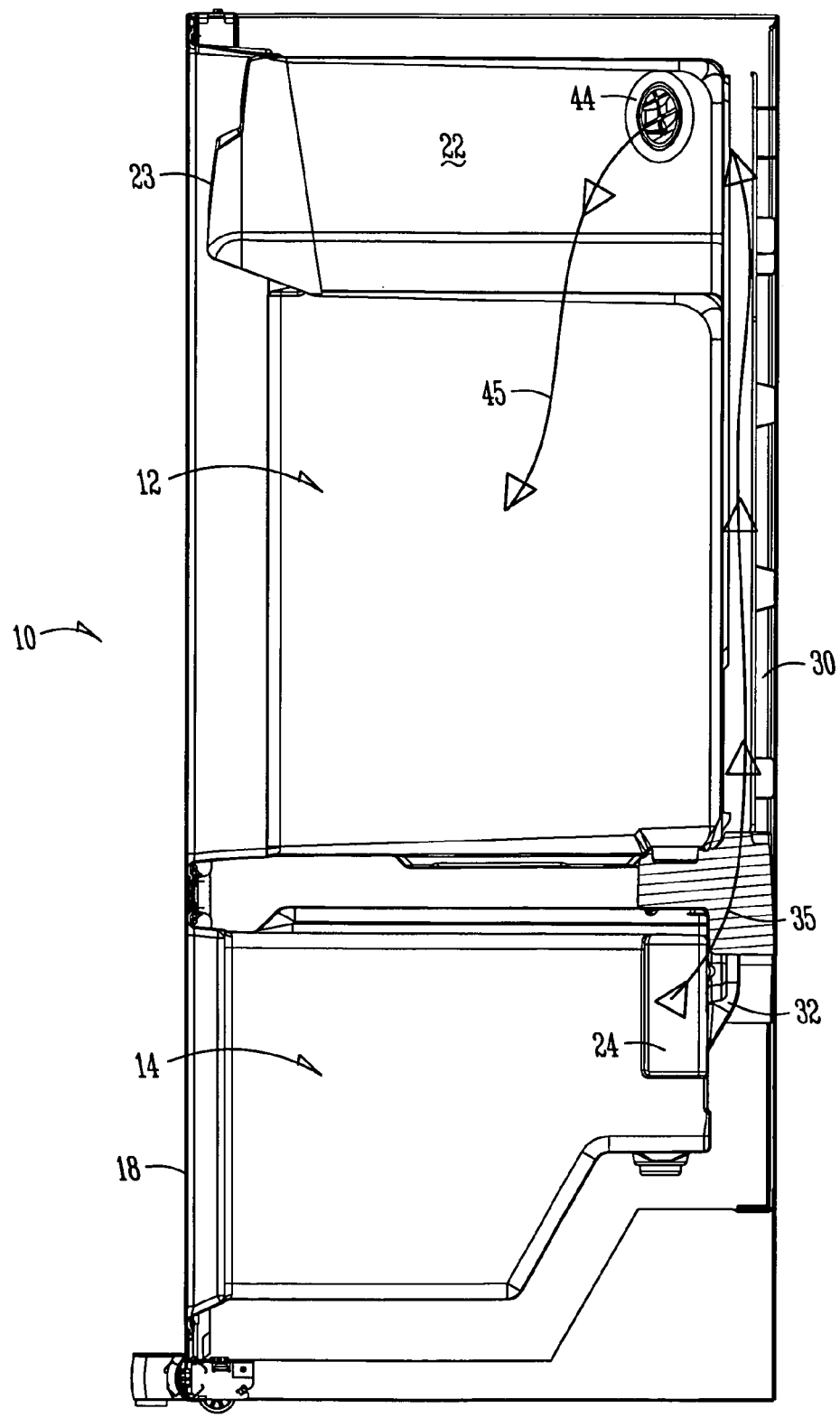
FIG. 5 is a sectional view taken along lines 5-5 of FIG. 4.

A cold air duct 30 extends between the freezer compartment 14 and the icemaking or specialty compartment 22. More particularly, the cold air duct 30 has a lower air inlet 32 within the freezer compartment 14 and an upper outlet end 34 connected to a fan 36 mounted on the back wall of the icemaker 22. The fan 36 draws cold air from the freezer compartment and forces the cold air into the icemaker 22 so as to facilitate icemaking. It is understood that the fan 36 may be located at the inlet end 32 of the cold air duct 30. The fan 36 controls the air flow from the freezer compartment 14 to the icemaking compartment 22 and may be a variable speed fan. The fan can be actuated by conventional means. The cold air duct 30 preferably resides within the rear wall of the refrigerator 10, as seen in FIG. 5. The arrow 35 designates the air flow through the cold air duct 30.

Figure 6:
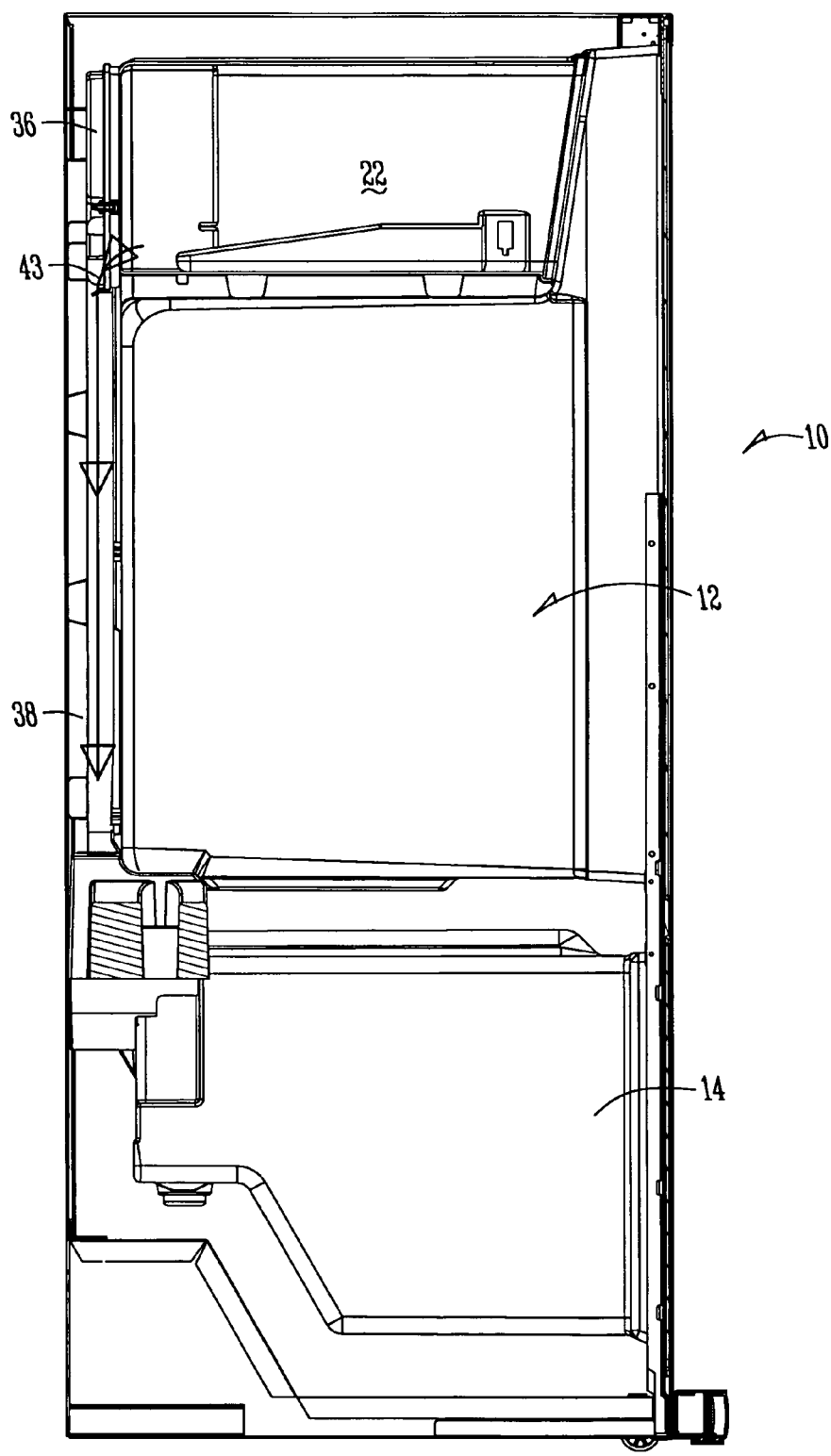
FIG. 6 is a sectional view taken along lines 6-6 of FIG. 4.

The refrigerator 10 also includes a return air duct 38 having an upper end 40 connected to the icemaker 22, and a lower end 42 terminating adjacent one of the air grates 26. Alternatively, the lower end 42 of the return air duct 38 may extend into the freezer compartment 14. Preferably, the return air duct 38 resides within the rear wall of the refrigerator 10, as seen in FIG. 6.

Figure 3:
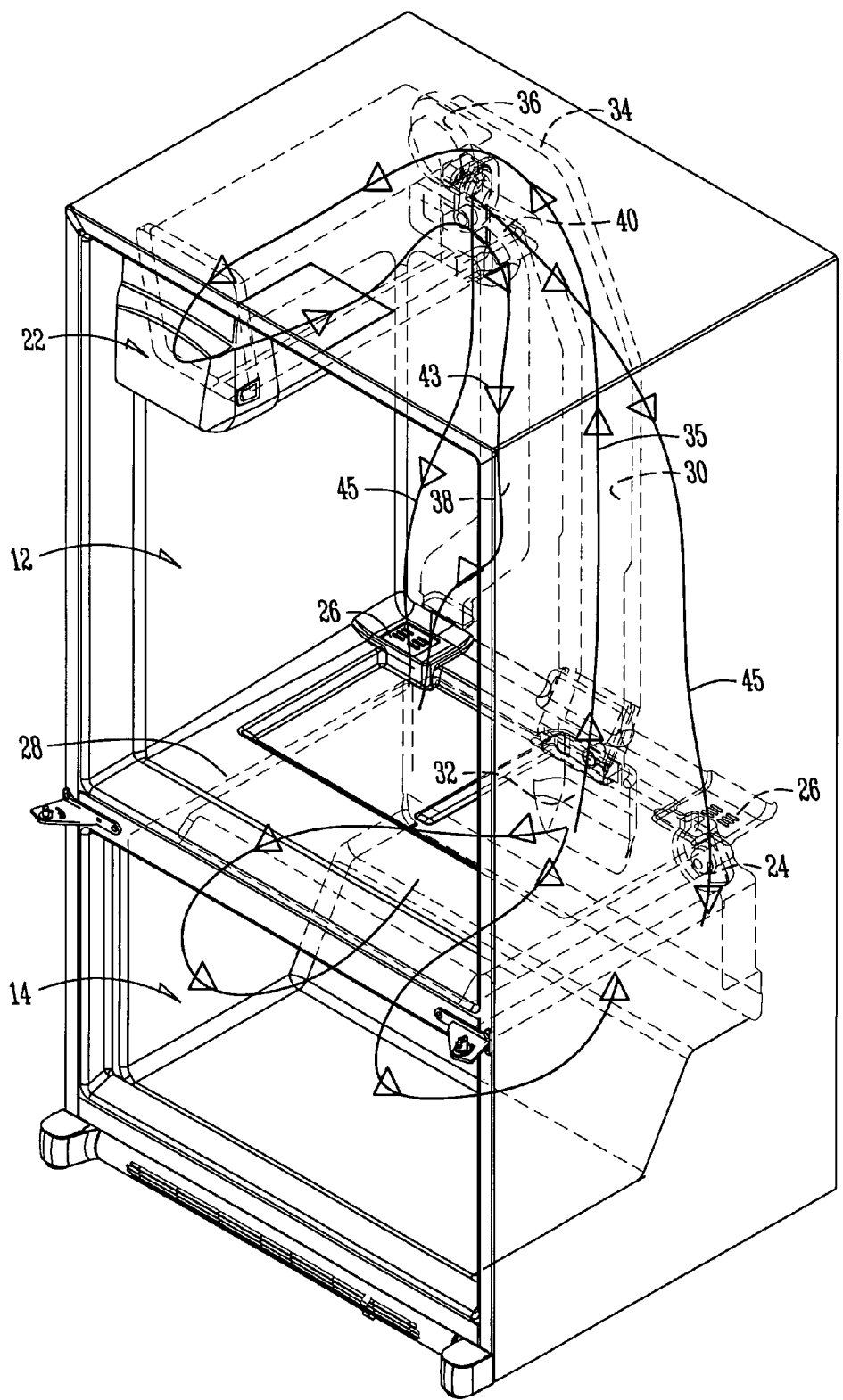
FIG. 3 is a view similar to FIG. 2 showing the cold air duct and return air duct for the icemaking compartment.

The icemaking compartment 22 also has an air vent for discharging air into the refrigerator compartment 14. Thus, a portion of the air from the icemaking compartment 22 is directed through the return air duct 38 to the freezer compartment 14, as indicated by arrow 43 in FIG. 3, and another portion of the icemaking compartment air is vented through the opening 44 into the refrigerator compartment 12, as indicated by arrows 45 in FIG. 3.

Figure 4:
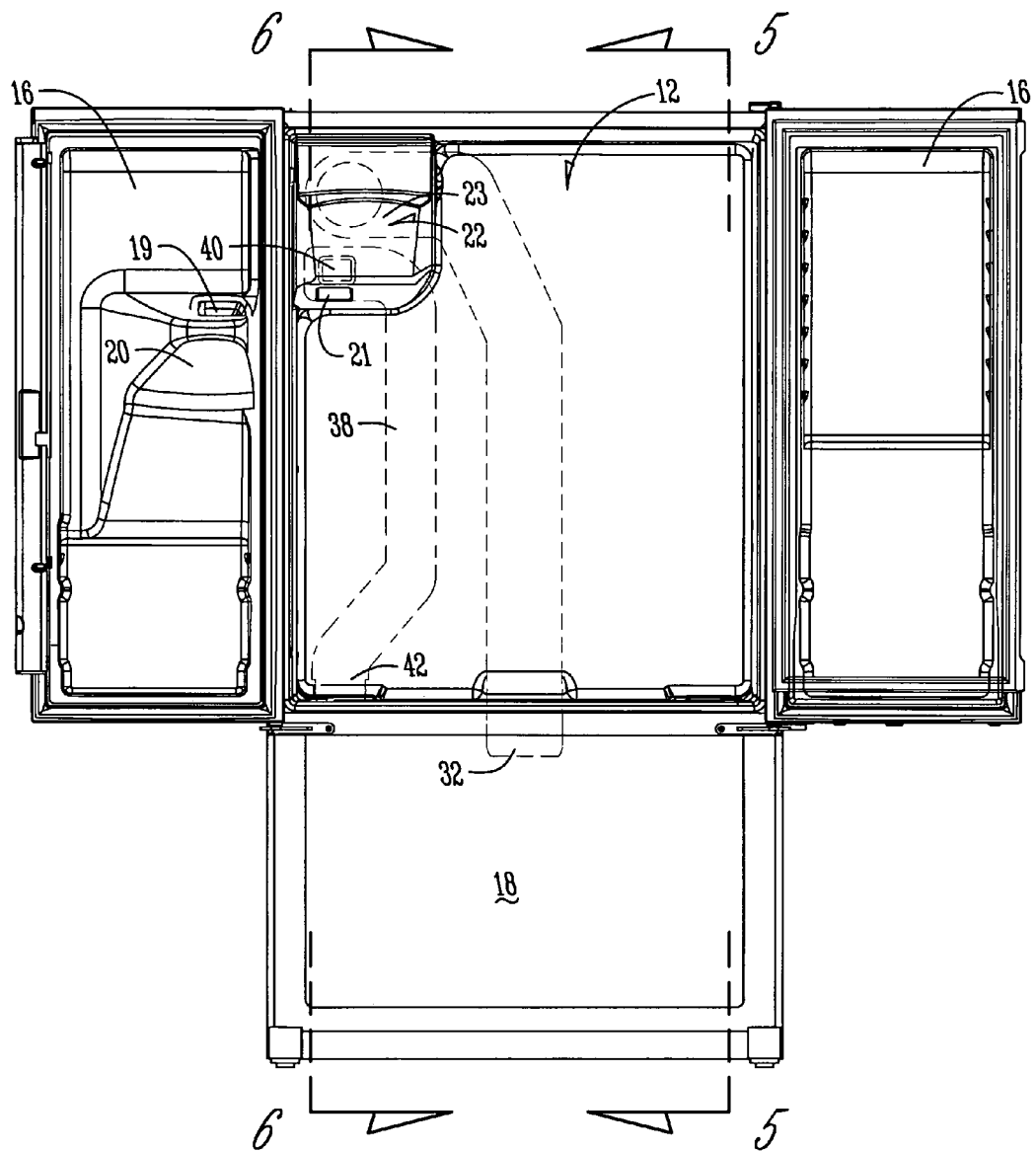
FIG. 4 is a front elevation view of the bottom mount refrigerator of the present invention with the doors open, and illustrating the cold air and return air ducts.

As seen in FIG. 4, the ice is discharged from the icemaker 22 in any conventional manner. Similarly, the ice dispenser 20 functions in a conventional manner.

Icemaker

Figure 7:
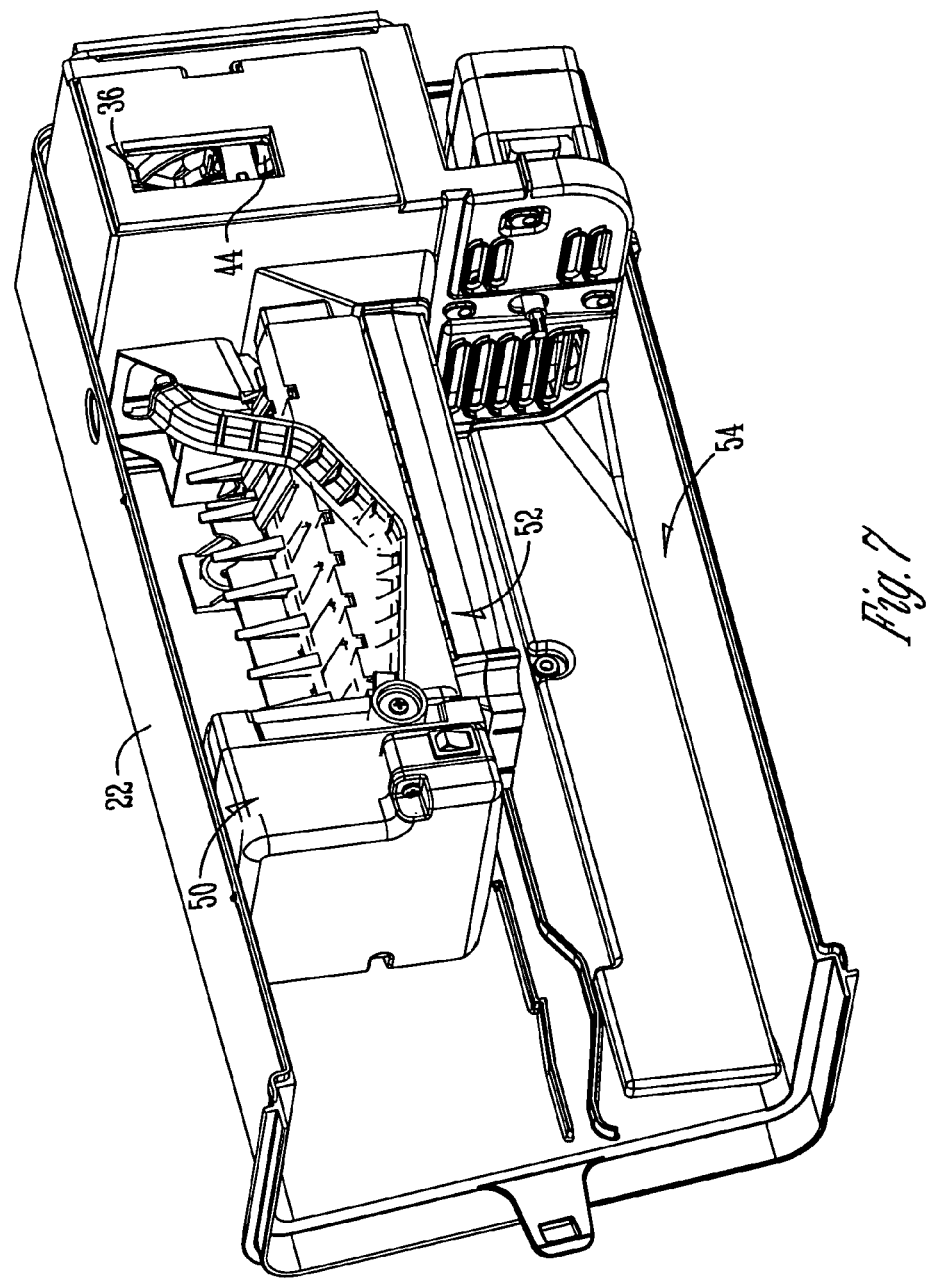
FIG. 7 is a perspective view of the icemaker positioned within the icemaking compartment.
Figure 9:
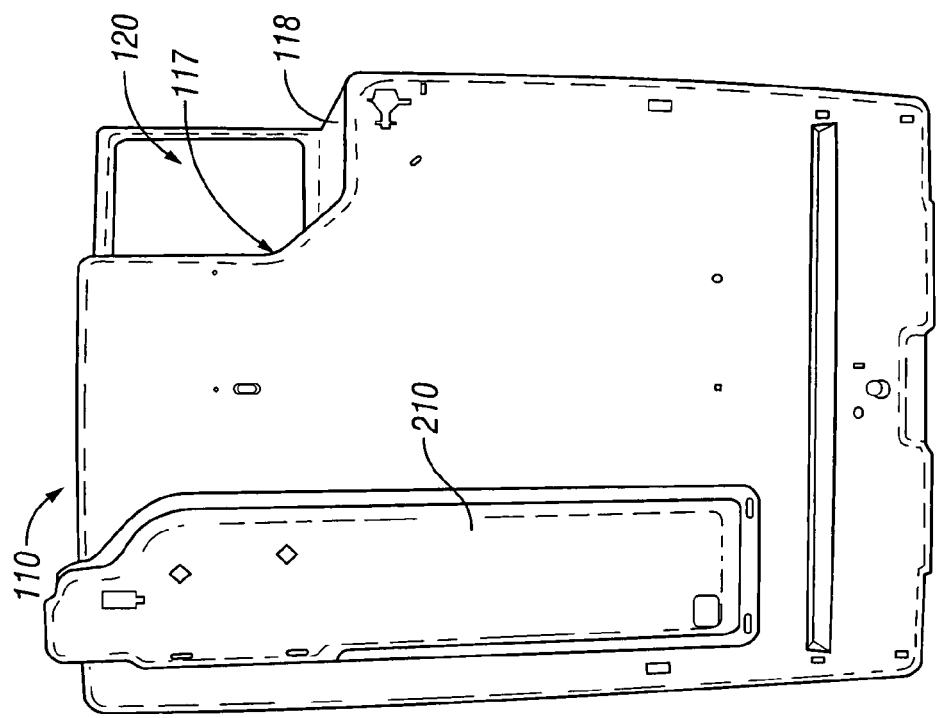
FIG. 9 is a front elevation view of the liner shown in FIG. 8 without the ice box attached.
Figure 8:
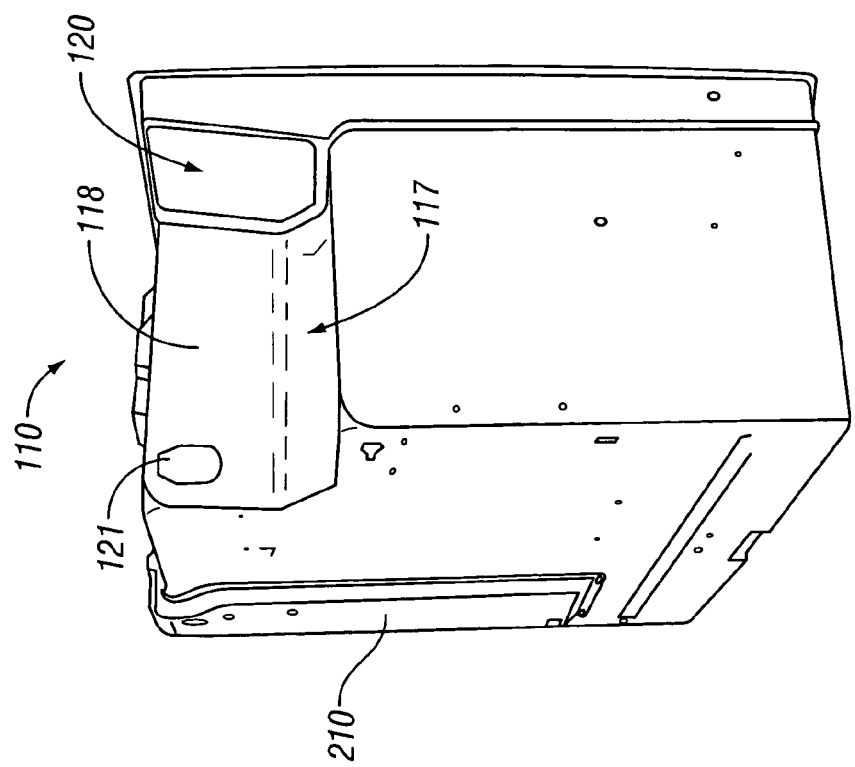
FIG. 8 is a perspective view of the fresh food compartment liner with the integrally formed icemaking compartment of the present invention.
Figure 11:
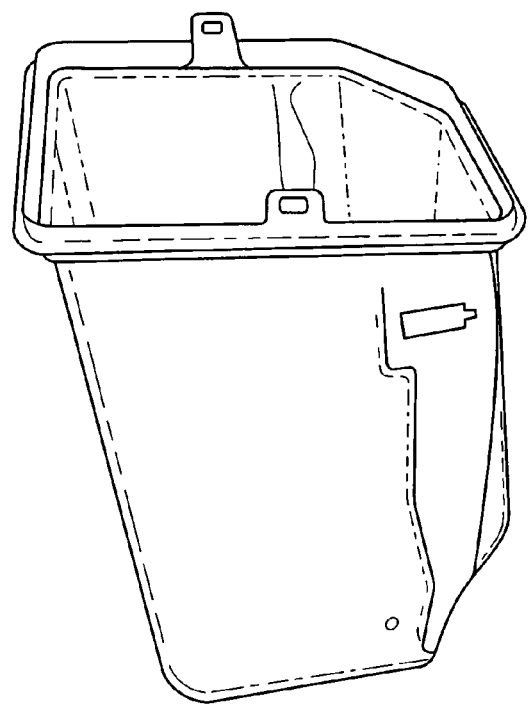
FIG. 11 is a perspective view of the ice box which mounts to the liner in accordance with one embodiment of the present invention.
Figure 10:
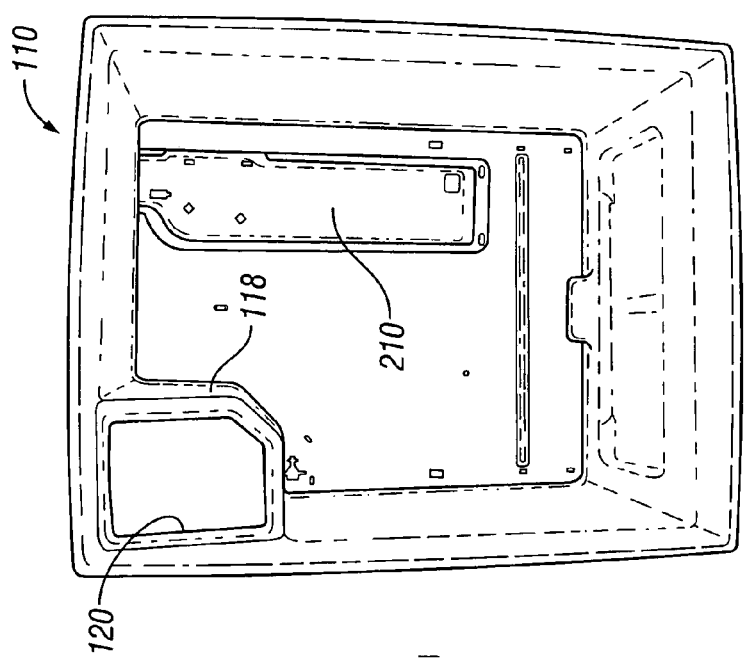
FIG. 10 is a side elevation view of the liner shown in FIG. 8.
Figure 12:
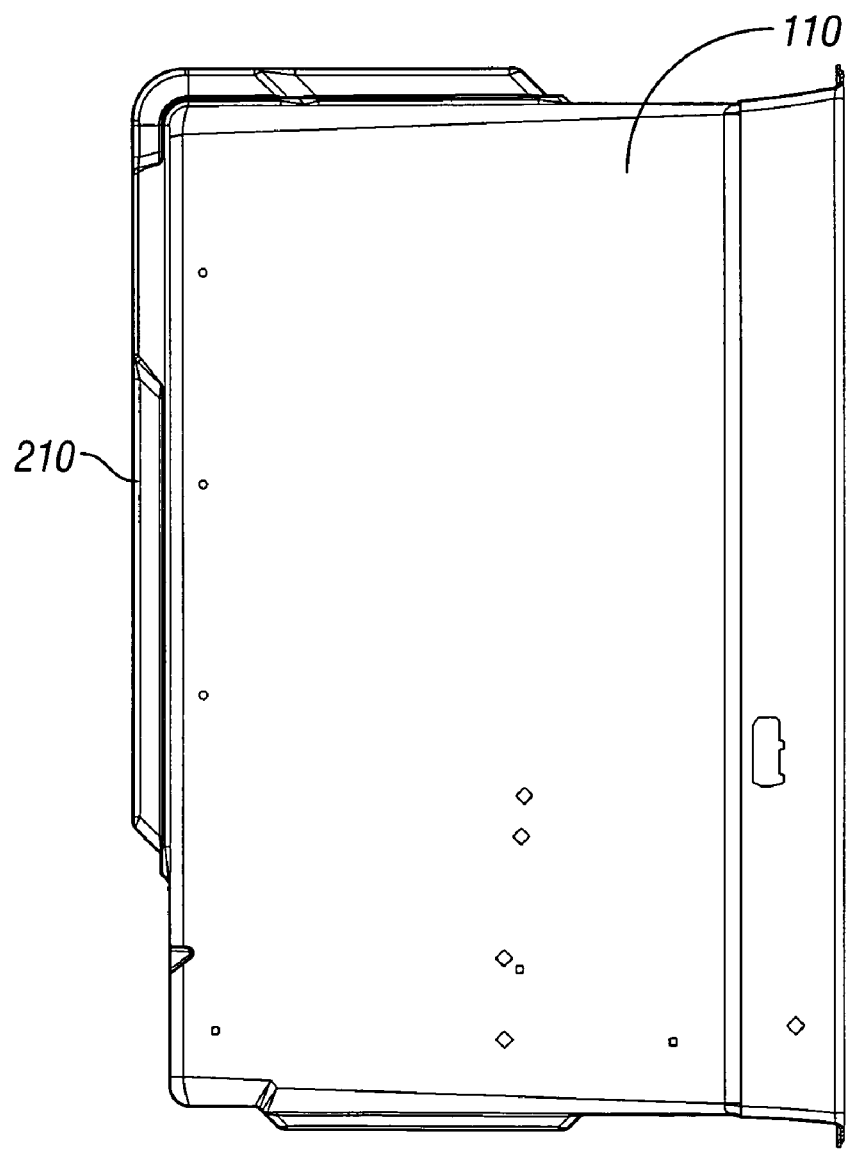
FIG. 12 is a right side elevation view of the fresh food compartment liner showing the water tank recess formed in the rear wall.
Figure 13:
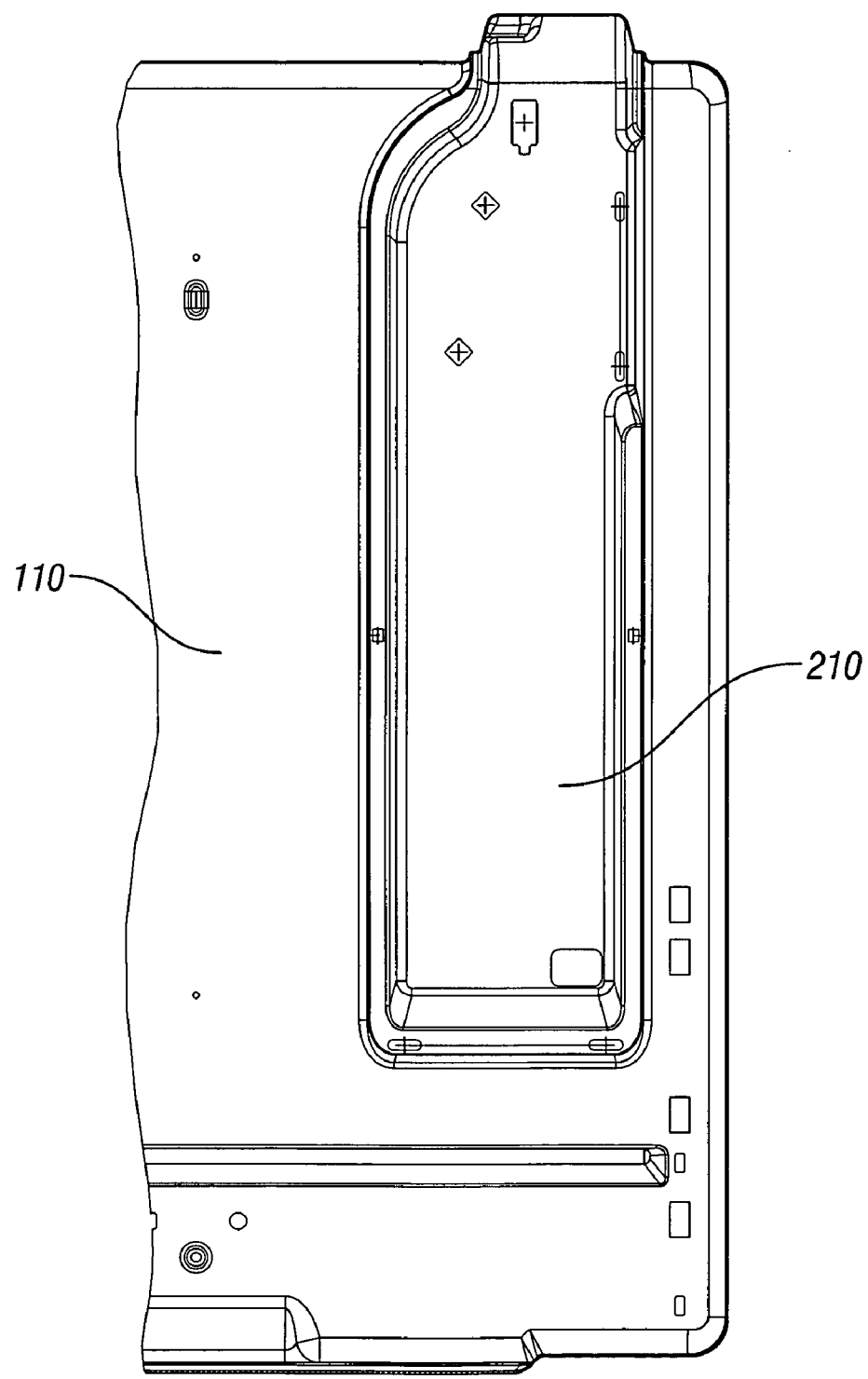
FIG. 13 is a partial front elevation view of the fresh food compartment liner showing the water tank recess.
Figure 14:
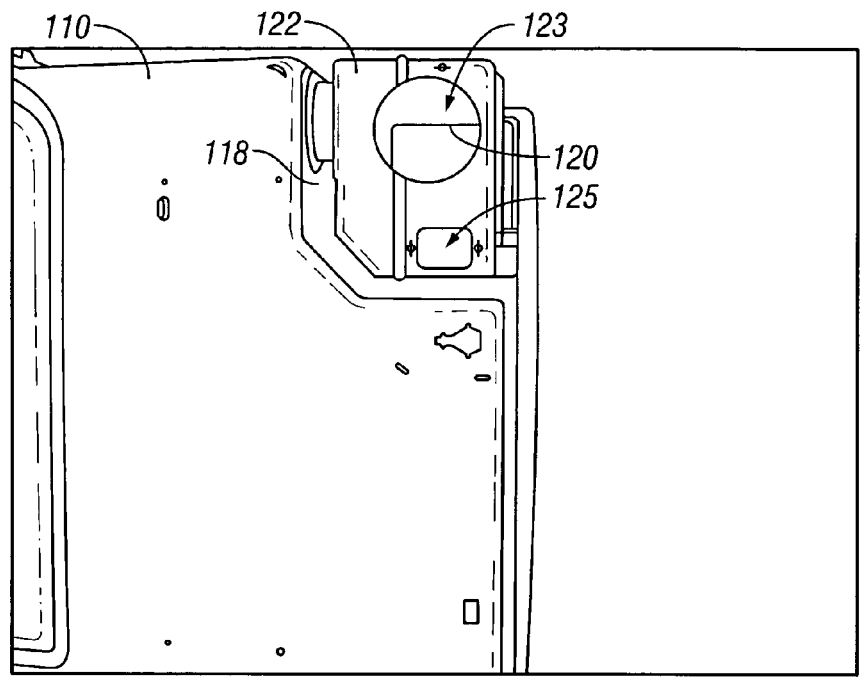
FIG. 14 is a rear perspective view of the fresh food compartment liner with the ice box installed within the outer shell of the fresh food compartment.
Figure 15:
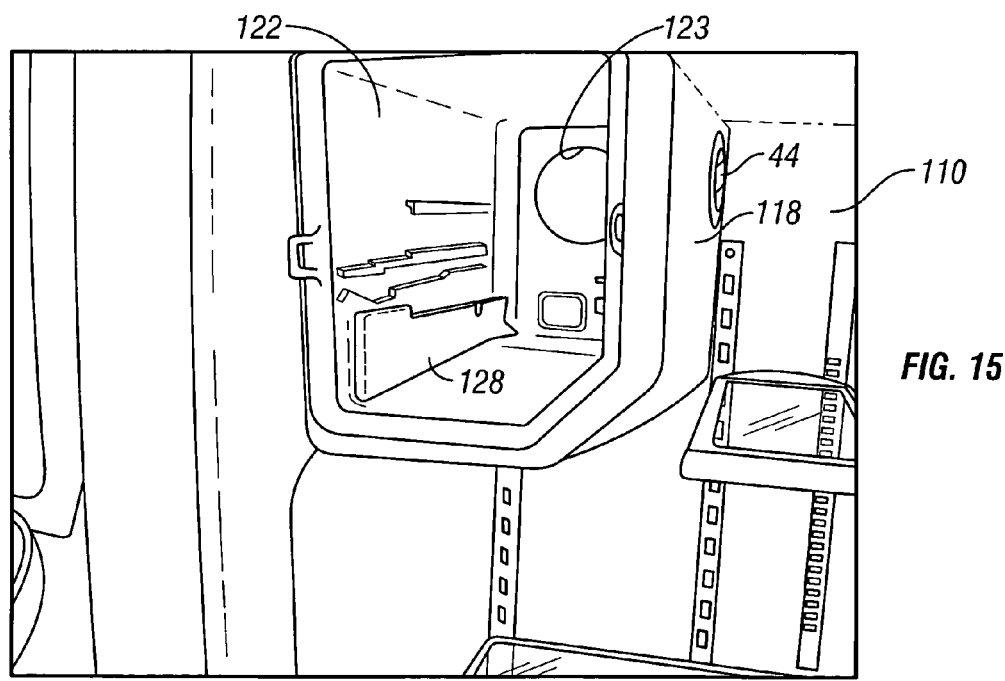
FIG. 15 is a front perspective view of the fresh food compartment with the ice maker and pan assembly removed for clarity.
Figure 16:
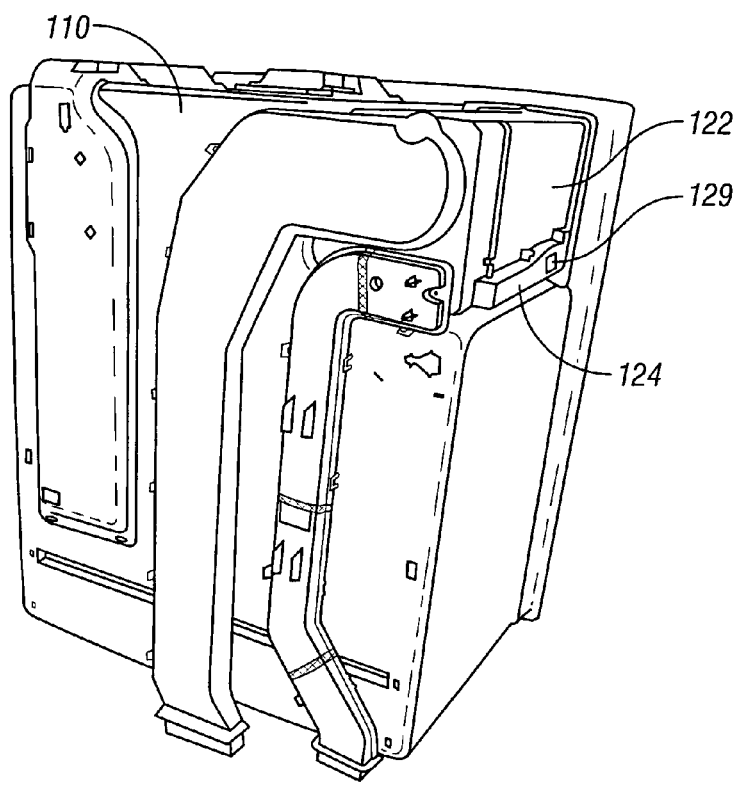
FIG. 16 is a perspective view of the liner, box and air ducts provided for the icemaking compartment.
Figure 17:
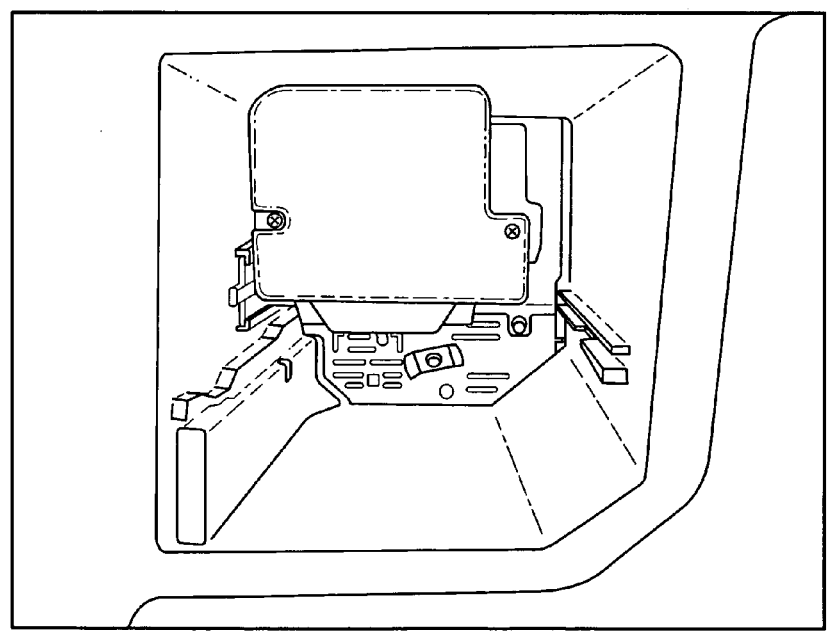
FIG. 17 is a front elevation view of the ice compartment with the pan assembly moved for clarity.
Figure 18:
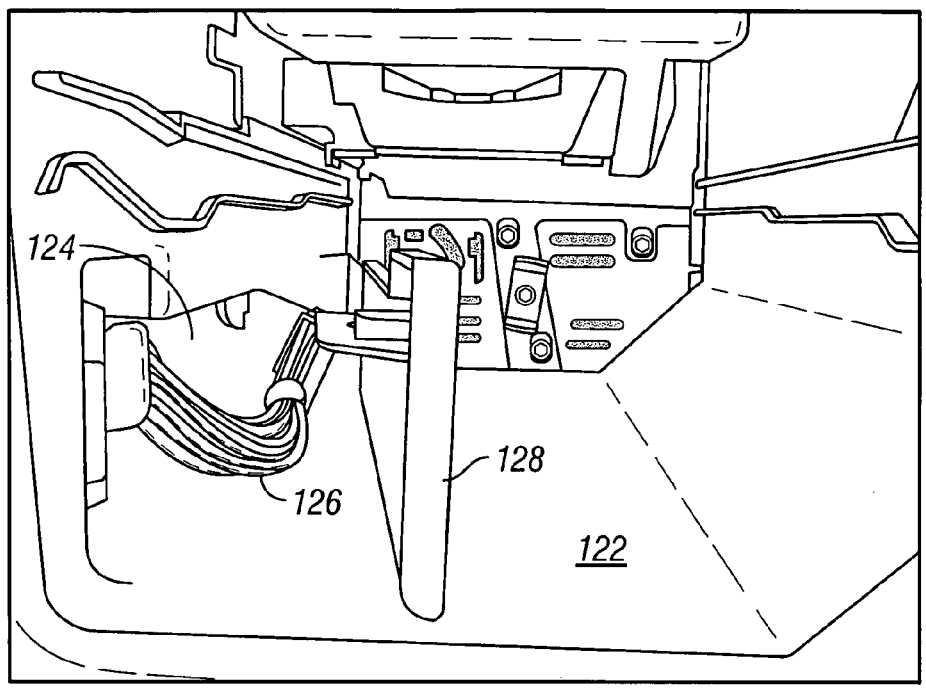
FIG. 18 is a view showing an internal portion of the icemaking compartment with a wire harness cavity in an open position.
Figure 19:
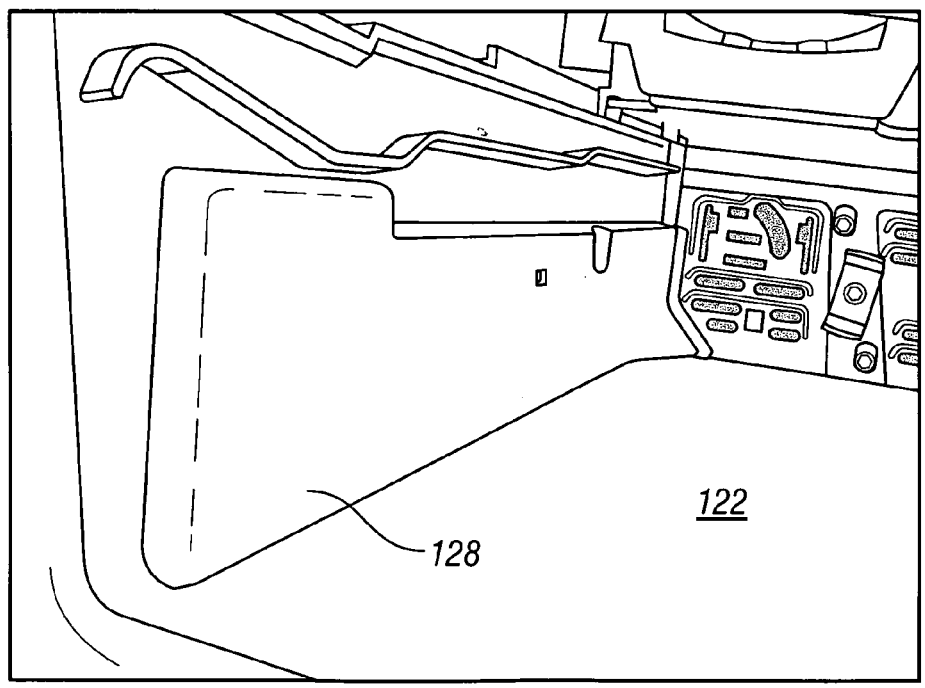
FIG. 19 is a view similar to FIG. 16 showing the wire harness cavity with a cover installed.
Figure 20:
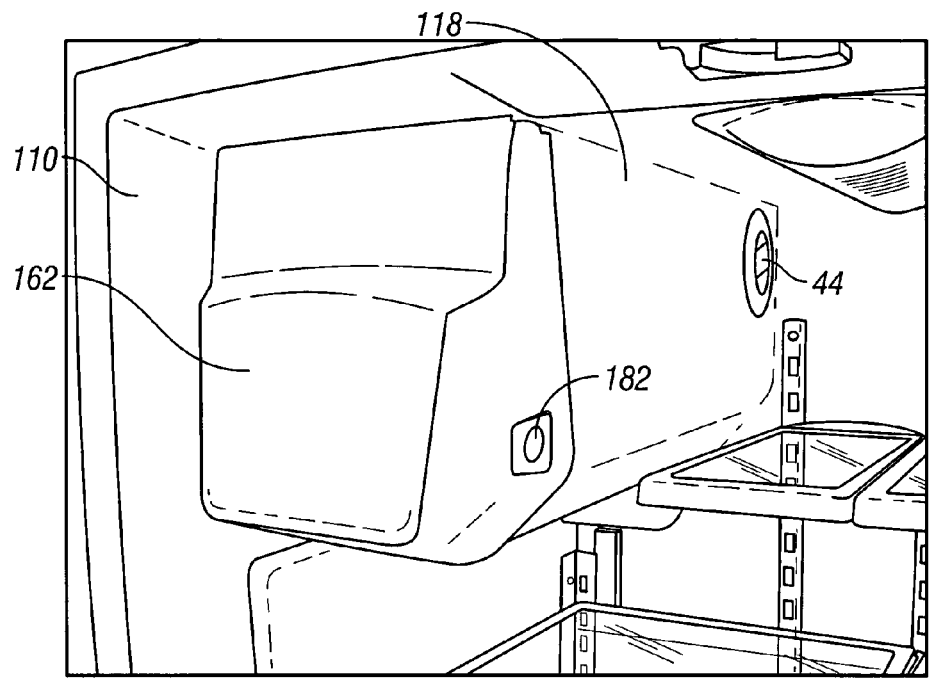
FIG. 20 is a perspective view from the front of the icemaker showing the bin and front cover in a closed position.
Figure 21:
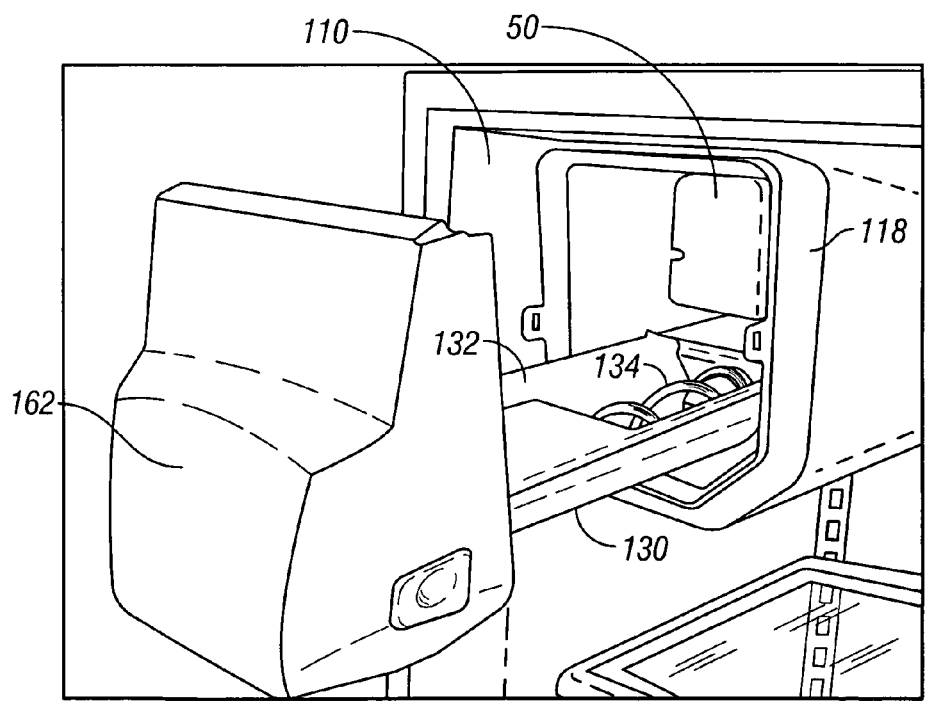
FIG. 21 is a view similar to FIG. 14 showing the bin and front cover in an open position.

As seen in FIG. 7, an icemaker 50 is positioned within the icemaking compartment 22 with the ice storage area 54 with auger (not shown) removed for clarity. The icemaker 50 is mounted to an impingement duct 52. The impingement duct receives freezer air coming from the freezer compartment through the cold air duct 30 and the fan assembly 36. The opening 44 vents air into the refrigerator compartment 12. The auger assembly (not shown) is provided beneath the icemaker 50 along with an ice storage bin with an insulated cover 23. Impingement on the ice maker, as well as other aspects of ice making, is disclosed in Applicant's concurrently filed U.S. Application Publication No. US2006/0266055 A1 entitled REFRIGERATOR WITH IMPROVED ICEMAKER and is hereby incorporated by reference.

Control System (Generally)

As described in more detail below, a control system is provided that utilizes the icemaking compartment 22, the cold air supply duct 30, the return air duct 38, the variable speed icemaking fan 36, icemaking impingement air duct 52, an icemaking compartment thermistor (not shown), an icemaking compartment electronic control damper, fresh food air return ducts 26, and a fresh food compartment thermistor (not shown). The above components are controlled by an algorithm that prioritizes the making of ice unless the fresh food temperature exceeds the set point temperature. This prioritization is achieved as follows:

i. When ice is a priority, the fresh food damper is closed and the fan runs at optimum speed. In this way, supply air from the freezer compartment 14 is discharged through the impingement air duct 52, through the ice storage area 54, and through the icemaking compartment return air duct 38. One of the results of this air flow, is that ice is made at the highest rate.

ii. When the refrigerator compartment 12 is above set point, the electronic control damper opens and the fan runs at optimum speed. The supply air to the icemaking compartment is routed almost entirely into the fresh food compartment which forces the warmer air to return to the evaporator coil of the refrigerator. This achieves a rapid return to the fresh food set point after which the damper closes and the icemaking resumes.

iii. When the ice bin is full and the fresh food temperature is satisfied, the icemaking fan runs at minimum speed. Aspects of this will include: reduced energy consumption; reduced sound levels; and minimized sublimation of ice.

The above control system permits precision control of both the icemaking compartment 22 and the refrigeration compartment 12 separately, yet minimizes the complexity and the number of component parts necessary to do so.

Thermoelectric Alternative

A thermoelectric unit (not shown) may replace the impingement duct 52 with some concessions. Preferably the thermoelectric unit would contour about the icemaker as it effectively pulls heat out of the water. Alternatively, the thermoelectric unit could be the icemaker. Regardless, it should be understood that additionally, the thermoelectric unit would require a heat sink outside of the icemaking compartment 22 to dissipate heat. A careful balance is required between the voltage of the thermoelectric unit and the temperature of the refrigerator compartment 12 if the heat sink is in the refrigerator compartment 12. For example, the higher the voltage, the more heat will be generated that will be required to be removed from the refrigerator compartment 12. A portion of the heat generated by the thermoelectric unit may be removed by venting freezer compartment air to the thermoelectric unit.

Integral Icemaking Compartment

Figure 37:
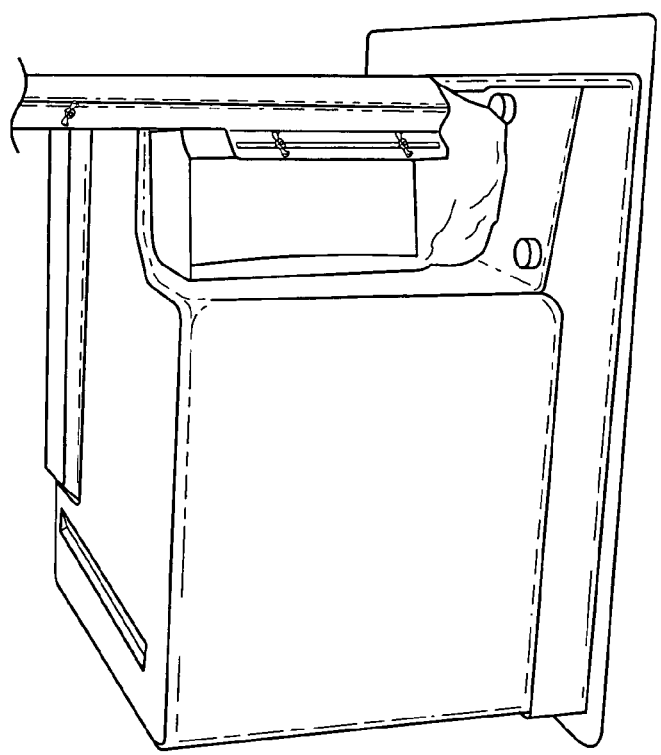
FIG. 37 is a view similar to 36 showing the plug inserted for formation of the icemaking compartment.

FIGS. 8-25 and 33-35 show the preferred embodiment of the icemaking compartment 22, wherein the compartment 22 is integrally formed with the liner 110 of the fresh food compartment 12. The integral formation of the ice compartment 22 takes place during the molding of the fresh food compartment liner 110. The liner 110 is formed in a conventional manner from a flat sheet of material using male and female molds 112, 114, as seen in FIGS. 36 and 37. The sheet material is heated and then placed between the open molds 112, 114, which are then closed in a vacuum box. Simultaneously, a three-dimensional plug 116 is moved in a direction opposite the male mold 112 so as to deform the sheet material from the rear side opposite the male mold 112. Alternatively, the plug 116 can be stationary and the liner 110 formed around the plug 116. The plug 116 forms a notch 117 in an upper corner of the liner 110. The notch 117 defines an outer shell 118 of the ice compartment 22. Thus, the outer shell 118 is integrally formed with the liner 110 of the fresh food compartment 12. After the liner 110 and the outer shell 118 are completely formed, the plug 116 is withdrawn and the male mold 112 is separated from the female mold 114. The liner 110 with the outer shell 118 of the ice compartment 22 is then removed and cooled. The front wall of the outer shell 118 is punched or cut so as to form an opening 120. A second hole 121 is punched or cut in the shell 118 for the air vent 44. The liner 112 is then moved to a punch station to trim the edges of the liner 110.

The ice compartment 22 includes a box 122 which is inserted through the front opening 120 into the outer shell 118 so as to define an inner shell. The space between the outer shell 118 and the box or inner shell 122 is filled with an insulating foam, such that the ice compartment 22 is insulated. This insulation process may take place at the same time that insulation is applied between the liner 110 and the outer cabinet of the refrigerator 10. The ice box 122 includes a rear hole 123 for connection to the cold air duct 30, a second rear hole 125 for connection to the return air duct 38, and a side hole 127 for the vent opening 44.

Modular Icemaking Compartment

Figure 38:
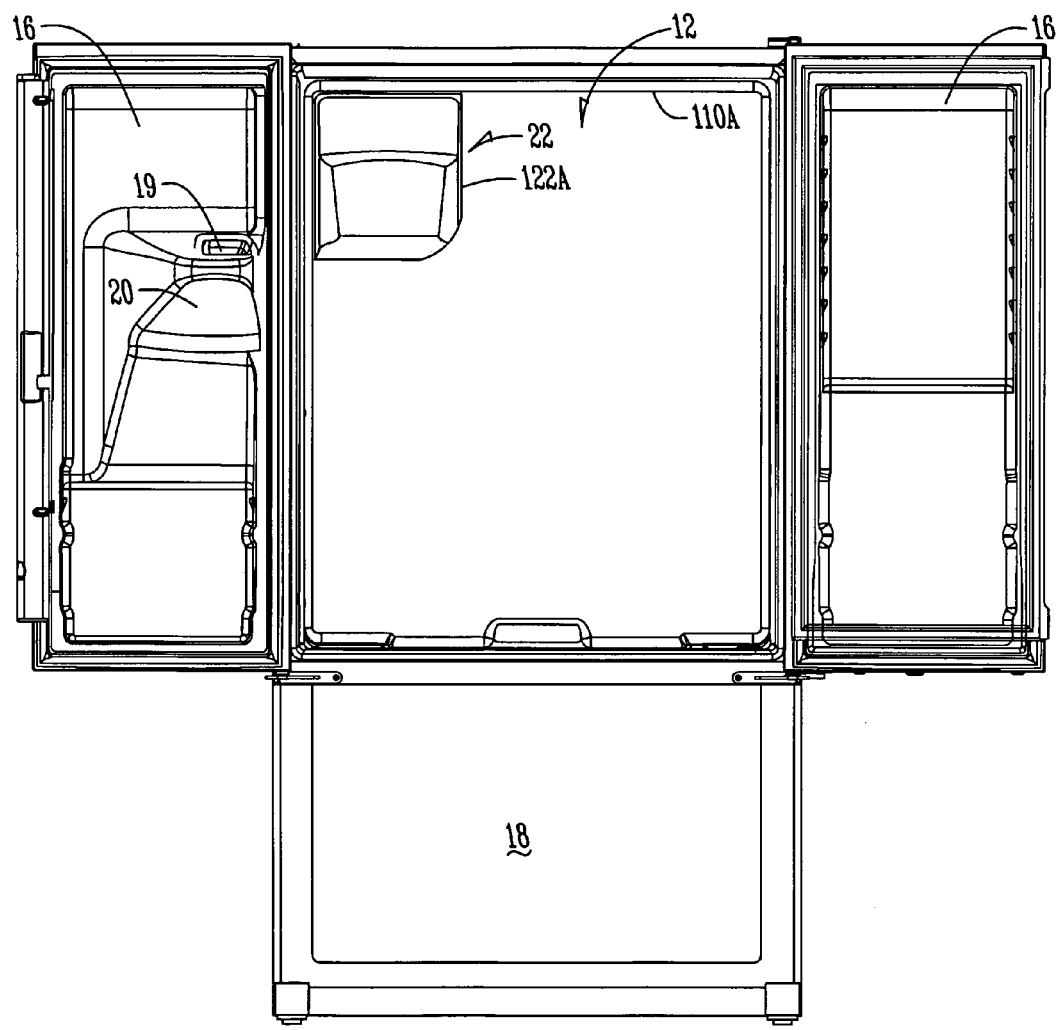
FIG. 38 is a view of an alternative embodiment of an icemaking compartment formed separately from the fresh food compartment liner and mounted therein.
Figure 39:
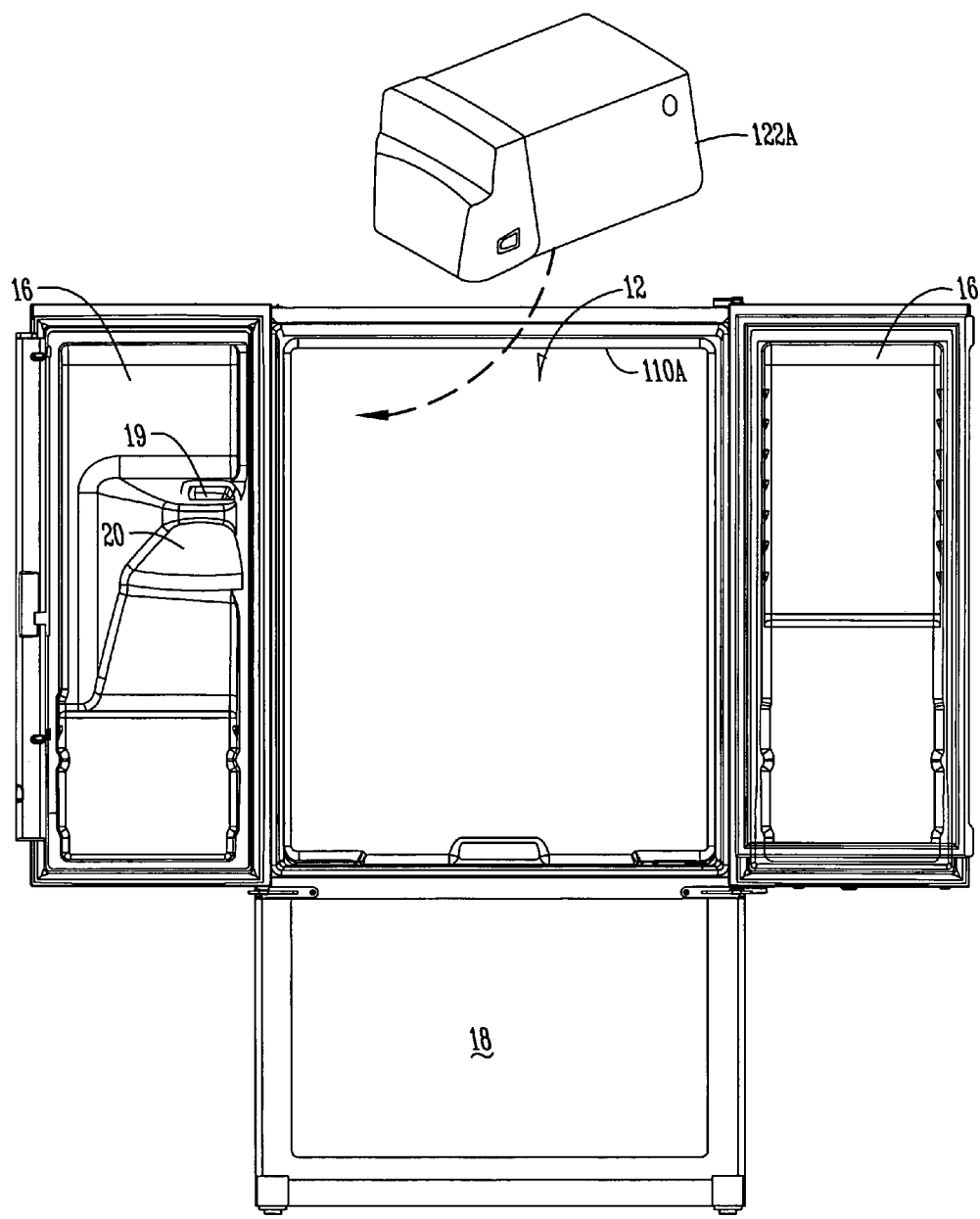
FIG. 39 is an exploded view of the separate ice compartment of the alternative embodiment.

As an alternative to an icemaking compartment formed integrally in the liner 110, the compartment 22 can be formed separately and then attached to the liner. This modular compartment is shown in FIGS. 38 and 39, and includes the liner 110A of the fresh food compartment, and the ice box 122A, which preferably is insulated. All other features and components of the compartment 22 are the same, other than how it is made. The modular unit can be mounted anywhere in the fresh food compartment 12.

Wire Harness

The ice compartment 22 is adapted to receive the icemaker 50, which is mounted therein using any convenient means. The ice box 122 includes a recess 124 adapted to receive the wire harness 126 for the icemaker 50. The wire harness 126 may be adapted to allow for connection to the icemaker 50 prior to complete insertion or mounting of the ice maker 50 into the compartment 12. For example, the wire harness 126 may be adapted to be operatively connected to the refrigerator near the front portion of ice box 122 to allow for sufficient travel of the ice maker upon insertion or mounting of the ice maker 50. The wire harness 126 is operatively connected at the rearward portion of ice maker 50. In this case, an assembler may connect the wire harness 126 to the ice maker 50 and/or the refrigerator prior to fully inserting or mounting ice maker 50 into ice box 122.

A cover 128 may be provided for the wire harness recess 124 so as to enclose the wire harness 126 prior to connecting the harness 126 to the icemaker 50. The ice box 122 has a hole 129 in a side wall to mount the connector or clip of the wire harness.

Ice Bin Assembly

Figure 22:
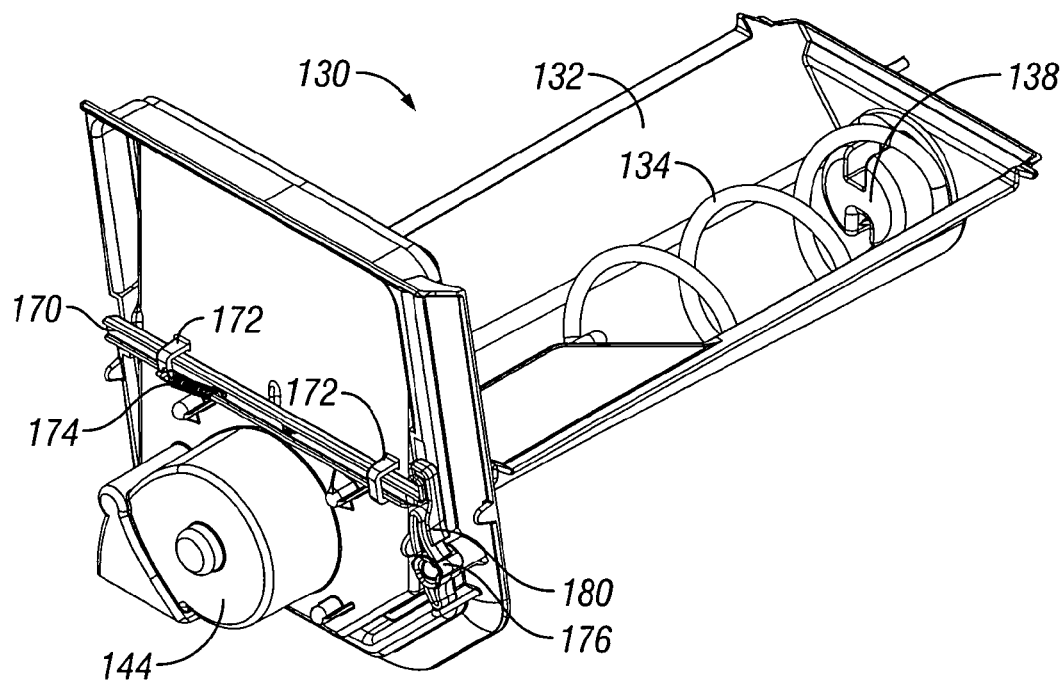
FIG. 22 is a perspective view of the ice pan, auger and motor assembly.
Figure 23:
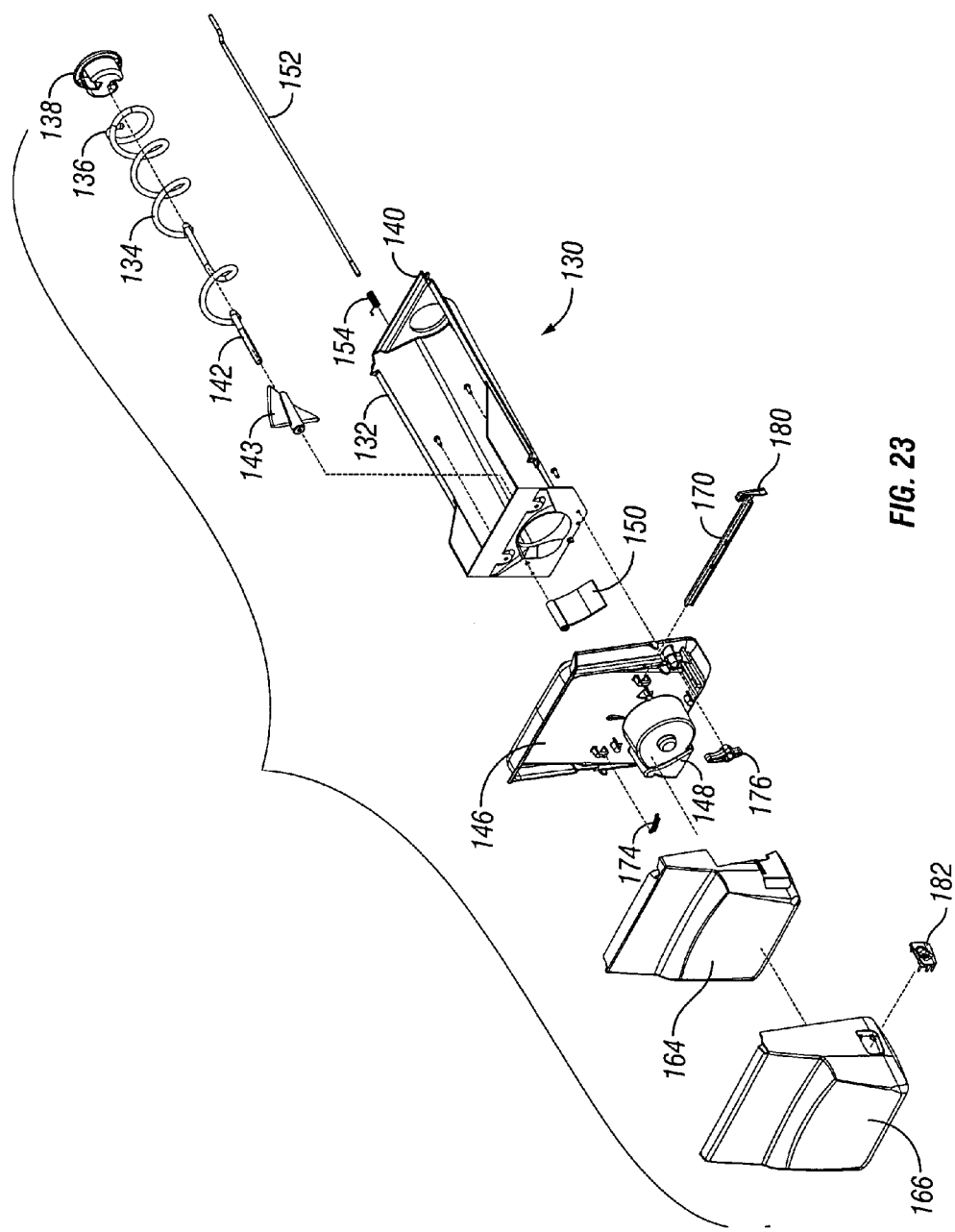
FIG. 23 is an exploded view of the ice pan, auger and motor assembly.
Figure 24:
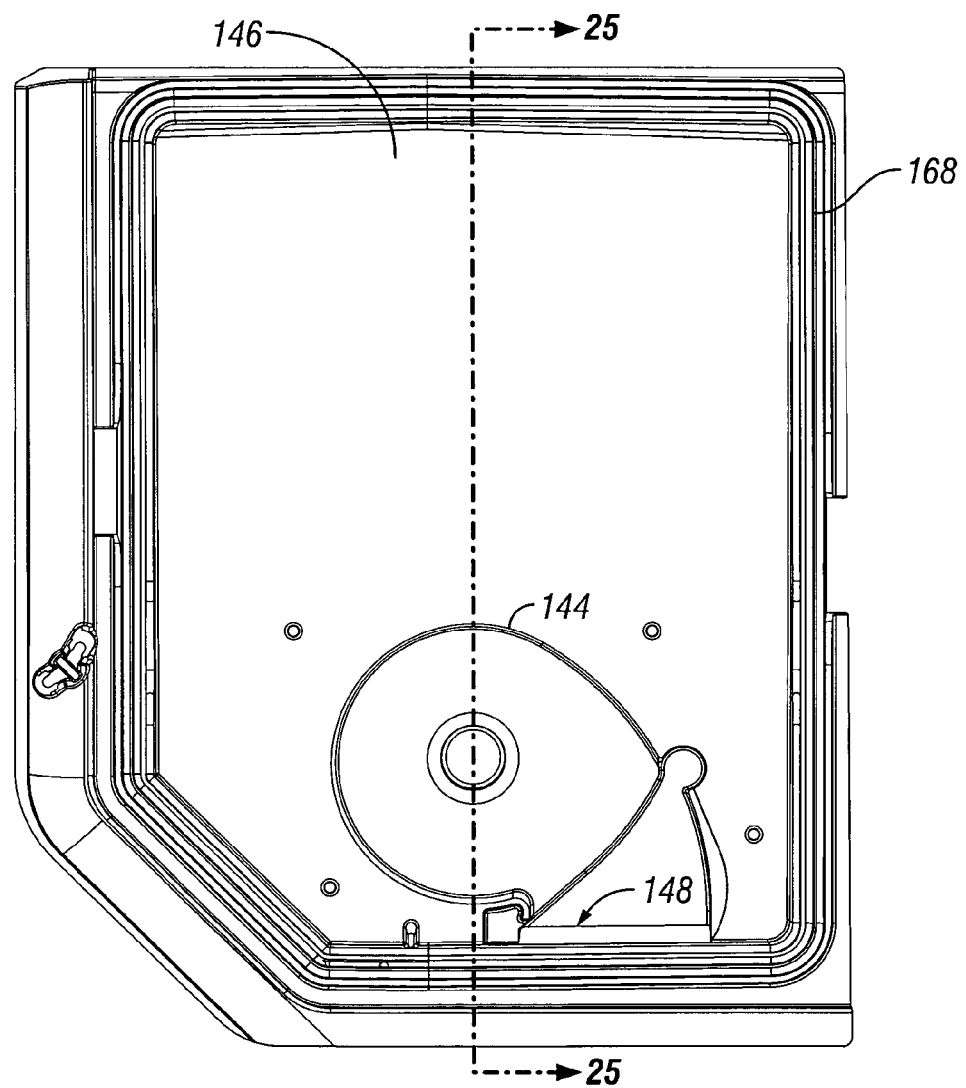
FIG. 24 is a rear elevation view of the bin assembly seal for the icemaking compartment.
Figure 25:
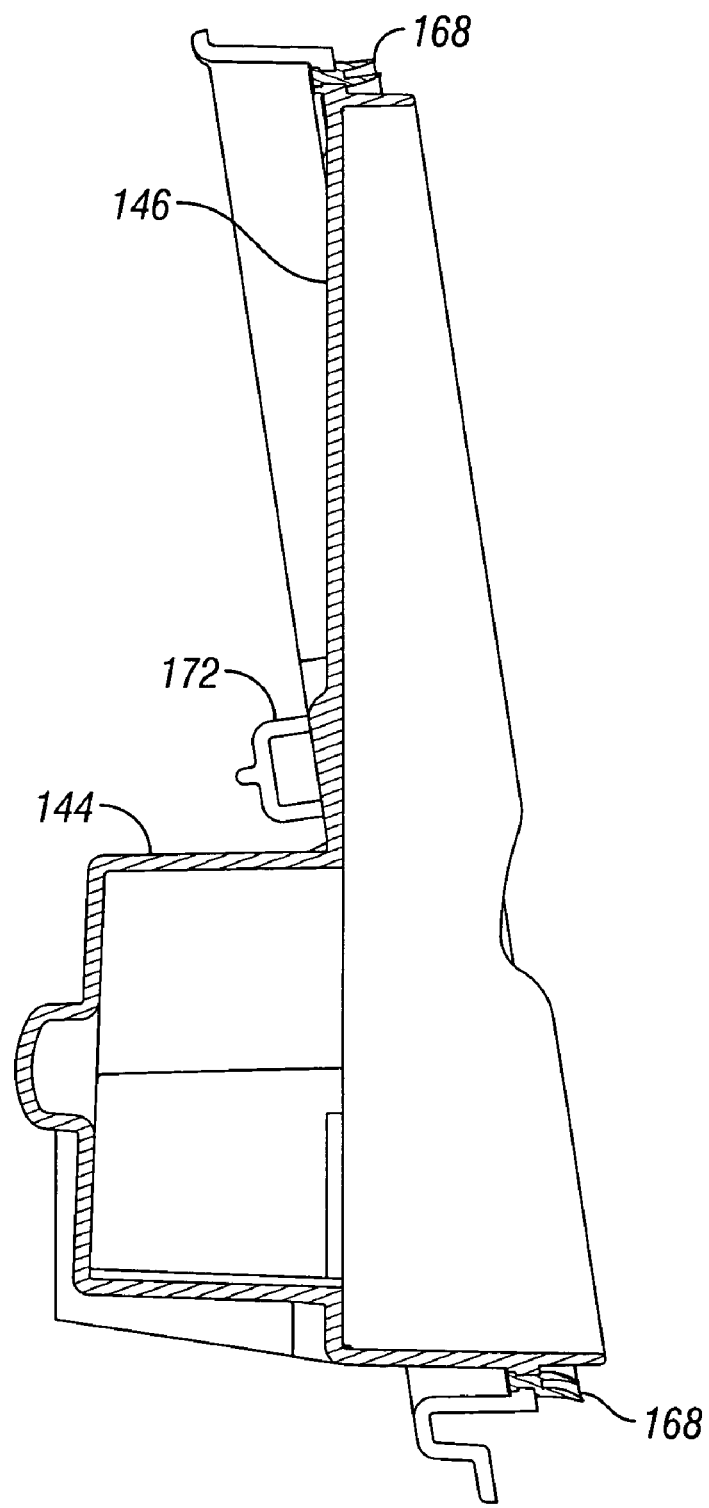
FIG. 25 is a sectional view taken along lines 25-25 of FIG. 24.
Figure 26:
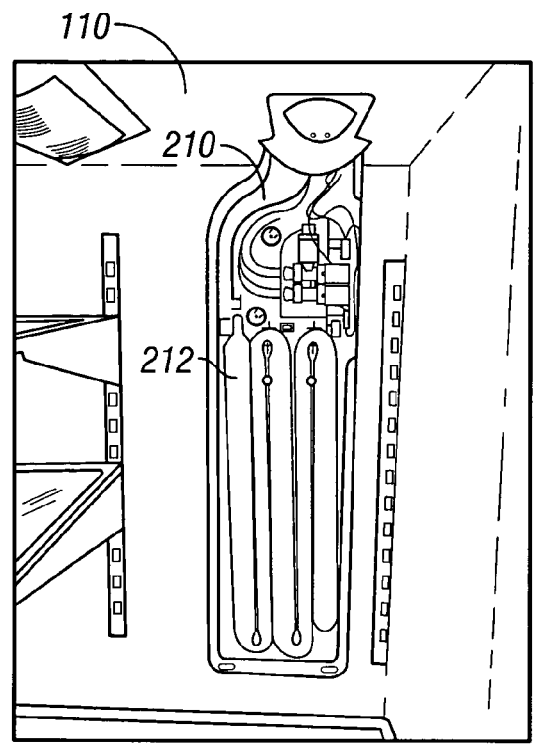
FIG. 26 is a front view of the water cavity formed within the rear wall of the fresh food compartment, with the water tank assembly mounted therein.
Figure 27:
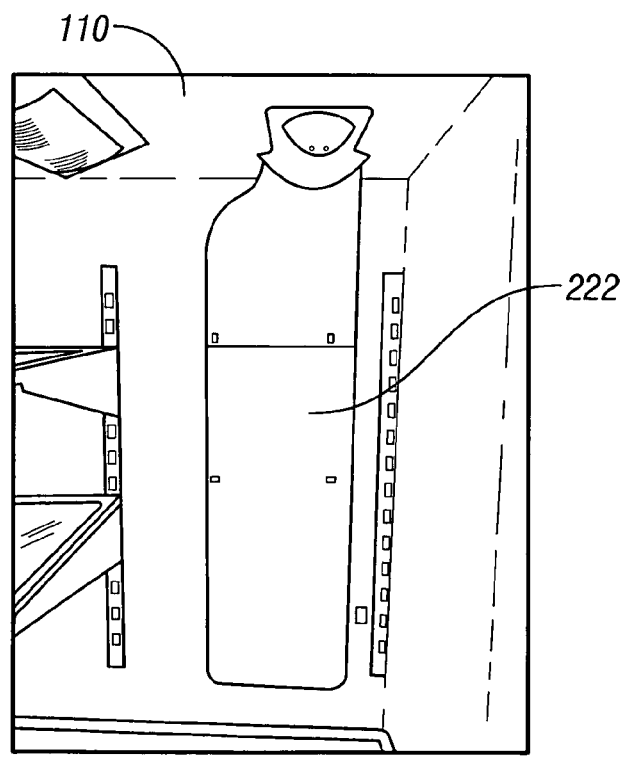
FIG. 27 is a front view of the fresh food compartment showing the cover installed over the water tank cavity.

The ice compartment 22 also includes an ice bin assembly 130. The assembly 130 is removable for assembly, service, and user access to bulk ice storage. The components of the bin assembly 130 are shown in FIGS. 22 and 23. The bin assembly 130 includes a tray or bin 132 for receiving ice from the icemaker 50. An auger 134 is mounted within the tray 132, with the first end 136 of the auger 134 being received in a motor 138 which is mounted in the upstream end 140 of the tray 132. The second end 142 of the auger 134 is mounted in a housing 144 on a front plate 146 of the bin assembly 130. A short piece of auger flighting 143 is provided on the second end 142 of the auger 134, within the housing 144. The housing 144 includes an outlet opening 148, with a flipper door 150 in the housing 144 to control opening and closing of the outlet opening 148. The flipper door 150 is mounted upon a shaft 152 extending through the tray 132. A spring 154 mounted on the shaft 152 engages the flipper door 150 to normally bias the door 150 to a closed position over the outlet opening 148. The shaft 152 can be turned by a solenoid (not shown) so as to move the flipper door 150 to an open position relative to the outlet opening 148, such that ice can be discharged from the tray 132 to the dispenser 20.

Front Cover Seal

A two-piece front cover 162 is provided on the bin assembly 130. A front cover 162 includes an inner panel 164 and an outer panel 166, as best seen in FIG. 23. Insulation is provided between the inner and outer panels 164, 166, such that the front cover 162 is insulated. The inner panel 164 mounts onto the front plate 146 of the bin assembly 130. A seal or compressible gasket 168 (FIG. 24) is provided around the outer perimeter front plate 146 so that when the bin assembly 130 is installed into the ice box 122, an air-tight seal is provided between the bin assembly 130 and the front opening 120 of the ice compartment 22. The seal 168 helps maintain the lower temperature of the icemaking compartment 22, as compared to the higher temperature of the fresh food compartment 12.

The front cover 162 includes a latch mechanism for releasably locking the cover 162 to the ice compartment 22. The latch mechanism includes a lock bar 170 extending through a pair of collars 172 on the front plate 146 of the bin assembly 130 for lateral sliding movement between a locked and unlocked position. The lock bar 170 is normally biased to the locked position by a spring 174. A cam 176 is mounted on a peg 178 on the front plate 146 of the bin assembly 130 and is adapted to engage a flange or finger 180 on the end of the lock bar 170. The cam 176 overcomes the bias of the spring 74 when actuated by a finger button 182 mounted on the outer panel 166, so as to release the front cover 162 for removal of the bin assembly 130. Thus, the bin assembly 130 can be slid into the ice box 122 and retained with an air-tight seal to maintain the temperature of the ice compartment 22. A user can depress the button 182 on the bin assembly 130 to release the lock bar 170 for removal of the bin assembly 130 from the ice box 122.

Air Impingement

Figure 33:
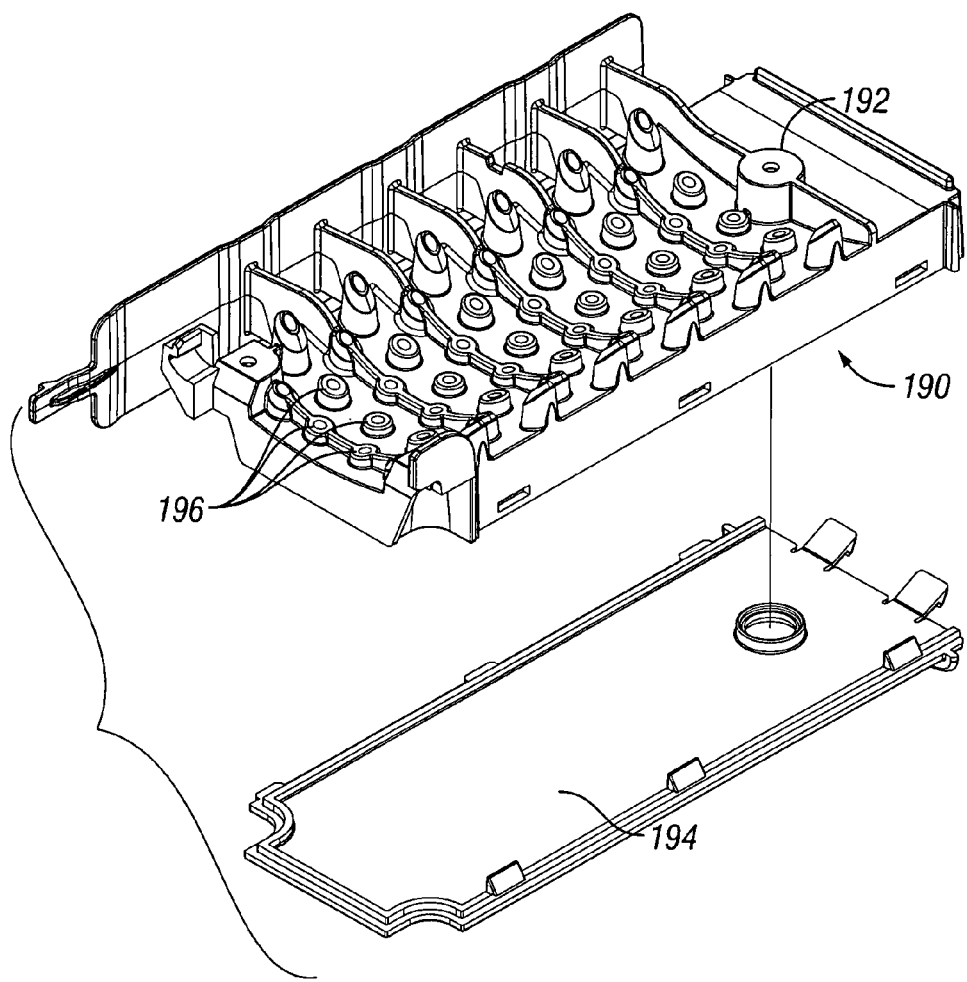
FIG. 33 is an exploded perspective view of the air impingement system of the present invention.
Figure 34:
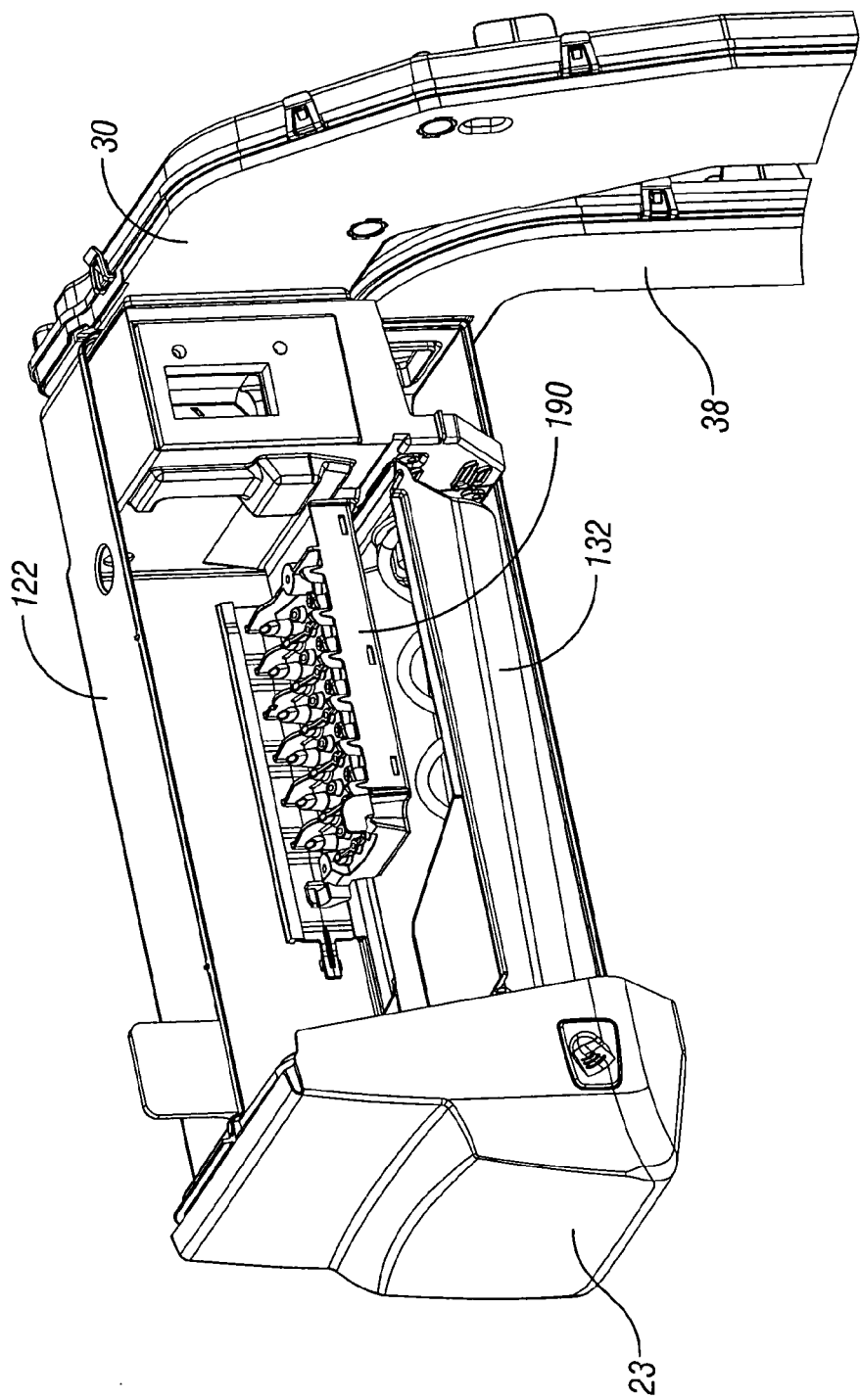
FIG. 34 is an assembled perspective view of the air impingement system in the ice box.
Figure 35:
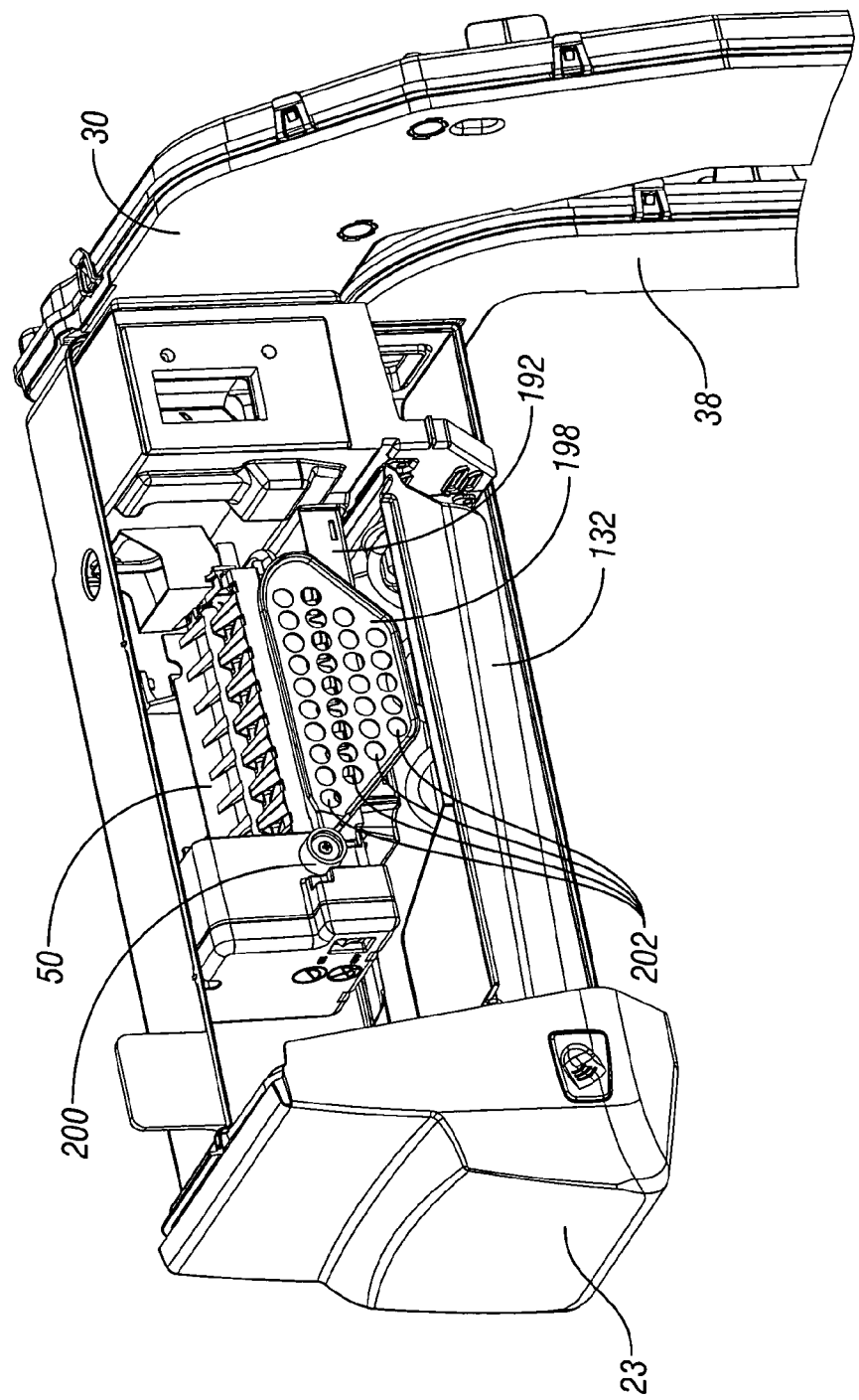
FIG. 35 is an assembled perspective view of the ice maker in the ice box.
Figure 36:
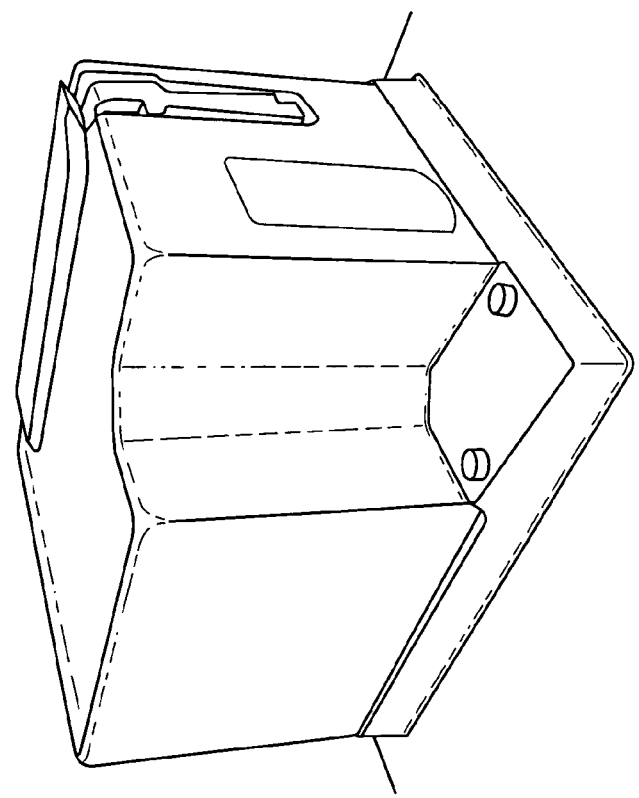
FIG. 36 is a view showing the male mold for forming the liner of the fresh food compartment according to the preferred embodiment of the present invention.

Another component of the icemaker 50 is an air impingement assembly 190, as shown in FIGS. 33-35. The impingement assembly 190 includes a manifold 192 and a bottom plate 194 which define an air plenum therebetween. The manifold 192 includes a plurality of holes or nozzles 196. The manifold 192 is operatively connected to the cold air duct 30 so the cold air from the freezer compartment 14 is directed into the manifold 192 by the fan 36, and through the impingement nozzles 196 onto the bottom of the mold of the icemaker 50, as best seen in FIG. 34.

The nozzles 196 are shown to be round, but may also be slotted, or any other shape. The nozzles 196 are preferably arranged in staggered rows. The diameter of the nozzles 196, the spacing between the nozzles 196, and the distance between the nozzles 196 and the ice mold are optimally designed to obtain the largest heat transfer coefficient for a prescribed air flow rate. For example, in a preferred embodiment, the nozzles 196 are round with a diameter of 0.2-0.25 inches, with a spacing of approximately 1.5 inches between adjacent nozzles, and a distance of 0.5-1.0 inches from the surface of the icemaker 50. The alignment of the nozzles 196 with the ice mold preferably avoids direct air impingement on the first two ice cube slots near the icemaker thermostat so as to avoid hollow ice production.

The air impingement assembly 190 speeds ice production by 2-3 times so as to meet large requirements of ices The impingement assembly 190 is also compact so as to permit increased ice storage space in a larger sized tray 132.

Bale Plate

The ice maker 50 includes a bale plate 198 which shuts off the ice maker 50 when the level of ice cubes in the tray 132 reaches a pre-determined level. The plate 198 is pivotally connected to the ice maker 50 by a connector 200 at one end of the plate 198, as seen in FIG. 35. The plate 198 pivots in a vertical plane. The plate 198 is stronger than a conventional wire bale arm. The vertical orientation of the plate 198 prevents ice from hanging up on the plate, which happens with a wire bale arm. The plate includes a plurality of holes 202 to reduce weight and to improve air flow.

Water Valve and Tank Assembly

Prior art refrigerators with water and ice dispensers typically locate the water system components, such as tanks, valves, filter and tubing, throughout the refrigerator cabinet and base pan areas. This arrangement is prone to service calls to repair leaks and water restrictions due to the larger number of connections or fittings for the components. The multiple connections and various tubing lengths also add to manufacturing costs.

In the present invention, the water system is pre-assembled in a single module that can be quickly and easily installed. The module has less tubing runs and connections between components as compared to prior art water systems.

Figure 28:
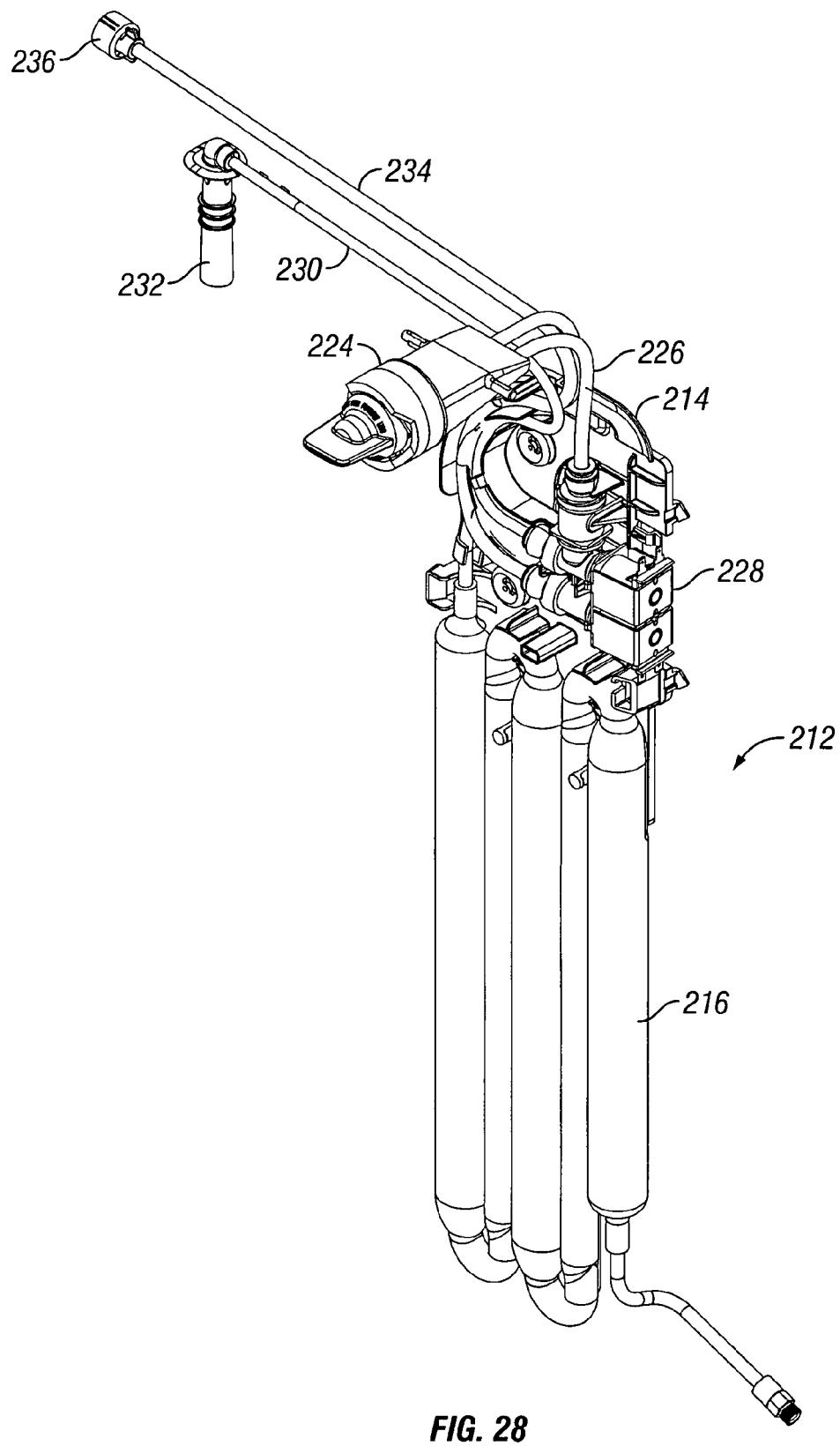
FIG. 28 is a perspective view of the water tank assembly of the present invention.
Figure 29:
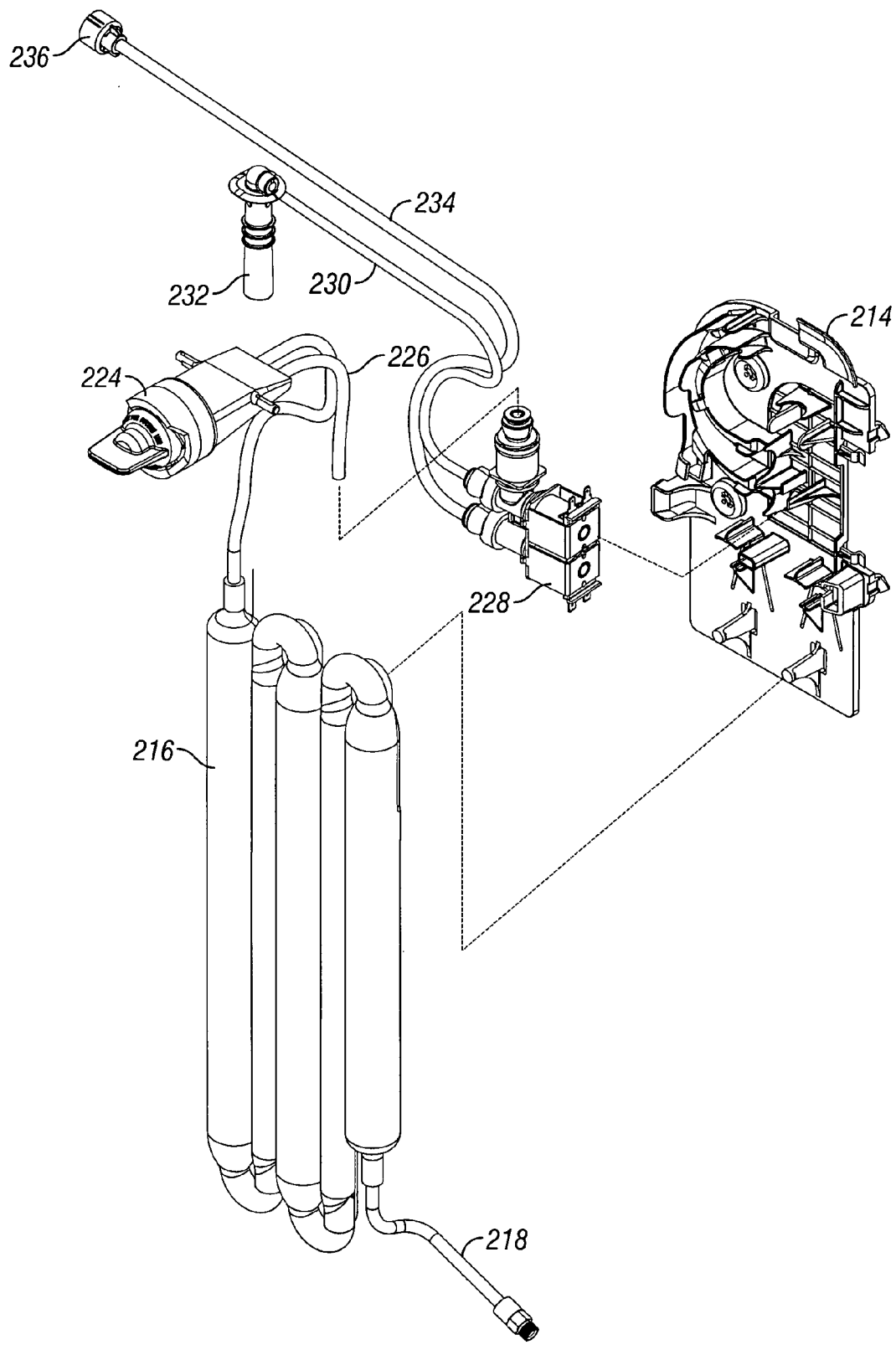
FIG. 29 is an exploded view of the water tank assembly of the present invention.

The fresh food compartment 12 includes a recess or cavity 210 in the rear wall adapted to receive a water valve and tank assembly 212. The water valve and tank assembly 212 is shown in FIGS. 28 and 29. The assembly 212 includes a mounting bracket 214 which is secured in the recess 212 in the back wall of the fresh food compartment 12 in any convenient manner. A water tank 216 is mounted on the bracket 214 and includes a water inlet line 218 and a water outlet line 220. A cover 222 attaches to the rear wall of the fresh food compartment 12 so as to hide the water tank 216 from view when the door 16 of the fresh food compartment 12 is opened.

The water inlet line 218 is connected to a conventional water supply line. The water outlet line 220 is operatively connected to a filter 224. Preferably, the filter 224 is pivotally mounted in the ceiling of the fresh food compartment 12, as disclosed in Applicant's co-pending application Ser. No. 10/195,659, entitled HINGE DOWN REFRIGERATOR WATER FILTER, filed Jul. 15, 2002, which is incorporated herein by reference.

The water filter 220 has an outlet line 226 which is connected to a water solenoid valve 228 mounted on the bracket 214. The valve 228 has a first outlet line 230 leading to the icemaker fill tube 232 and a second outlet line 234 leading to the water dispenser of the refrigerator 10. Line 234 has a fitting 236 which provides a quick connection with a simple ¼ turn, without threads to the water dispenser line in the door 16.

In prior art refrigerators, the water tank is normally located downstream of the water valve and filter, so as to prevent subjecting the water tank to inlet water supply pressures. In this invention, the tank 216 is designed to withstand inlet water supply pressures. The location of the tank 216 in the recess 210 allows greater fresh food storage capacity. Also, the location of the tank 216 upstream from the filter 224 and the valve 228 will reduce the service call rate. The downstream location of the filter 224 also removes plastic tastes associated with the plastic tank 216, and allows chlorinated water to be stored in the tank 216, which prevents microbiological growth on the interior of the water tank 216.

Water Fill Tube

Figure 30:
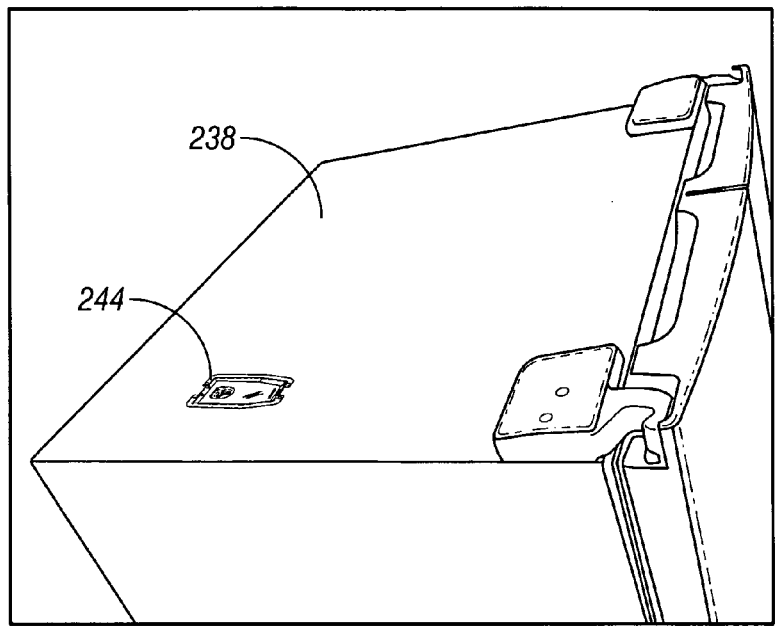
FIG. 30 is a perspective view showing the top of the refrigerator with the water fill tube cup mounted thereon.
Figure 31:
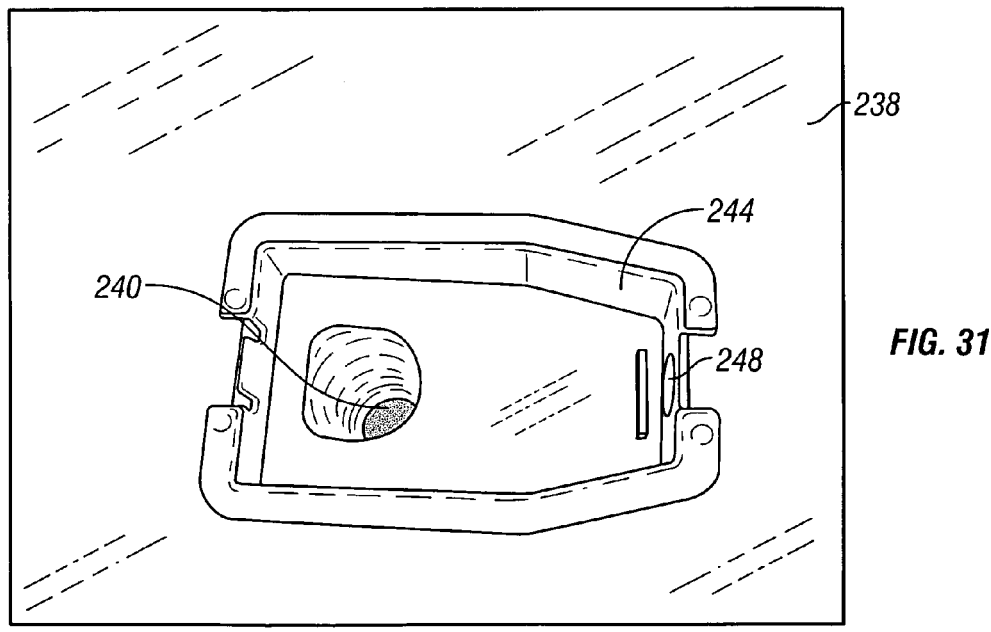
FIG. 31 is an enlarged view of the water fill tube cup showing the vertical hole through which the water fill tube extends.
Figure 32:
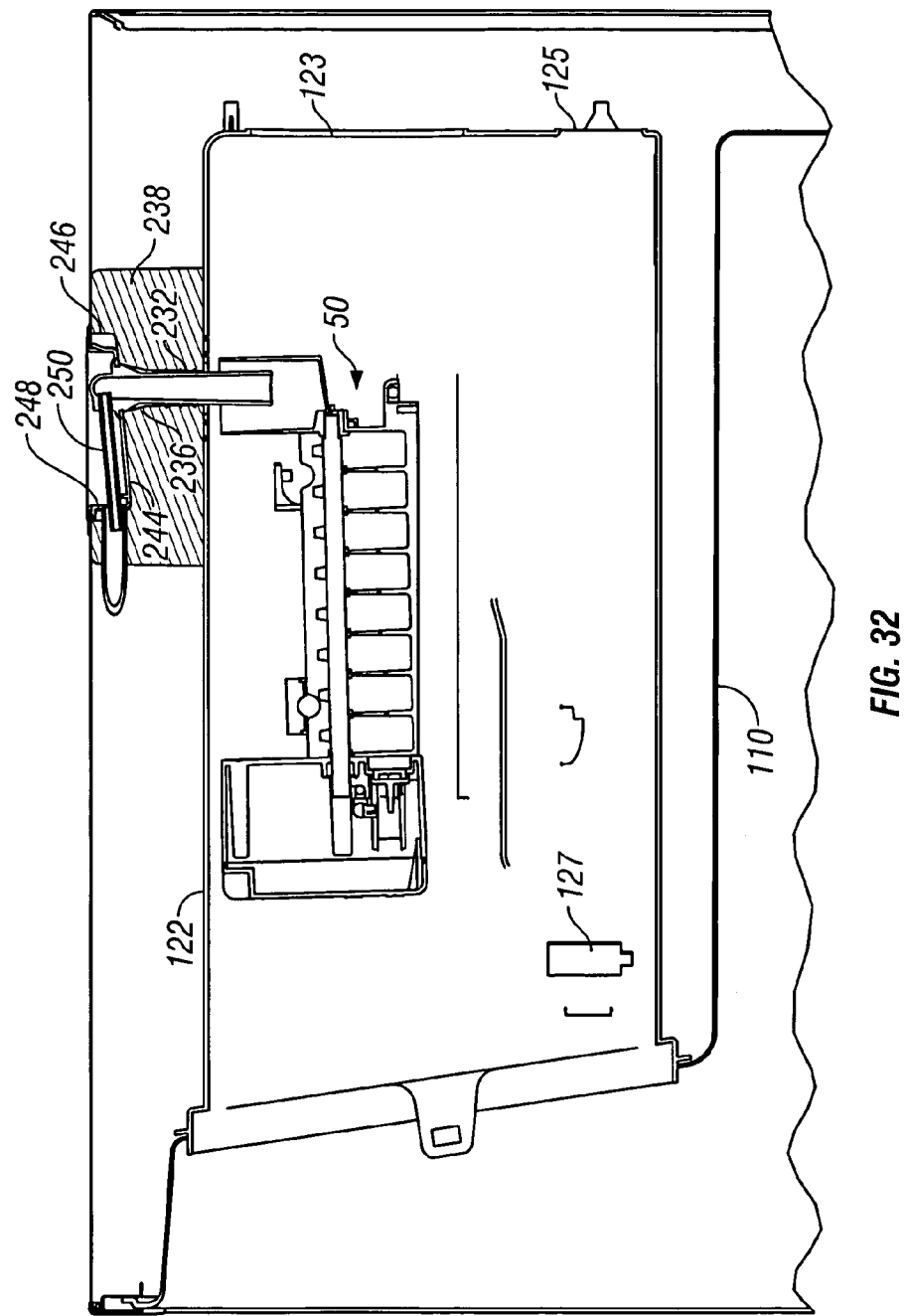
FIG. 32 is a sectional view taking along lines 32-32 of FIG. 31.

Prior art icemaker fill tubes are normally installed in the back of a freezer and run down a sloping tube to the icemaker. As seen in FIGS. 30-32, in the present invention the water fill tube 232 for the icemaker 50 extends downwardly through a vertically disposed hole 236 in the top wall 238 of the refrigerator 10. The fill tube 232 is installed from the top of the refrigerator 10 into a plastic cup 244 positioned within a recess 246 in the top wall 238. The fill tube 232 extends through the insulation in the top wall 238 and into the icemaker 50 in the icemaking compartment 22. The water conduit 230 extends through the foam insulation in the top wall 238 and through an opening 248 in the cup 244 for connection to a nipple 250 on the fill tube 232. The nipple 250 is angled slightly upwardly to prevent dripping. The cup 238 is open at the top so as to expose the fill tube 232 to the ambient air, and thereby prevent freeze-up of the fill tube 232. This vertical orientation allows the fill tube 232 to be positioned closer to the end of the icemaker 50.

Control System Details

The control system of a preferred embodiment of a bottom mount refrigerator with an ice compartment is now described in greater detail. It is to be understood, however, that many of the inventive features of the control system have utility beyond use in conjunction with a bottom mount refrigerator with an ice compartment, and in fact, such features can be used in refrigerators of more conventional design. Thus, what is specifically disclosed herein is not to be unduly limited to any specific embodiment of a refrigerator.

Figure 40A:
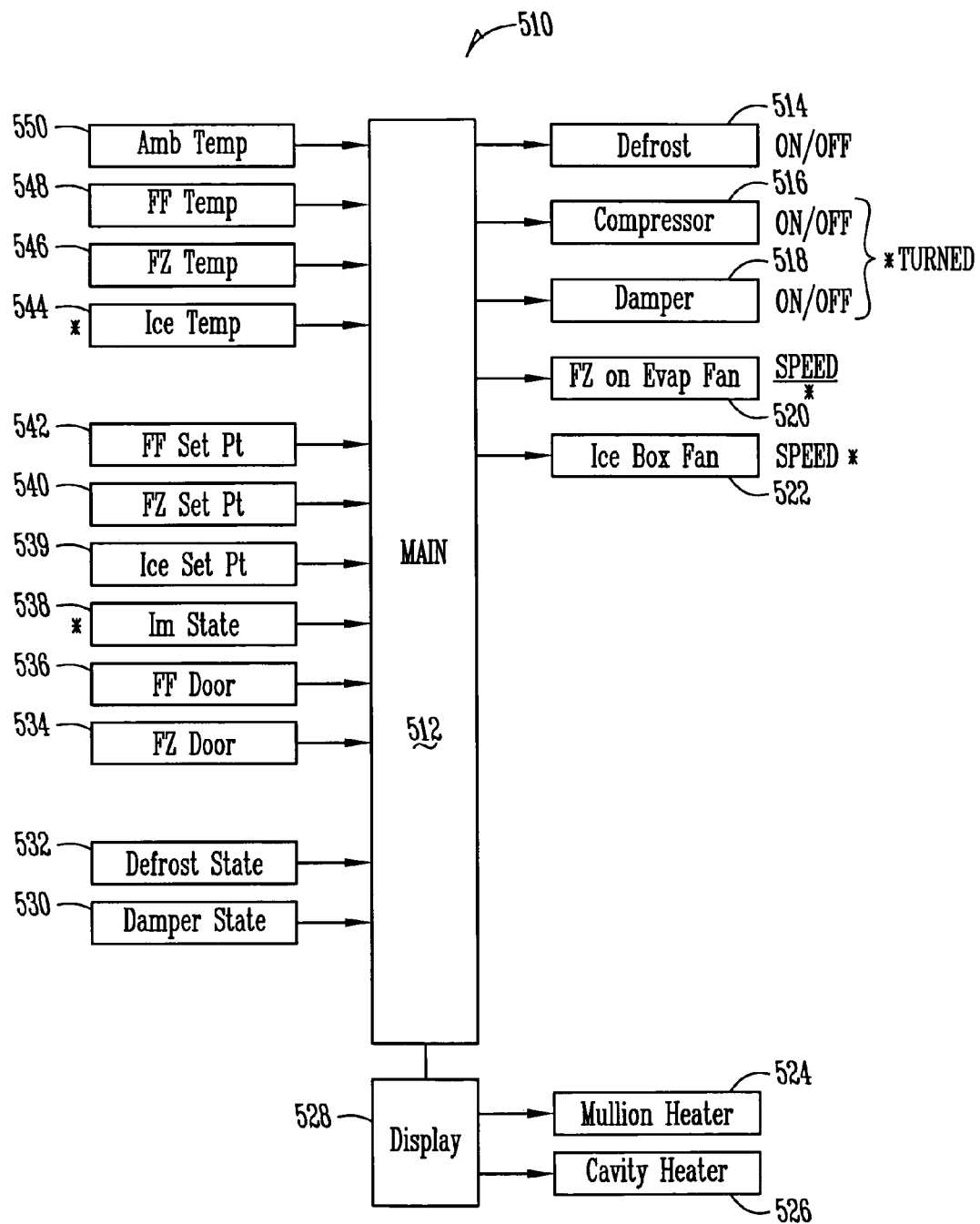
FIG. 40A is a block diagram of one embodiment of a control system according to the present invention.

FIG. 40A illustrates one embodiment of a control system of the present invention suitable for use in a refrigerator having three refrigerated compartments, namely the freezer compartment, the fresh food compartment, and the ice making compartment. The three compartments are preferably able to be set by the user to prescribed set temperatures.

In FIG. 40A, a control system 510 includes an intelligent control 512 which functions as a main controller. The present invention contemplates that the control system 510 can include a plurality of networked or otherwise connected microcontrollers. The intelligent control 512 can be a microcontroller, microprocessor, or other type of intelligent control.

Inputs into the intelligent control 512 are generally shown on the left side and outputs from the intelligent control 512 are generally shown on the right side. Circuitry such as relays, transistor switches, and other interface circuitry is not shown, but would be apparent to one skilled in the art based on the requirements of the particular intelligent control used and the particular devices being interfaced with the intelligent control. The intelligent control 512 is electrically connected to a defrost heater 514 and provides for turning the defrost heater on or off. The intelligent control 512 is also electrically connected to a compressor 516 and provides for turning the compressor 516 on or off. The intelligent control 512 is also electrically connected to a damper 518 and provides for opening or closing the damper 518. The intelligent control 512 is also electrically connected to an evaporator fan 520 associated with the freezer compartment and provides for controlling the speed of the evaporator fan 520. Of course, this includes setting the evaporation fan 520 to a speed of zero which is the same as turning the evaporator fan 520 off. The use of a variable speed fan control is advantageous as in the preferred embodiment, the fan is serving an increased number of compartments with more states (freezer, fresh food, ice maker) and the ice compartment is remote from the freezer compartment.

The intelligent control 512 is electrically connected to an ice box fan 522 and provides for controlling the speed of the ice box fan 522. Of course, this includes setting the ice box fan 522 to a speed of zero which is the same as turning the ice box fan 522 off. The intelligent control 512 also receives state information regarding a plurality of inputs. For example, the intelligent control 512 has a damper state input 530 for monitoring the state of the damper. The intelligent control 512 also has a defrost state input 532 for monitoring the state of the defrost. The intelligent control 512 also has a freezer door input 534 for monitoring whether the freezer door is open or closed. The intelligent control 512 also has a fresh food compartment door input 536 for monitoring whether the fresh food compartment door is open or closed. The intelligent control 512 also has an ice maker state input 538 for monitoring the state of the ice maker. The intelligent control 512 has a freezer set point input 540 for determining the temperature at which the freezer is set by a user. The intelligent control 512 also has an ice maker set point input 539. The intelligent control 512 also has a fresh food compartment set point input 542 for determining the temperature at which the fresh food compartment is set by a user. The intelligent control 512 is also electrically connected to four temperature sensors. Thus, the intelligent control 512 has an ice maker temperature input 544, a freezer compartment temperature input 546, a fresh food compartment input 548, and an ambient temperature input 550. The use of four separate temperature inputs is used to assist in providing improved control over refrigerator functions and increased energy efficiency. It is observed that the use of four temperature sensors allows the ice maker temperature, freezer compartment temperature, fresh food compartment temperature, and ambient temperature to all be independently monitored. Thus, for example, temperature of the ice box which is located remotely from the freezer can be independently monitored.

The intelligent control 510 is also electrically connected to a display control 528, such as through a network interface. The display control 528 is also electrically connected to a mullion heater 524 to turn the mullion heater 524 on and off. Usually a refrigerator has a low wattage heater to supply heat to where freezing temperatures are not desired. Typically these heaters are 120 volt AC resistive wires. Due to the fact that these heaters are merely low wattage heaters, conventionally such heaters remain always on. The present invention uses a DC mullion heater and is adapted to control the DC mullion heater to improve overall energy efficiency of the refrigerator and increase safety.

The display control 528 is also electrically connected to a cavity heater 526 for turning the cavity heater 526 on and off. The display control 528 is preferably located within the door and is also associated with water and ice dispensement. Usually a refrigerator with a dispenser with a display on the door will also have an associated heater on the door in order to keep moisture away from the electronics of the dispenser. Conventionally, this heater is continuously on.

It is to be observed that the control system 510 has a number of inputs and outputs that are not of conventional design that are used in the control of the refrigerator. In addition, the control system 510 includes algorithms for monitoring and control of various algorithms. The algorithms used, preferably provide for increased efficiency while still maintaining appropriate temperatures in the ice maker, fresh food compartment, and freezer.

Figure 40B:
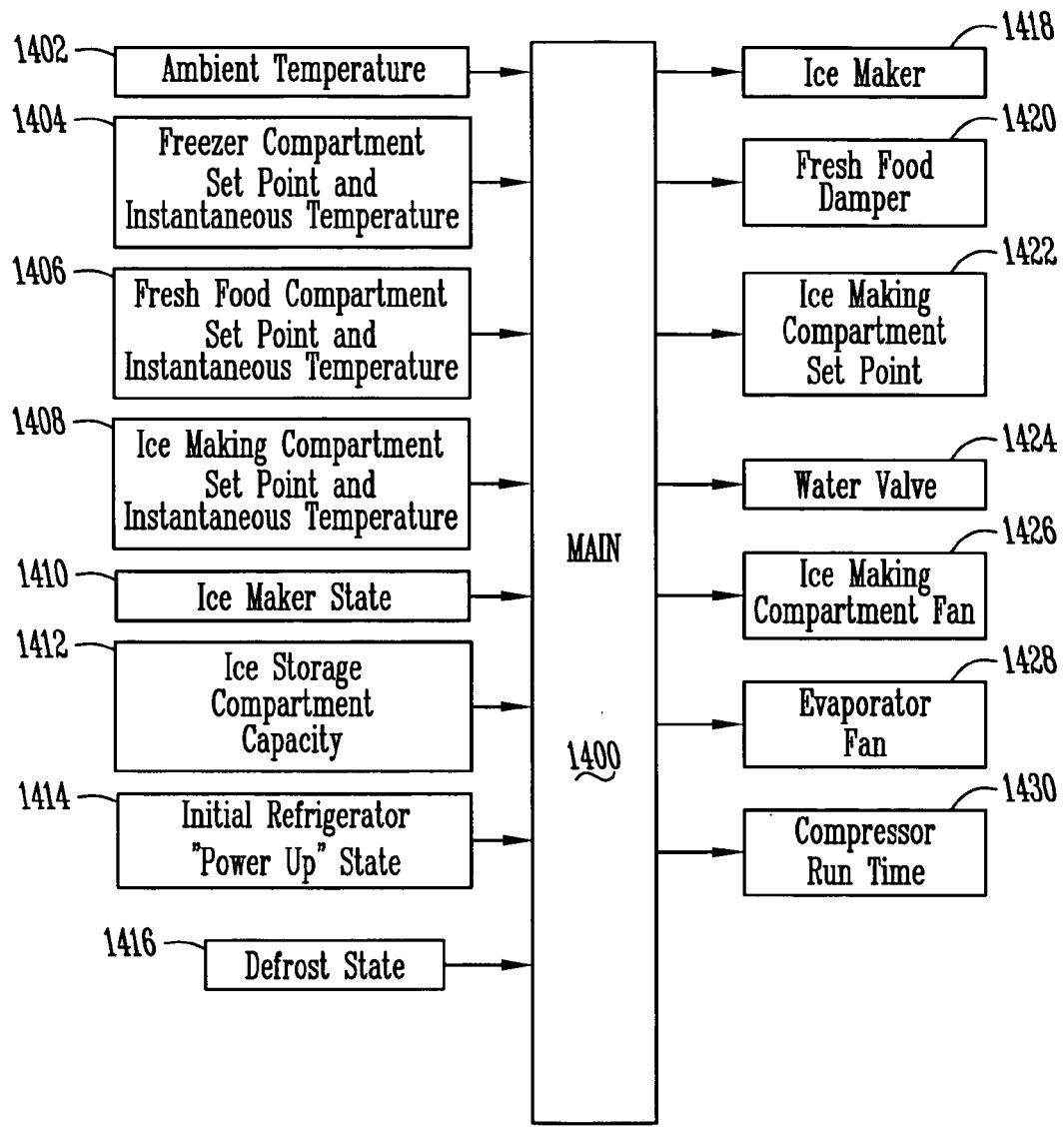
FIG. 40B is a block diagram of another embodiment of a control system according to the present invention.

FIG. 40B illustrates another embodiment of a control system of the present invention. The control system seeks to maintain a balance between optimum ice production and the requirements of the fresh food and freezer compartments. This is achieved via the following inputs operatively connected to the main 1400: ambient temperature 1402; freezer compartment set point and instantaneous temperature 1404; fresh food compartment set point and instantaneous temperature 1406; ice making compartment set point and instantaneous temperature 1408; ice maker state 1410; ice storage compartment capacity 1412; initial refrigerator "power up" state 1414; and defrost state 1416. These inputs are used to control the following outputs: ice maker 1418; fresh food damper 1420; ice making compartment set point 1422; water valve 1424; ice making compartment fan 1426; evaporator fan 1428; and compressor run time 1430.

Based on the requirements of the system, these output functions are prioritized to seek the best solution to the heat removal rate for cooling/ice production systems as described below:

1. Multiple Pre-Set Non User-Adjustable Ice Making Compartment Set Points
   a. Set Point for Pull Down mode. This condition is met when the refrigerator is first turned on (new unit or if unit has been in storage). In this mode, the temperature inside of the ice making compartment is ignored for a pre-set length of time thus allowing maximum heat removal from the fresh food and subsequently results in it reaching of set point temperature more rapidly.
   b. Set Point for Emergency or "Melt" modes. This condition is met when the ice making compartment warms above a predetermined maximum and seeks to maximize the heat removal rate.
   c. Set Point for ice maker turned off mode. This condition is met when the ice maker is turned off and seeks to minimize the heat removal rate from the ice making compartment for optimum ice storage temperature.
   d. Set Point for ice maker turned on mode. This condition is met when the ice maker is turned on and the ice storage bin is full. This condition seeks to minimize the heat removal rate when the bin is full and maximize it very quickly when the bin requests additional ice production (see item d).
   e. Set Point for ice maker turned on mode. This condition is met when the ice maker is turned on and the ice storage bin requests additional ice production. In this mode, the heat removal rate is maximized which may or may not result in the ice making compartment temp being significantly less than the set point temperature.
2. Ice Storage Bin Full Based on Last Time of Harvest
   a. This condition is met when the ice maker is turned on. The control system keeps track of time beginning at the end of the last ice maker harvest. Based on this time interval, the control determines whether or not the ice bin still requesting additional ice production or is full. If the bin is full, the system changes from a maximum heat removal to a lesser rate thus allowing more heat removal from the freezer and fresh food compartments.
3. Ice Maker Harvest Mode
   a. This condition is met when the ice maker is on and the control system recognizes that the ice maker is beginning the harvest mode. Based on this information, the ice making compartment fan turns off and the fresh food damper opens. This operation stops the heat removal process in the ice making compartment and optimizes the ice maker harvest time. Additionally, by opening the fresh food damper, heat is removed from this compartment which optimizes its temperature.
4. Heat Removal Capacity in the Ice Making Mode
   a. This condition is met when the ice maker is on. In this mode, the control recognized the need for optimum heat removal from the ice making compartment. In this mode, the need for optimum heat removal rate is recognized which may or may not result in the freezer compartment temperature being significantly less than the set point temperature.
   b. After the ice production mode is satisfied, the freezer heat removal rate returns to the non-ice production mode.
5. Multiple Speed For the Ice Making Compartment Fan Based on Fresh Food, Freezer, and Ice Making Compartment
   a. This condition is met when the ice maker is on or off. In this mode, the fan can run at two different speeds based on the requirement for ice production or ice storage:
      i. Ice production, temp set point a: Fan maintains optimizes speed for this requirement
      ii. No requirement for ice, temp set point b: Fan optimizes speed for this requirement.
      iii. No requirement for ice, temp set point c: Fan optimizes speed for this requirement.
      iv. Ice making compartment "emergency mode", temp set point d: Fan optimizes speed for this requirement.
6. Ice Making Compartment Fan Used to Cool the Fresh Food Compartment
   a. This condition is met when the ice maker is on or off. In this mode, the fresh food compartment is above the temperature set point. In this mode, the fresh food damper opens and the fan goes to optimum speed for the required heat removal rate. After the fresh food temperature set point is satisfied, the damper closes, and the fan returns to the optimum speed for heat removal rate in the ice making compartment. Note that this type of system eliminates the need for both a second fan and second damper for the fresh food compartment. This serves to greatly simplify the design of the associated air channels, component wiring, electronic hardware, and software.

The ice maker state affects the fresh food and freezer via the ice making compartment's heat removal rate requirement. There are three main states that the ice maker and system operate in: (1) the ice maker is turned off; (2) the ice maker is turned on and the ice storage area is requesting ice production; and (3) the ice maker is turned on and the ice storage area is not requesting ice production.

When the ice maker is turned off, the ice making compartment control selects the "ice storage" mode where the heat removal rate is optimized. This mode increases the heat removal capacity available for the other compartments.

The ice maker is turned on and the ice storage area is requesting ice production. The control system seeks to optimize the heat removal rate for ice production. This results in a high rate of heat removal in the ice making compartment and a reduced amount of heat removal capacity available for the other compartments. The end result is an increased compressor run time to cool the freezer and an increased air damper open period to cool the fresh food.

When the ice maker is turned on and the ice storage area is not requesting ice production, this results in a combination of low and high heat rate removals. The requirement is based on the ice storage area requesting ice production or not.

The ice maker state affects the damper and evaporator fan. During the harvest mode, when the ice maker begins its harvest cycle, the fresh food damper routes the supply air away from the ice maker and into the fresh food compartment. In addition, the evaporator fan continues to run which allows the control system to keep the compressor running. After the ice maker completes the ice harvest, the ice maker state affects the damper and evaporator fan. In particular, the fresh food damper closes and redirects the supply air for ice production and the evaporator fan continues to run.

Another aspect of the control system of the present invention provides for synchronization.

The methodology reduces or eliminates non-uniform temperature patterns and produces consistent power consumption patterns during non-transient usage in a chilling and/or freezing device with more than one compartment.

This is accomplished by making the logic controlling a slave chilled compartment a function of both the chilled compartment sensed temperature and primary chilled compartment cooling device (compressor state (ON/OFF)). Namely, when the compressor turns ON, the slave chilled compartment would also be cooled unless the slave chilled compartment temperature was lower than the lower temperature threshold (cut out). Likewise, when the compressor turns OFF, the slave chilled compartment would also stop cooling unless the slave chilled compartment temperature was higher than the upper temperature threshold (cut in). The slave chilled compartment would eventually be synchronized with the compressor cycles, so that every compartment employing this algorithm would attempt to cool down during the time when the compressor is on.

Figure 41:
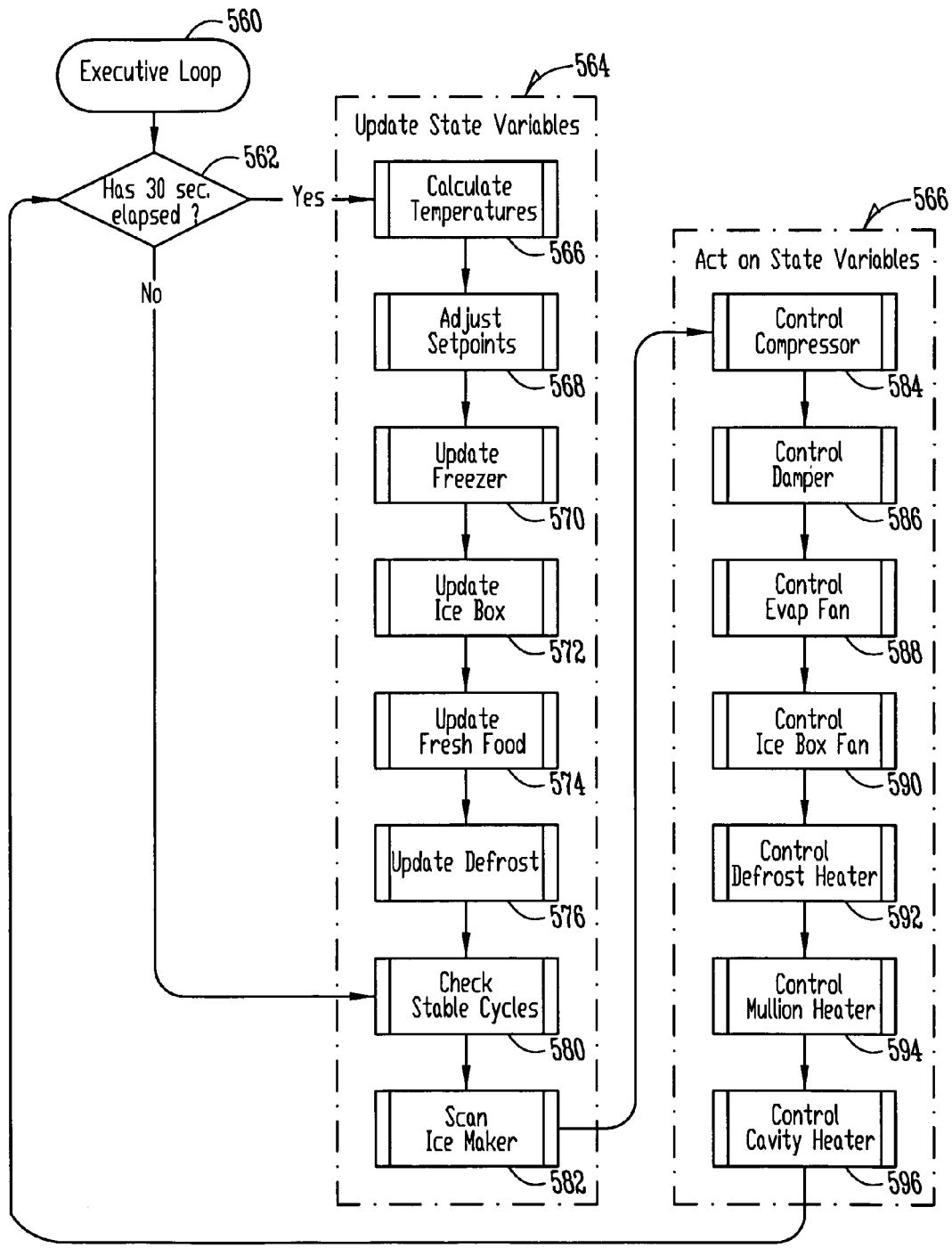
FIG. 41 is a flow diagram of an executive loop according to one embodiment of the present invention.

FIGS. 41-54 provide an exemplary embodiment of the present invention showing how the control system sets the states and controls refrigerator functions based on those states, including states associated with the fresh food compartment, freezer compartment, and ice maker compartment. FIG. 41 is a flow diagram providing an overview of one embodiment of the present invention. In FIG. 41, an executive loop 560 is shown. In step 562 a determination is made as to whether a set time period (such as 30 seconds) has elapsed. If so, then a set of steps 564 are performed to update state variables. These state variables are updated through a calculate temperatures subroutine 566, an adjust setpoints subroutine 568, an update freezer subroutine 570, an update ice box subroutine 572, an update fresh food compartment subroutine 574, an update defrost subroutine 576, a check stable cycles routine 580, and a scan ice maker subroutine 582. Once the state variables are updated, then there are a set of control subroutines 566 which act on the state variables. These control routines include a control compressor subroutine 584, a control damper subroutine 586, a control evaporator fan subroutine 588, a control ice box fan subroutine 590, and a control defrost heater subroutine 592.

As shown in FIG. 41 the status of the state variables are regularly updated in the set of steps 564. After the state variables are updated, appropriate actions are performed to control refrigerator functions.

Figure 42:
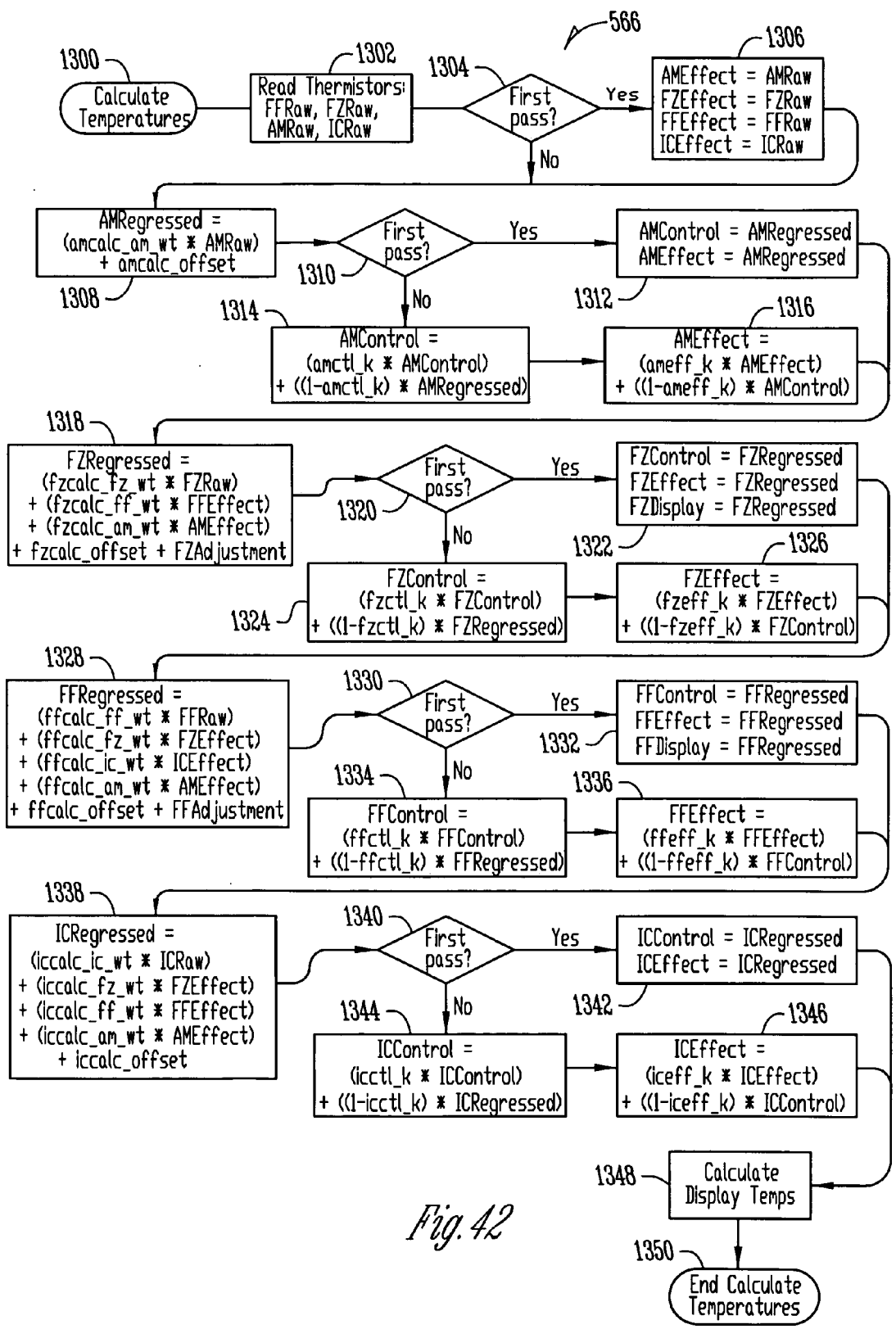
FIG. 42 is a flow diagram of a calculate temperatures subroutine according to one embodiment of the present invention.

The calculate temperatures subroutine 566 is shown in greater detail in FIG. 42. In one embodiment, each compartment's temperature and the ambient temperature are measured with thermistors to provide raw data. Regressed temperatures are calculated based in part on the raw temperatures.

According to one embodiment of the present invention, a mathematic regression method is used to calculate the desired performance temperatures in each compartment using a single temperature sensing device in each compartment resulting in a correlation. The sensing device is located in a way that is preferred or reasonable for product assembly requirements, but the correlation allows the control to evaluate the product performance considering the approximated performance temperatures in each compartment. The approximated performance temperatures are developed based on the criteria that would be considered by a typical consumer: the average temperatures of multiple locations throughout a compartment. The correlation can further be mathematically manipulated to represent a variety of food stuffs of various mass and density. This allows the control to react in a manner that optimizes the food preservation function for food stuff types stored in each designated compartment type.

The correlation is arrived at by testing product in variety of environments and usage conditions monitoring the temperatures at the sensor locations and multiple other locations in each compartment and all other compartments simultaneously. Other thermal in influences such as ambient conditions or machine compartment conditions may also be included. A mathematic correlation is then calculated determining the best fit for each temperature sensor location using some or all of the significant contributing measurements made from the multiple locations of interest in the correlated compartment and the temperature sensing locations used in other compartments. Correlations from a first compartment may be used as contributing factors in other compartments completing a system correlation.

The correlations may be mathematically weighted by considering the most recent value calculated or measured as only a fraction of the full running weighted value for a given compartment temperature. In fact multiple weighting values may be calculated to achieve different approximations of temperatures associated with food stuffs due to varied mass and densities. Additional weighting values may be desirable for other functions such as displayed temperature, other correlations, special performance modes, or historical average data storage.

The present invention uses these correlations and weighting concepts in three compartments using four specific sensor locations. Some or all of these temperature locations, their compartment correlations, and some correlations or sensor readings and weighting of the associated values are used to calculate the performance temperatures for each compartment. A freezer sensor is located on the back side of the evaporator cover. A refrigerator sensor is located inside the fresh food light housing assembly on the upper fresh food liner surface. An ice box sensor is located in the rear of the ice making compartment. An ambient temperature sensor is located behind the dispenser user interface face plate. These system sensors, correlations, and weights are used to improve product performance in a variety of ambient conditions. They are used to improve temperature stability and food preservation. They are also used to improve energy performance and product diagnostics.

In step 1300 of the method 566 of FIG. 42, temperatures are calculated and raw temperatures are read from each of four temperature sensors—one in the fresh food compartment (FFRaw), one on the freezer (FZRaw), one for providing an ambient temperature (AMRaw), and one associated with an icemaker (ICRaw). In step 1304, a determination is made as to whether or not this is the first pass through the algorithm. If it is, then in step 1306 value AMEffect is set to AMRaw, FZEffect is set to FZRaw, FFEffect is set to FFRaw, and ICEffect is set to ICRaw. In step 1308, the ambient temperature is regressed to provide AMRegressed. Note that a weighting (amcalc-am-wt) and an offset (am calc-offset) are used. Step 1310 determines if this is the first pass. If it is, then in step 1312, AMControl is set to AMRegressed and AMEffect is set to AMRegressed for initialization purposes. Returning to step 1310, if it is not the first pass, then in step 1314, AMControl is set based on the current value of AMControl, AMRegressed, and a constant am ctl_K. Then in step 1316, AMEffect is set based on the current value of AMEffect, AMControl, and a constant, ameff_K.

Next, in step 1318, a regressed temperature for the freezer, FZRegressed, is calculated based on weighting (fzcalc_fz_wt, fzcalc_ff_wt, fzcalc_am_wt) of a temperature associated with the freezer (FZRaw), the effective fresh food temperature (FFEffect) and the effective ambient temperature (AMEffect). An offset (fzcalc_offset) and an adjustment (FZAdjustment) are used in calculating the regressed temperature for the freezer.

In step 1320, a determination is made as to whether this is the first pass. If it is, then FZControl, FZEffect, and FZDisplay temperatures are set to the regressed temperature (FZRegressed). If this is not the first pass, then in step 1324, a freezer control temperature (FZControl) is set based on the current FZControl, FZRegressed and a constant, fzctl_K. Then in step 1326, FZEffect is calculated based on the current FZEffect, FZControl, and a constant, fzeff_K.

Temperatures associated with the fresh food compartment are calculated in steps 1328, 1330, 1332, 1334, and 1336 in a manner similar to those of the freezer compartment. Similarly temperatures associated with the ice maker compartment are calculated in steps 1338, 1340, 1342, and 1348. Display temperatures are calculated in step 1348 and the algorithm and in step 1350.

Figure 43:
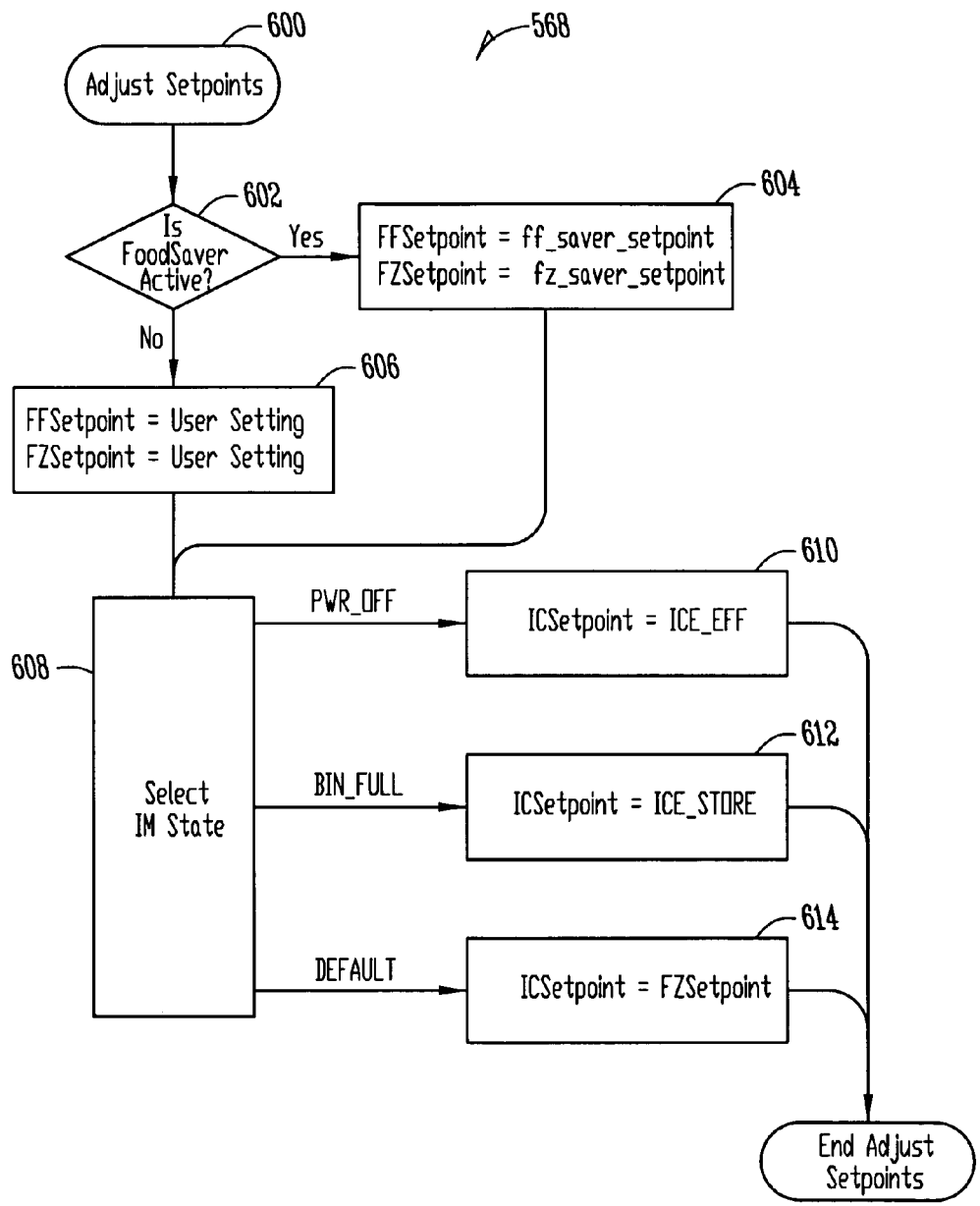
FIG. 43 illustrates one embodiment of a flow diagram for the adjust setpoints subroutine.

FIG. 43 illustrates a flow diagram for the adjust setpoints subroutine 568. The user selects set points for the fresh food compartment (FFSetpoint) and the freezer compartment (FZSetpoint). Based on the user settings, or other settings if a food saver feature is active (ff_saver_setpoint, fz_saver_setpoint), an ice maker set point (ICSetpoint) is set. Under default conditions (DEFAULT) the ice maker set point (ICSetpoint) is the same as the freezer set point (FZSetpoint). If the ice maker's bin is full (BIN_FULL), then the ice maker's set point (ICSetpoint) is set at a lower temperature to maintain the ice and prevent melting. If the ice maker is turned off, then the ice maker's set point is set at a higher temperature (ICE_EFF) thereby providing an efficiency mode to thereby conserve energy. For example, it is generally expected that the ice maker's set point for storage (ICE_STORE) is less than the ice maker's temperature when the power is off such as in an energy efficient mode of operation (ICE_EFF), which is less than the temperature required to melt ice. For example, the ice storage temperature (ICE_STORE) may be around 15 degrees Fahrenheit while the ice maker's efficiency temperature (ICE_EFF) is 25 degrees. Ice might begin to melt at a temperature of 28 degrees Fahrenheit.

Thus, in step 602 a determination is made as to whether the food saver function is active. If it is, then in step 604, the set point for the fresh food compartment (FFSetpoint) is set accordingly to ff_saver_setpoint. Also, the set point for the freezer compartment (FZSetpoint) is set accordingly to fz_saver_setpoint and then the subroutine proceeds to select the ice maker state in step 608. Returning to step 602, if the food saver function is not active, then in step 606, the fresh food set point (FFSetpoint) is set to a user selected temperature setting and the freezer set point (FZSetpoint) is set to a user selected temperature setting.

In step 608, the ice maker state is selected. If the ice maker state is turned off (PWR_OFF) to conserve energy, then the ice maker's set point (ICSetpoint) is set to an energy efficient temperature less than the melting point (ICE_EFF) in step 610. If the ice maker state indicates that the ice bin is full (BIN_FULL) then the ice maker's set point (ICSetpoint) is set to an ice storage temperature (ICE_STORE) in step 612. If the ice maker state is the default state (DEFAULT) then the ice maker's set point (ICSetpoint) is set to the freezer set point (FZSetpoint).

Figure 44A:
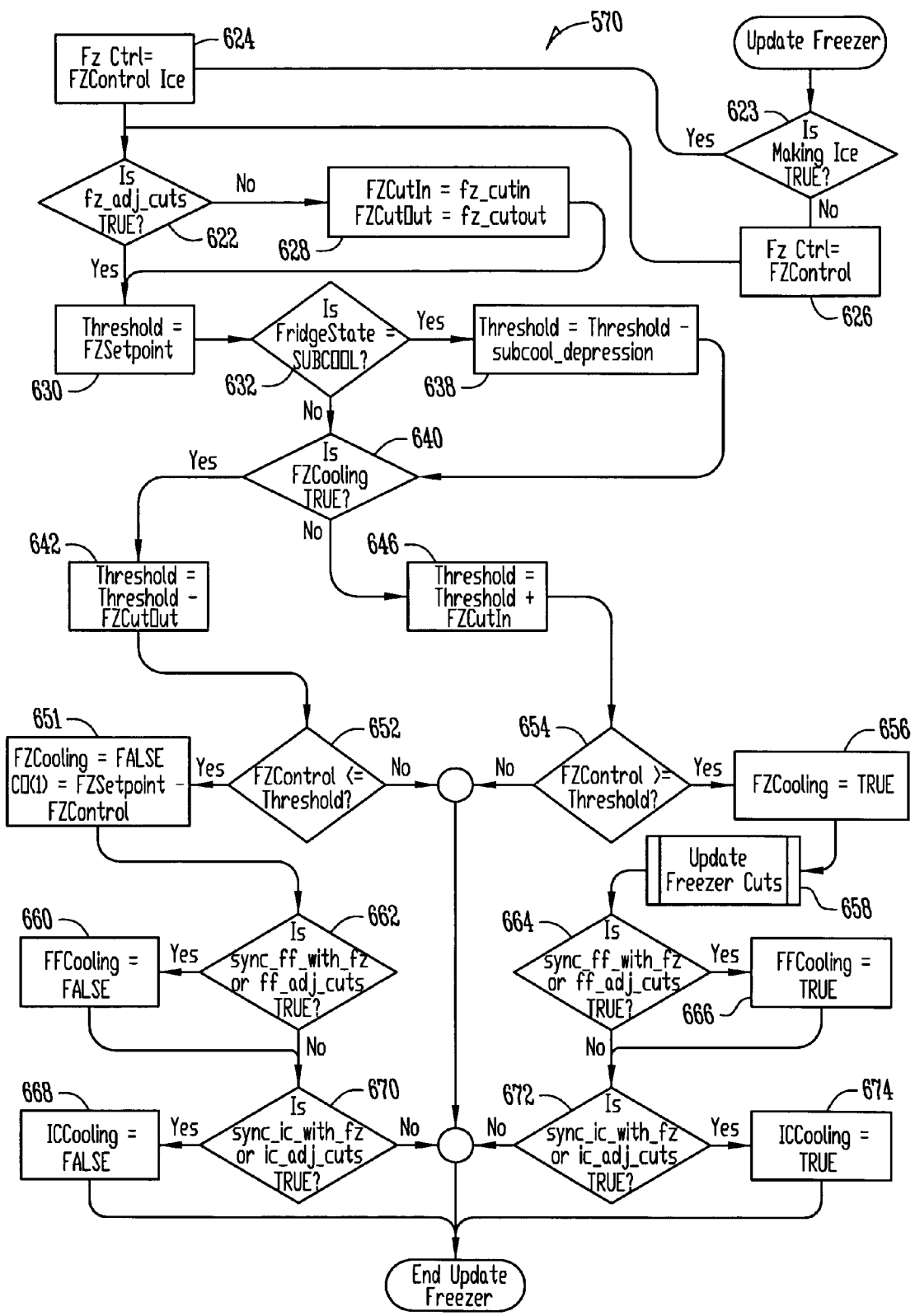
FIG. 44A illustrates one embodiment of a flow diagram for the update freezer subroutine.

FIG. 44A is a flow diagram illustrating one embodiment of the update freezer subroutine 570. The update freezer subroutine assists in increasing the energy efficiency of the appliance because instead of merely turning on the freezer when temperature reaches a particular setpoint, the update freezer subroutine also considers the states of the fresh food compartment and ice maker and how ultimately temperature will be affected over time. The update freezer routing is used to set states associated with the freezer, fresh food compartment and ice maker. In step 622 the fz_adj_cuts state is determined. If true then in step 630, the threshold is set to the freezer set point (FZSetpoint). If in step 622, the fz_adj_cuts state is not true, then in step 628, the freezer cut-in temperature (FZCutIn) is set to fz_cutin and the freezer cut-out temperature is set to fz_cutout. Then in step 630, the threshold is set to the freezer set point (FZSetpoint).

In step 632 a determination is made as to whether the refrigerator state (FridgeState) is set to a sub-cool state (SUBCOOL). If it is, then in step 638, the Threshold is set to the difference of the Threshold and the subcool_depression. Then in step 640, a determination is made as to whether the freezer is in the freezer cooling (FZCooling state). If it is, then in step 642, the Threshold is set to be the difference between the Threshold and the freezer cut-out temperature (FZCutOut). Then in step 652, a determination is made whether the freezer control temperature (FZControl) is less than or equal to the threshold temperature (Threshold). If it is, then in step 654, the freezer cooling condition (FZCooling) is set to be FALSE and the first cut-out temperature, CO(1), is set to the difference of the freezer setpoint (FZSetpoint) and the freezer control temperature (FZControl). Next in step 662, a determination is made as to whether the synchronize fresh food compartment with freezer (sync_ff_with_fz) or fresh food adjust cuts (ff_adj_cuts_states are TRUE. If one of these states are true, then in step 660, the fresh food cooling state (FFCooling) is set to be FALSE. If, however, neither of these states are true, in step 670, a determination is made as to whether the synchronize ice maker with freezer (sync_ic_with_fz) or ice maker adjust cuts (ic_adj_cuts) states are true. If one of these states is true, then in step 668, the ice maker cooling state (ICCooling) is set to FALSE.

Returning to step 650, if the freezer cooling state (FZCooling) is not set, then in step 646, the threshold (Threshold) is set to be the sum of the threshold (Threshold) and the freezer cut-in temperature (FZCutin). Then in step 648, a determination is made as to whether the threshold (Threshold) is greater than the sum of freezer's maximum set point (fz_max_setpoint) and the maximum freezer change (MAX_FZ_DELTA) divided by two. If it is, then in step 650, the threshold (Threshold) is set to be the sum of the freezer's maximum set point (fz_max_setpoint) and the maximum freezer change (MAX_FZ_DELTA) divided by two. Then in step 654 a determination is made as to whether the freezer control temperature (FZControl) is greater than or equal to the threshold (Threshold). If it is, then in step 656 the freezer cooling state (FZCooling) is set to be TRUE. Then in step 658, the Update Freezer Cuts subroutine is executed. Next in step 664, a determination is made as to whether the synchronize fresh food compartment with the freezer compartment state (sync_ff_with_fz) or the fresh food adjust cuts state (ff_adj_cuts) state is true. If it is, then in step 666 the fresh food cooling state (FFCooling) is set to be true. Then in step 672, a determination is made as to whether the synchronize ice maker with freezer state (sync_ic_with_fz) or the ice maker adjust cuts (ic_adj_cuts) states are true. If they are, then in step 674, the ice maker cooling state (ICCooling) is set to be true.

Figure 44B:
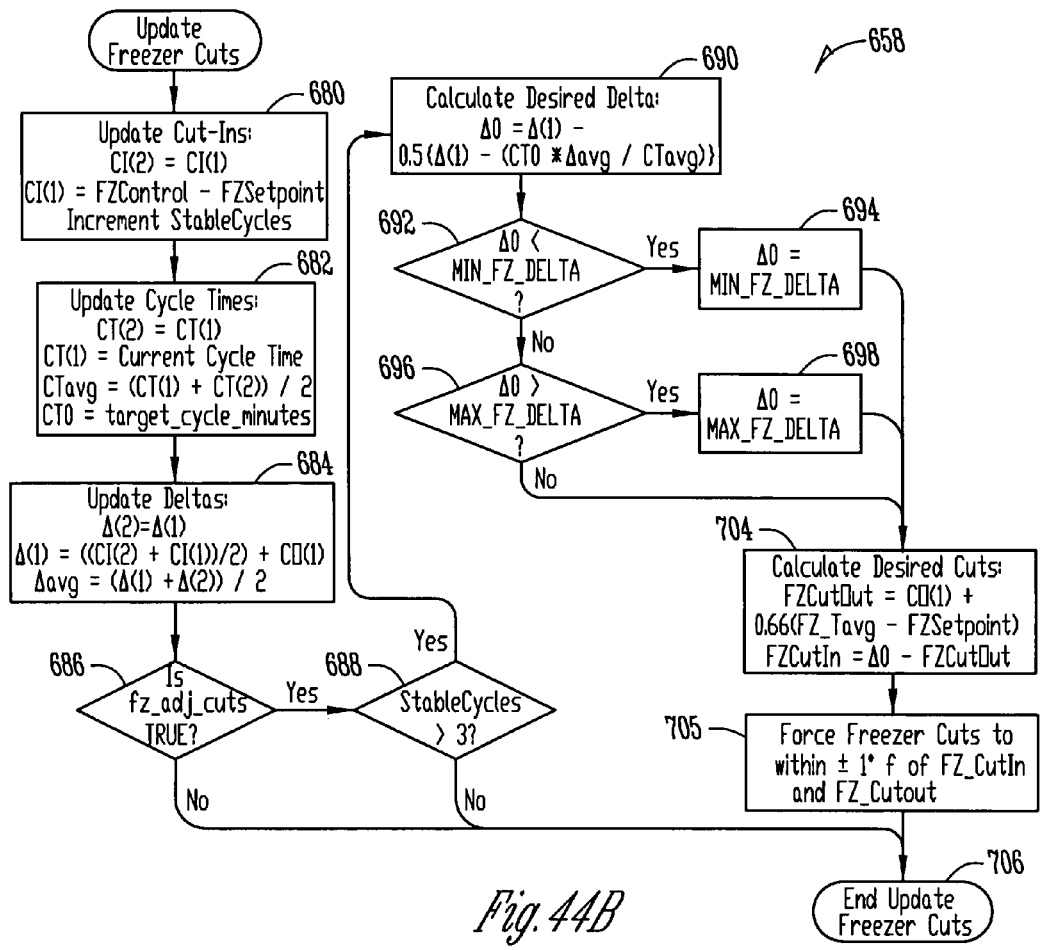
FIG. 44B illustrates one embodiment of a flow diagram for the update freezer cuts subroutine.

FIG. 44B provides an illustration of one algorithm for an update freezer cuts subroutine. Generally, the present invention provides for adjusting cuts through an algorithm which improves energy efficiency of a compartment(s) cooling system and improves temperature control of chilled compartment(s) to a desired average temperature (set-point).

This is accomplished by:
(1) Adjusting the temperature thresholds of an on/off cooling system to produce a repeating cyclic pattern of control at a desired frequency. Namely, when a cooling system has operated in a stable pattern for a length of time as to be thought of as non-transient operation the algorithm will widen or compress the delta between the thresholds periodically to target a pre-determined frequency of on/off for the cooling system. The system is protected from affecting the thresholds adversely by limiting the change to between max and min deltas specified by the algorithm.
(2) Adjusting the temperature thresholds of an on/off cooling system to produce a repeating cyclic pattern of control about a desired average temperature (set-point). Namely when a cooling system has operated in a stable pattern for a length of time as to be thought of as non-transient operation, the algorithm will shift both the upper and lower thresholds as to target the calculated average of the last stored cycle and the set-point to be equal. The system is protected from affecting the thresholds adversely by limiting the magnitude of the change for each adjustment made.

FIG. 44B is a flow diagram illustrating one embodiment of the update freezer cuts subroutine 658. In step 680, the cut-in temperatures are updated by setting the second cut-in temperature, CI(2), to be equal to the first cut-in temperature, CI(1). The first cut-in temperature, CI(1), is then set to be equal to the difference of the freezer control temperature (FZControl) and the freezer setpoint (FZSetpoint). Also the stable cycles variable (StableCylces) is incremented. Next in step 682, the cycle times are updated by setting the second cycle time, CT(2), to be equal to the first cycle time, CT(1). The first cycle time, CT(1), is then set to the current cycle time. The average cycle time (CTavg) is then computed as the average of the first cycle time, CT(1), and the second cycle time, CT(2). The CT0 is set to be target cycle minutes (target_cycle_minutes).

Next in step 686, a determination is made as to whether the freezer adjust cuts state (fz_adj_cuts) is true. If it is, then in step 688, a determination is made as to whether there are more than three stable cycles (StableCycles). If there are, then in step 690, the desired delta is calculated from the deltas and the cut-out temperatures as shown. The bounds of the calculated desired delta are then checked in steps 692-698. In step 692, a determination is made as to whether $\Delta(0)$ is less than the minimum freezer delta (MIN_FZ_DELTA). If it is, then in step 694, $\Delta(0)$ is set to be the minimum freezer delta (MIN_FZ_DELTA). If it is not, then in step 696, a determination is made as to whether $\Delta(0)$ is greater than the maximum freezer delta (MAX_FZ_DELTA). If it is, then in step 698, $\Delta(0)$ is set to be the maximum freezer delta (MAX_FZ_DELTA). In step 704, the desired freezer cut-out temperature (FZCutOut) and the desired freezer cut-in temperature (FZCutIn) are set.

Then in step 684, the deltas are updated accordingly. In particular, $\Delta(2)$ is set to $\Delta(1)$. Also, $\Delta(1)$ is set to be the sum of the average of CI(1) and CI(2) and CO(1). Also, $\Delta avg$ is set to be the average of $\Delta(1)$ and $\Delta(2)$.

Figure 44C:
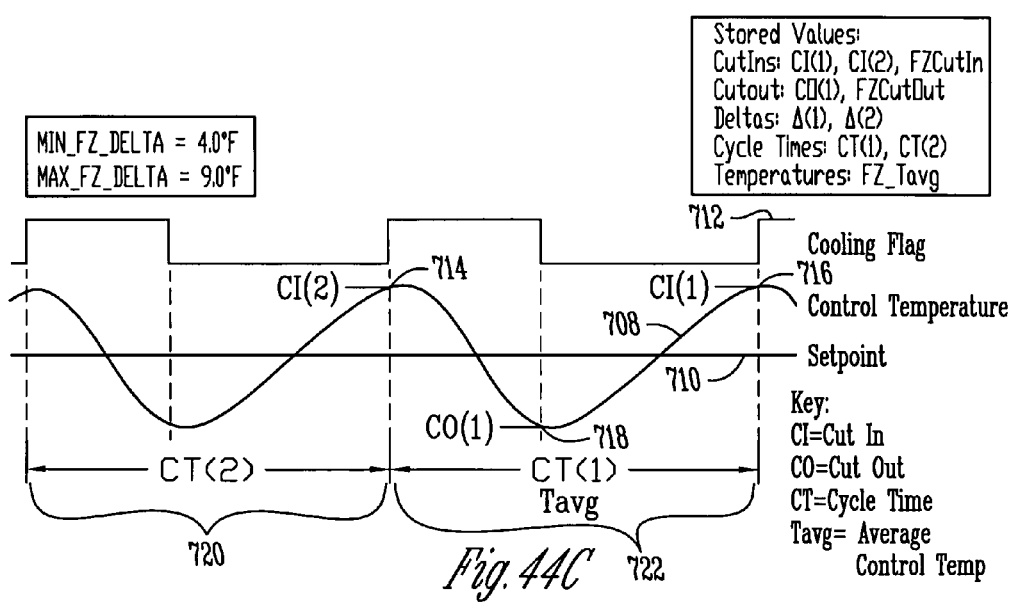
FIG. 44C illustrates relationships between the cooling flag, control, temperature, setpoint, cut-ins, cut-outs, and cycle time for the update freezer cuts subroutine.

FIG. 44C shows the relationship between the cooling state or flag 712, and the control temperature 708 over time. Note that at point 716, CI(1), the cooling state of flag 712 cuts in, at point 714, CI(2), the cooling state or flag also cuts in, at point 718, CO(1), the cooling state or flag cuts out. For cycle CT(1) 722 there is an associated average control temperature (Tavg) and for cycle CT(2) 720 there is an associated average control temperature (Tavg).

Figure 45A:
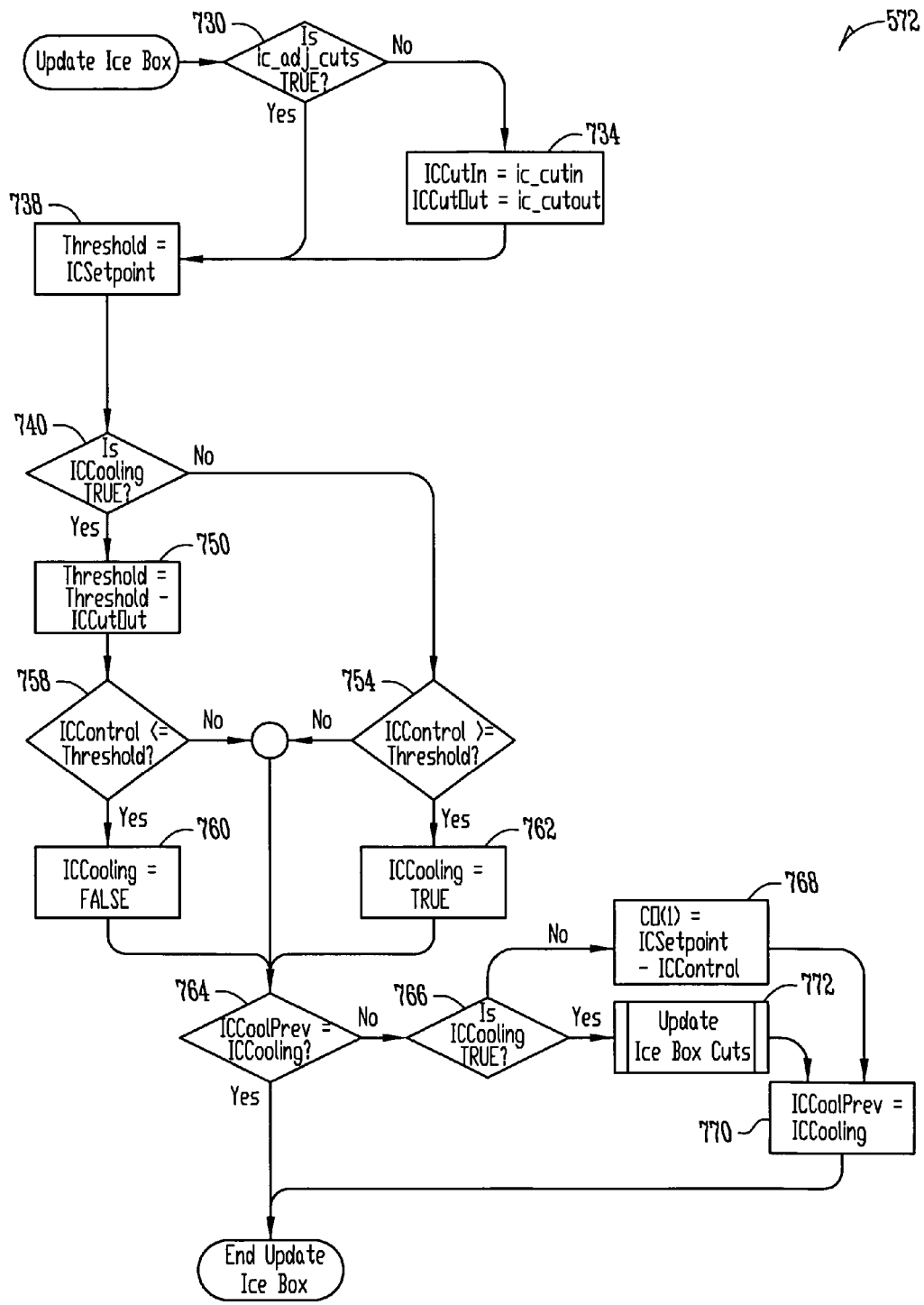
FIG. 45A illustrates one embodiment of a flow diagram for the update ice box subroutine.

FIG. 45A illustrate one embodiment of the update ice box subroutine 572. In FIG. 45A, a determination is made in step 730 as to whether the icemaker adjust cuts state (ic_adj_cuts) is true. If not, then in step 734, the ice maker cut in time (ICCutIn) and the ice maker cut out (ICCutOut) times are set. Then in step 738, the threshold (Threshold) is set to the ice maker set point (ICSetpoint). Next, in step 740, a determination is made as to whether the ice maker cooling state (ICCooling) is set. If not, then in step 746, a determination is made as to whether the freezer cooling state (FZCooling) is set. If not, then in step 743, a determination is made as to whether the synchronize ice maker with freezer state (sync_ic_with_fz) is set. If it is, then in step 744, the threshold (Threshold) is set to the sum of the Threshold and the ice maker cut-in adjustment value (IC_CI_ADJ). In step 748, the threshold (Threshold) is set to be the sum of the threshold (Threshold) and the ice maker cut in (ICCutIn). Next in step 752, the upper bound for the threshold is tested and if the bound is exceeded, in step 756, the threshold is set to be the upper bound. Next in step 754, a determination is made as to whether the ice maker control (ICControl) is greater or equal to the threshold. If it is, then in step 762, the ice maker cooling state is set to true.

Returning to step 740, if the ice maker cooling state is true, then in step 750, the threshold is set to the difference of the threshold and the ice maker cutout. Then in step 758, the ice maker cooling state is set to be false.

In step 764 a determination is made as to whether the ice maker was previously in a cooling state. If not, then in step 766 a determination is made as to whether the ice maker cooling state is true. If not, then the first cut-out time, CO(1) is set to be the difference between the ice maker setpoint (ICSetpoint) and the ice maker control (ICControl). If it is, then in step 772, an update ice box cuts subroutine is executed. In step 770, the previous ice maker cooling stat (ICCoolPrev) is set to cooling (ICCooling).

Figure 45B:
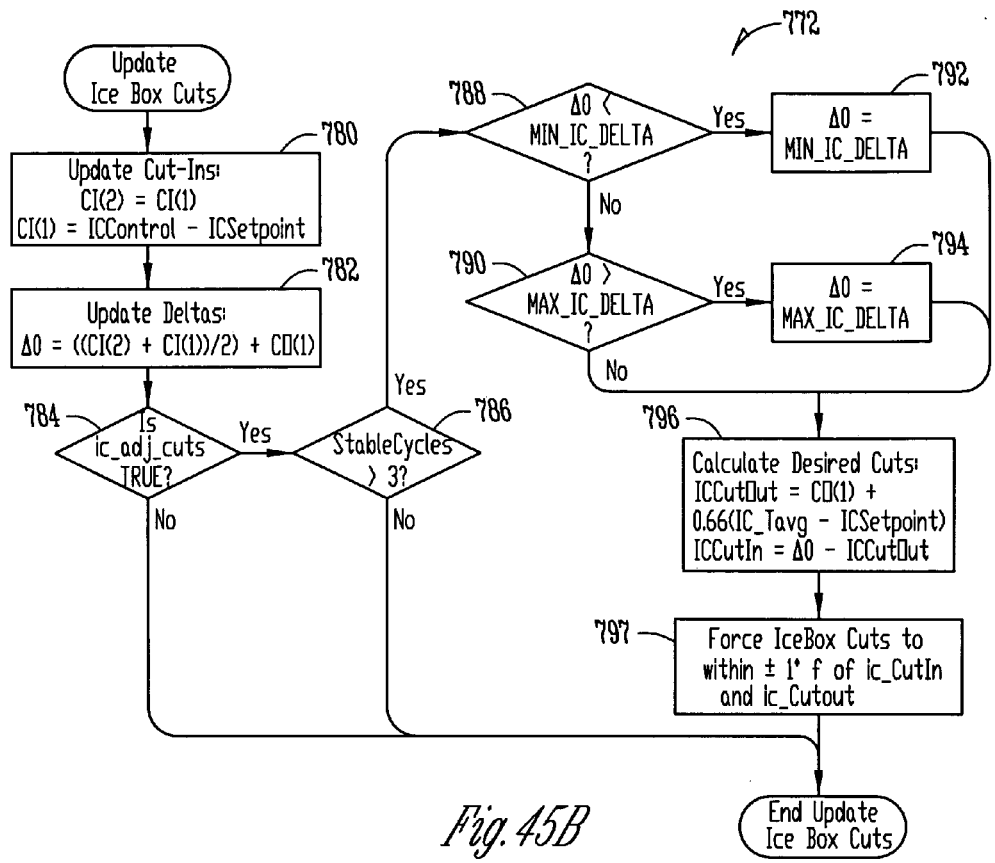
FIG. 45B illustrates one embodiment of a flow diagram for the update ice box cuts subroutine.

FIG. 45B illustrates the ice box cuts subroutine 772. In step 780, the cut-ins are updated. In step 782 the deltas are updated. In step 784, a determination is made as to whether the ice_adj_cuts state is true. If it is, then in step 786 a determination is made as to whether there have been at least three stable cycles. If so, in steps 788, 790, 792, and 794, the boundaries of $\Delta 0$ are tested. In step 796 the desired cuts are calculated.

Figure 45C:
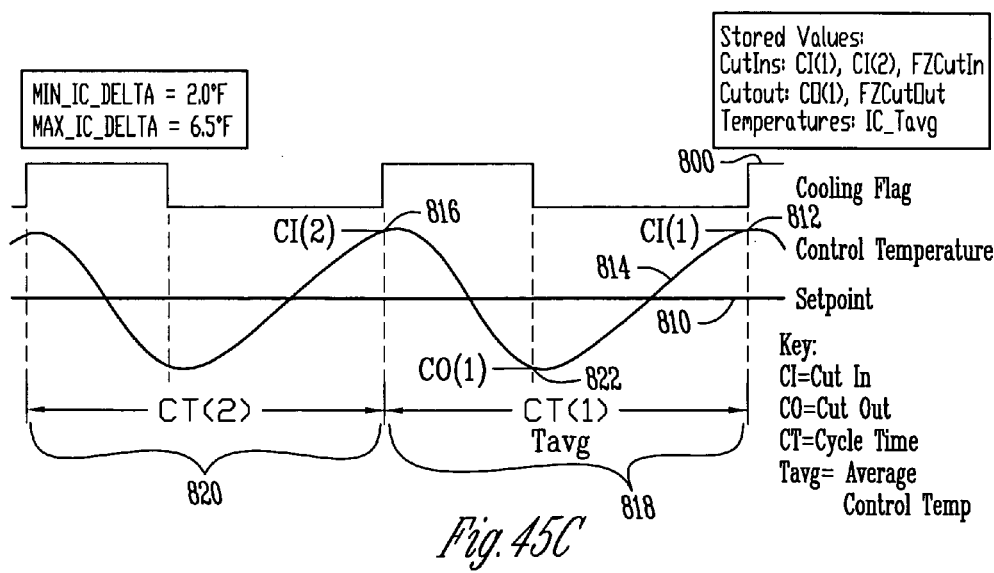
FIG. 45C illustrates relationships between the cooling flag, control, temperature, setpoint, cut-ins, cut-outs, and cycle time for the update ice box cuts subroutine.

FIG. 45C shows the relationship between the cooling state or flag 800, and the control temperature 814 over time. Note that at point 812, CI(1), the cooling state of flag 800 cuts in, at point 816, CI(2), the cooling state or flag also cuts in, at point 822, CO(1), the cooling state or flag cuts out. For cycle CT(1) 818 there is an associated average control temperature (Tavg) and for cycle CT(2) 820 there is an associated average control temperature (Tavg).

Figure 46A:
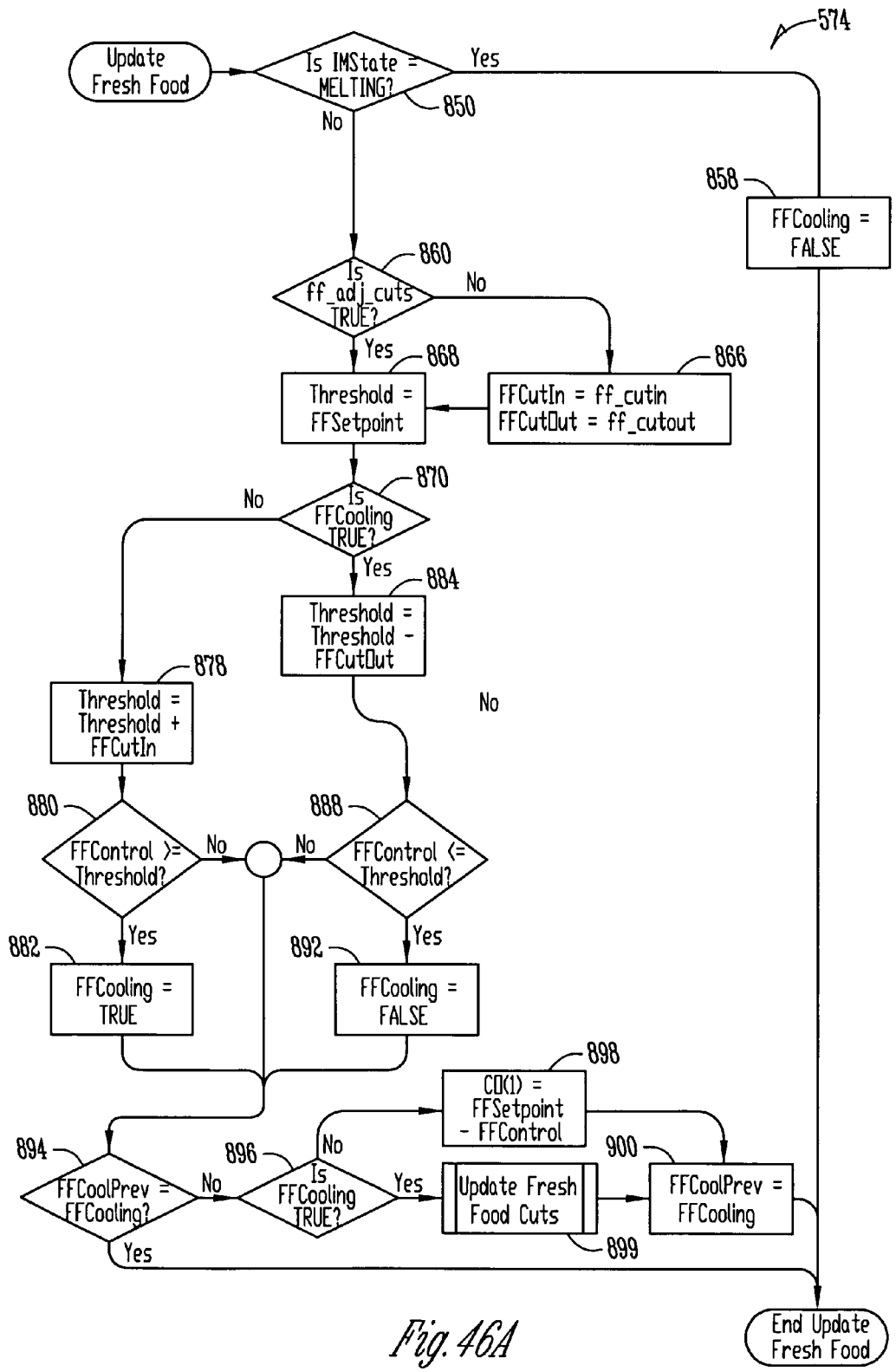
FIG. 46A illustrates one embodiment of a flow diagram for the update fresh food subroutine.

FIG. 46A illustrates one embodiment of a flow diagram for the update fresh food subroutine 574. In FIG. 46A, a determination is made as to whether the ice maker state (IMState) is melting. If it is, then in step 858, the fresh food compartment cooling state is set to false. If it is not, then in step 856 a determination is made as to whether the freezer cooling state (FZCooling) is true. If it is not then in step 858 the fresh food compartment cooling (FFCooling) state is set to false. If the freezer cooling (FZCooling) state is true, then in step 860, a determination is made as to whether the ff_adj_cuts state is true. If it is not, then in step 866 values for the fresh food cut-in and cut-out values are set accordingly. In step 868, the threshold (Threshold) is set to the fresh food compartment setpoint. In step 870, a determination is made as to whether the fresh food cooling (FFCooling) state is true. If not in the fresh food cooling (FFCooling) state, then in step 872, a determination is made as to whether the freezer cooling state is true. If it is then, the threshold is set in step 878. If it is not, then in step 874 a decision is made as to whether the threshold needs to be adjusted to compensate for the synchronization state. If it does not then, in steps 876 and 878 the threshold is adjusted accordingly. Then in step 880 a determination is made as to whether the fresh food compartment temperature is greater than or equal to the threshold. If it is, then in step 882, the fresh food cooling state (FFCooling) is set to be true.

Returning to step 870, if the fresh food compartment cooling (FFCooling) state is true, then the threshold is modified in step 884. In step 886 a determination is made as to whether the threshold is less than the difference of the fresh food compartment's minimum setpoint and half of the maximum fresh food compartment change. If it is, then in step 890, the threshold is set to the difference of the fresh food compartment's minimum setpoint and half of the maximum fresh food compartment change. Then in step 888 a determination is made as to whether the fresh food compartment control temperature is less than or equal to a threshold. If it is then the fresh food cooling state (FFCooling) is set to be false. In step 894, the fresh food cooling's previous state (FFCoolPrev) is compared to the present fresh good cooling (FFCooling). If they are not equal, then in step 896, a determination is made as to whether the fresh food cooling (FFCooling) state is true. If it is then, an Update Fresh Food Cuts subroutine 898 is run to update cut-in and cut-out temperatures. If it is not then the cutout temperature, CO(1), is set to be the difference between the fresh food setpoint (FFSetpoint) and the fresh food control setting (FF- Control). Then in step 900 the previous fresh food cooling state (FFCoolPrev) is updated to the current fresh food cooling state.

Figure 46B:
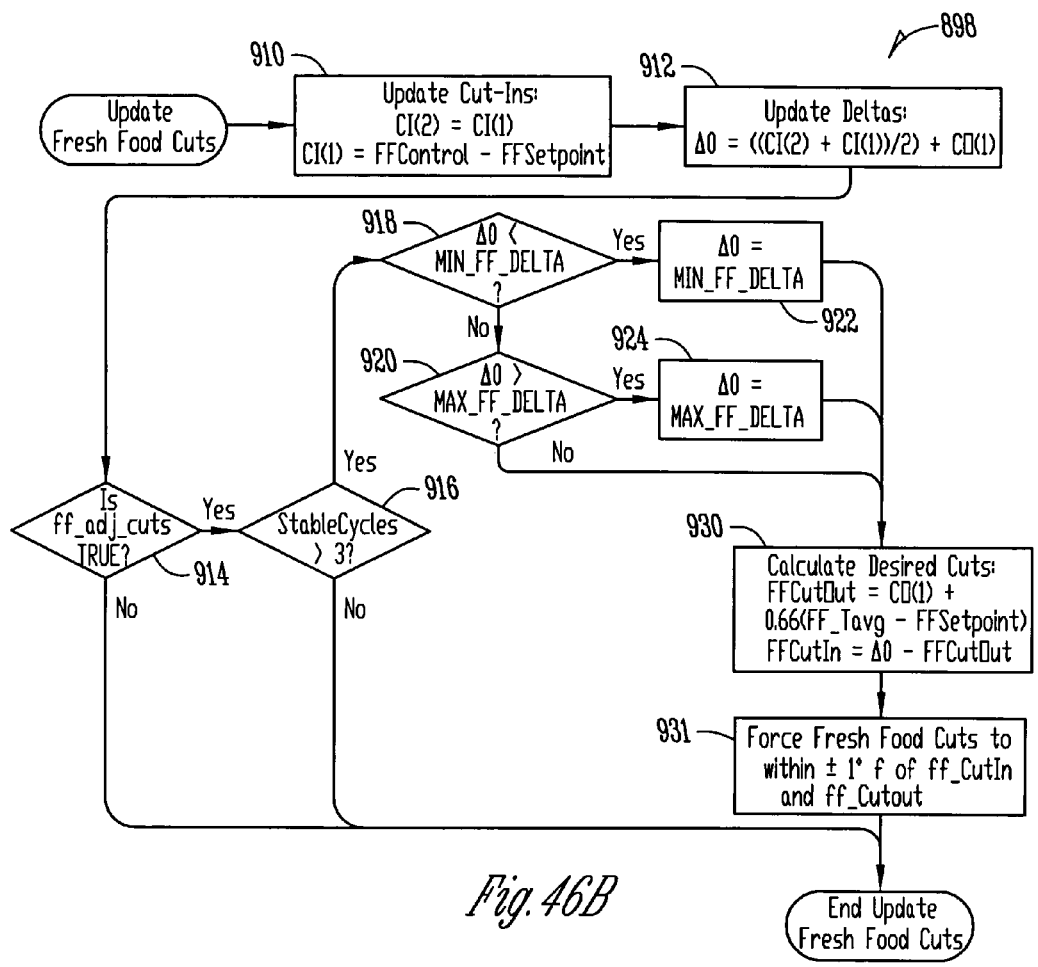
FIG. 46B illustrates one embodiment of a flow diagram for the update fresh food cuts subroutine.

FIG. 46B illustrates one embodiment of a flow diagram for the update fresh food cuts subroutine 898. In step 910 the cut-in temperatures are updated. In step 912, the deltas are updated. In step 914, a determination is made as to whether the fresh food compartment cut-in and cut-out temperatures need adjustment. If they do, in step 916 a determination is made as to whether there has been more than three consecutive stable cycles. If there has, then in steps 918, 920, 922, and 924, the delta is recalculated. In step 930 the cut-in and cut-out temperatures for the fresh food compartment are adjusted accordingly.

Figure 46C:
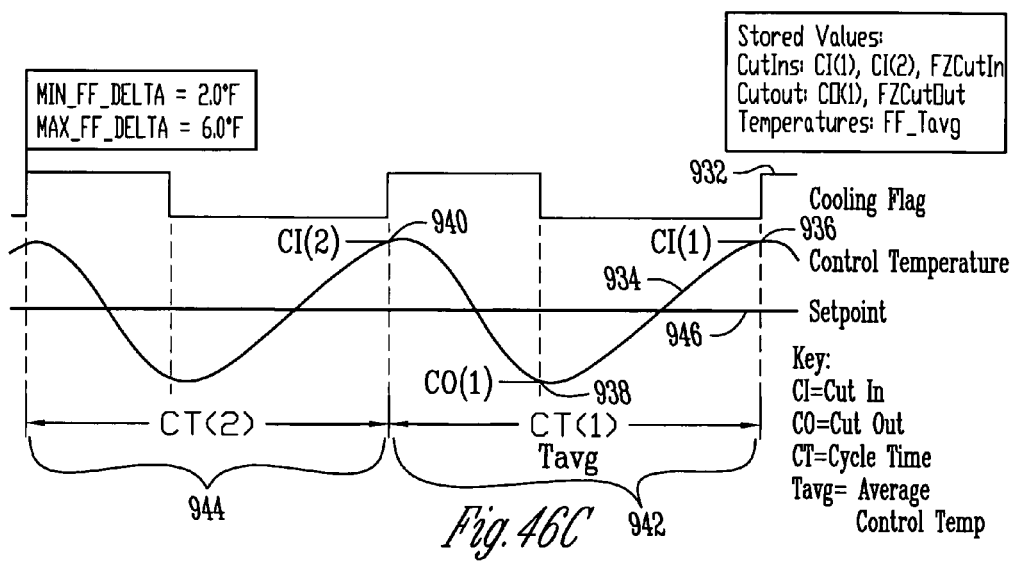
FIG. 46C illustrates relationships between the cooling flag, control, temperature, setpoint, cut-ins, cut-outs, and cycle time for the update fresh food cuts subroutine.

FIG. 46C illustrates relationships between the cooling flag, control, temperature, setpoint, cut-ins, cut-outs, and cycle time for the update fresh food cuts subroutine. FIG. 46C shows the relationship between the cooling state or flag 932, and the control temperature 934 over time. Note that at point 936, CI(1), the cooling state of flag 932 cuts in, at point 940, CI(2), the cooling state or flag also cuts in, at point 938, CO(1), the cooling state or flag cuts out. For cycle CT(1) 942 there is an associated average control temperature (Tavg) and for cycle CT(2) 944 there is an associated average control temperature (Tavg).

Figure 47:
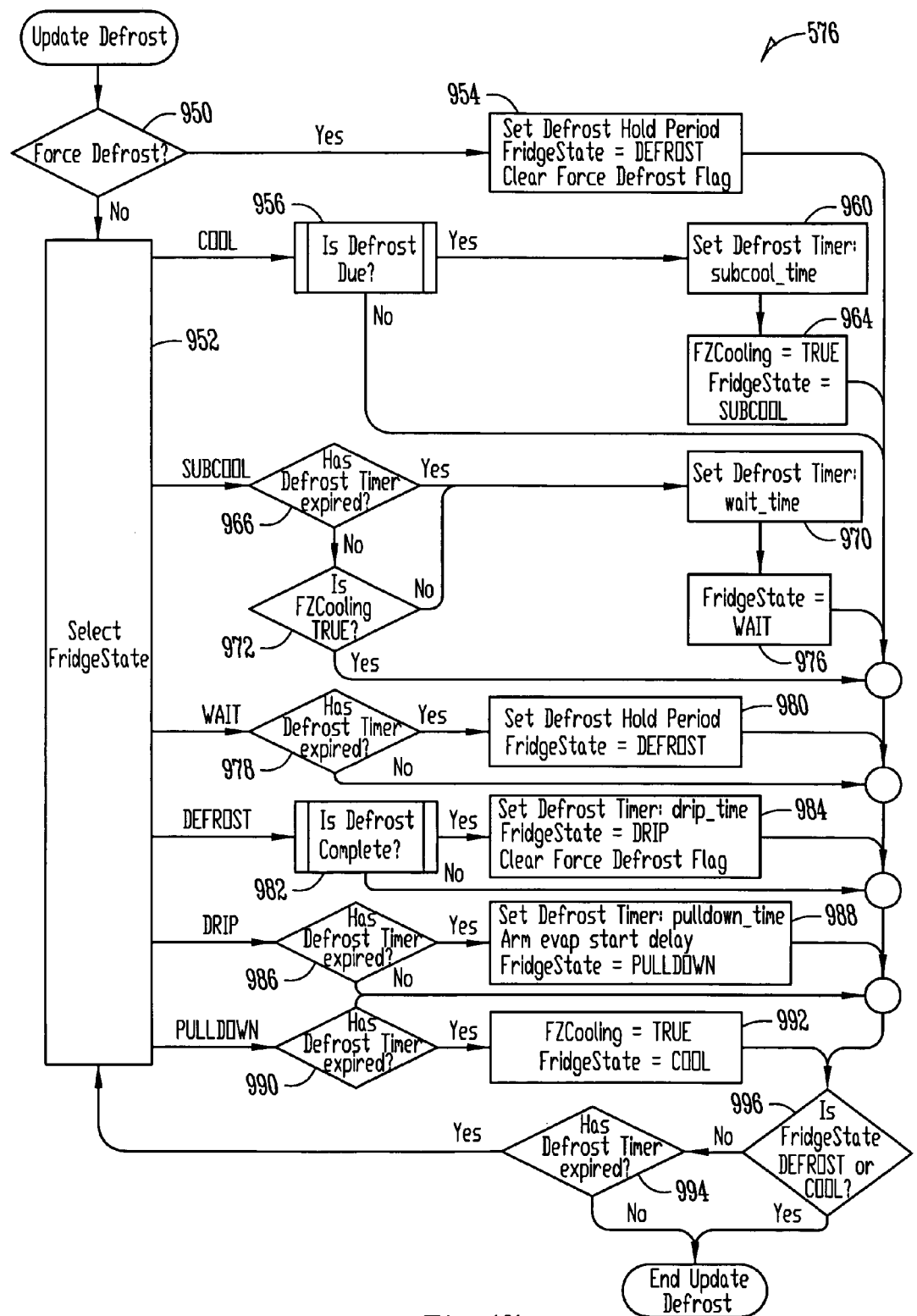
FIG. 47 illustrates one embodiment of a flow diagram for the update defrost subroutine.

FIG. 47 illustrates one embodiment of a flow diagram for the update defrost subroutine 576. In step 950 a determination is made as to whether to force a defrost. If a defrost is not forced, then in step 952 the refrigerator state is selected. If a defrost is forced, then in step 984 the defrost hold period is set, the refrigerator state is set to defrost and a flag for forcing a defrost is cleared.

Returning to step 952, the refrigerator state can be COOL, SUBCOOL, WAIT, DEFROST, DRIP, or PULLDOWN. If the refrigerator state is cool, then in step 956 a determination is made as to whether defrost is due. If it is, then in step 960 the defrost timer is set and in step 965, the freezer cooling (FZCooling) state is set to true and the refrigerator state is set to SUBCOOL.

Returning to step 952, if the refrigerator is in the subcool state, then in step 966 a determination is made as to whether the defrost timer has expired. If it has, then in step 970, the defrost timer is set and in step 976 the refrigerator state (FridgeState) is set to WAIT. If in step 966 the defrost timer has not expired, then in step 972 a determination is made as to whether the freezer is in the cooling state. If it is not, then in step 970 the defrost timer is set and in step 976 the refrigerator state (FridgeState) is set to WAIT.

Returning to step 952, if the refrigerator state (FridgeState) is WAIT, then in step 978 a determination is made as to whether the defrost timer has expired. If it has, then in step 980 the defrost hold period is set and the refrigerator state is set to DEFROST.

Returning to step 952, if the refrigerator state (FridgeState) is DEFROST, then in step 982, a determination is made as to whether the defrost is complete. If it is then in step 984, the defrost timer is set for time associated with dripping (drip_time), the refrigerator state (FridgeState) is set to DRIP and the flag associated with forcing defrost is cleared.

Returning to step 952, if the refrigerator state (FridgeState) is DRIP, then in step 986, a determination is made as to whether the defrost timer has expired. If it has, then in step 988, the defrost timer is set and the refrigerator state is set to PULLDOWN.

Returning to step 980, if the state is PULLDOWN, a determination is made as to whether or not the defrost timer has expired. If it has then in step 992, the freezer cooling state (FZCooling) is set to true and the refrigerator state (FridgeState) is set to COOL.

In step 996, a determination is made as to whether the refrigerator is in a DEFROST or COOL state. If it is, then the subroutine ends. If it is not, then in step 994 a determination is made as to whether the defrost timer has expired. If it has then the process returns to step 952. If the defrost timer has not expired then the subroutine ends.

Figure 48:
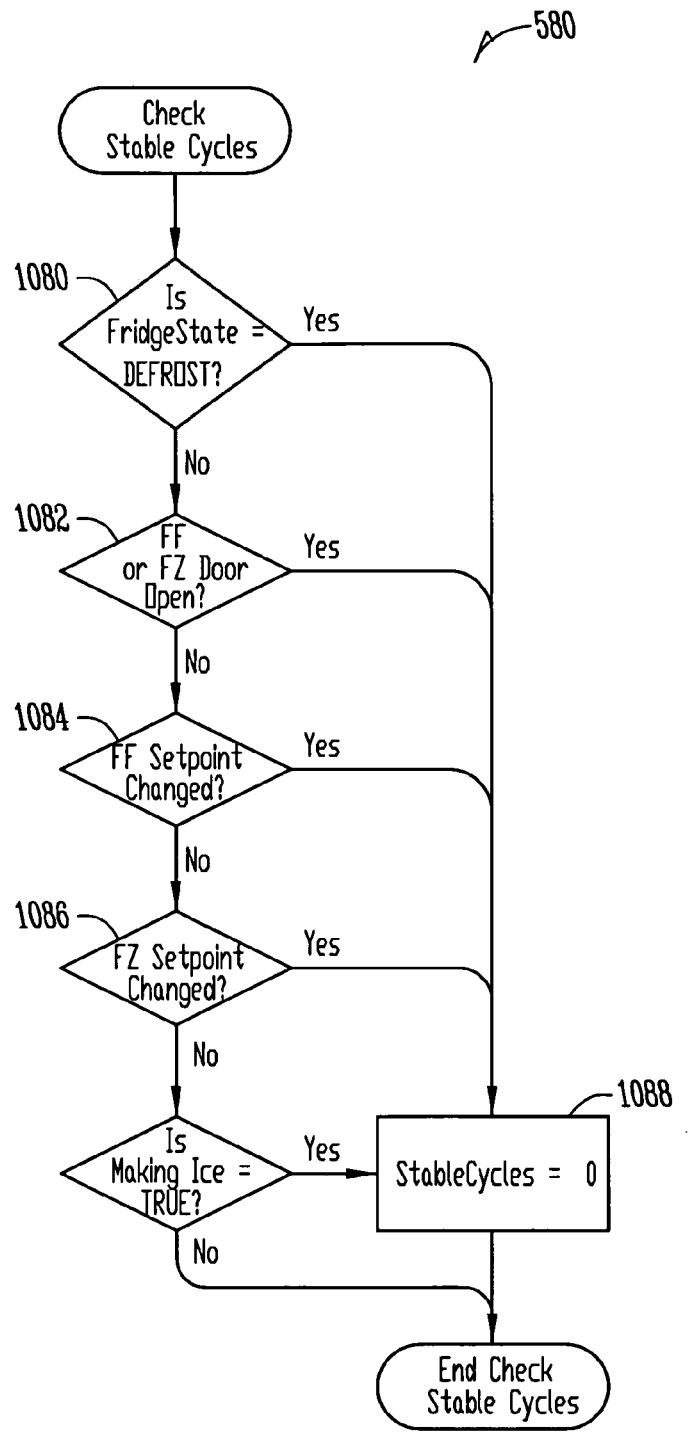
FIG. 48 illustrates one embodiment of a flow diagram for the check stable cycles subroutine.

FIG. 48 illustrates one embodiment of a flow diagram for the check stable cycles subroutine 580. The number of stable cycles is reset in step 1088 if in step 1080 the refrigerator is in the defrost state, in step 1082 the fresh food or freezer doors are open, in step 1084 the fresh food setpoint has changed, or in step 1086 the freezer setpoint has changed.

Figure 49:
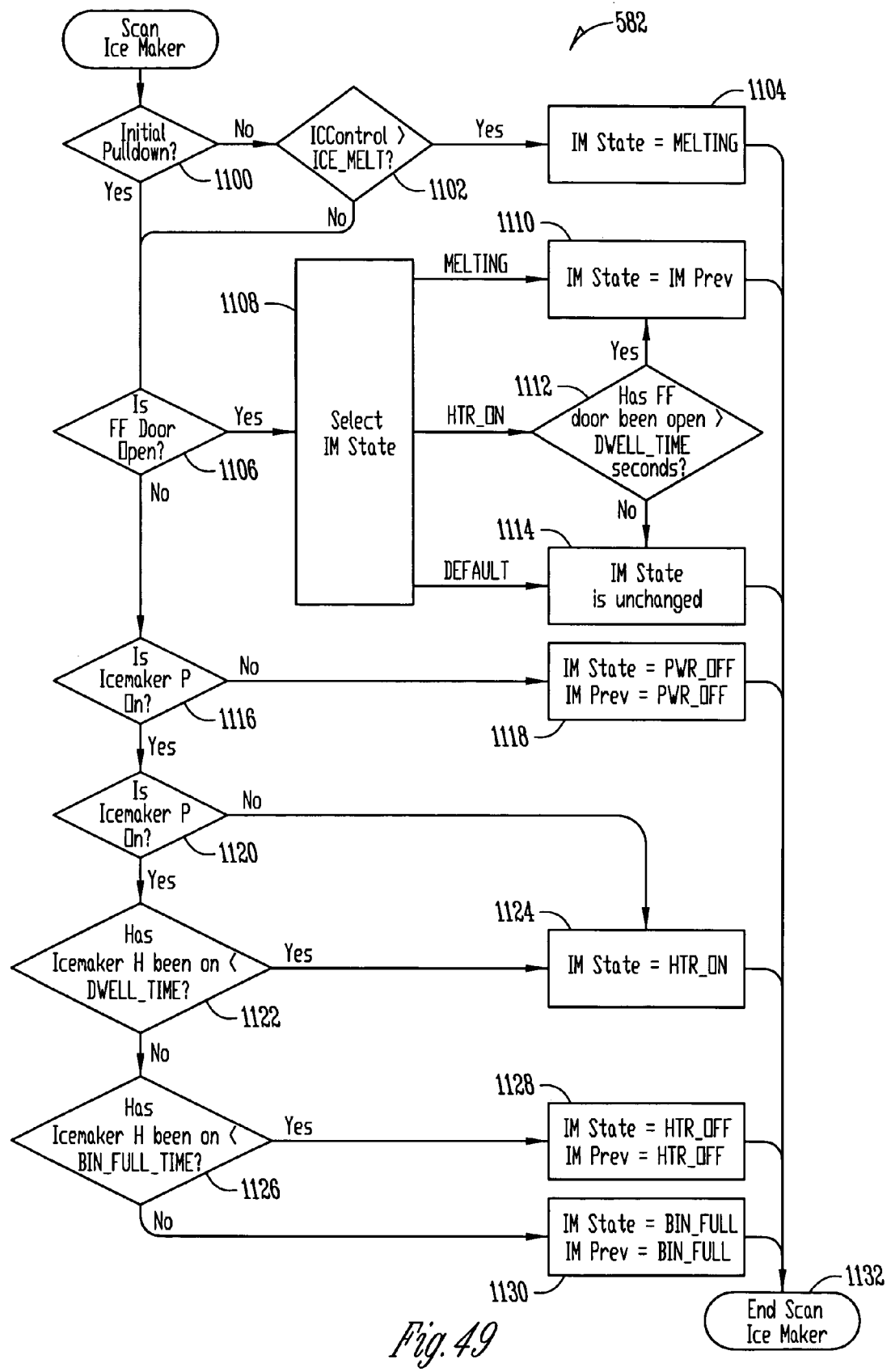
FIG. 49 illustrates one embodiment of a flow diagram for the scan ice maker subroutine.

FIG. 49 illustrates one embodiment of a flow diagram for the scan ice maker subroutine 582. This subroutine scans the ice maker to check for various conditions that may affect control functions and sets states associated with the ice maker appropriately. In step 1100 a determination is made as to whether the ice maker is in initial pulldown. If it is not, then in step 1102 a determination is made as to whether the ice maker control is above the melting temperature of ice. If it is then in state 1104, the ice maker state is set to MELTING. If not, then in step 1106 a determination is made as to whether the fresh food compartment door is open. If it is, then in step 1108 the ice maker state is selected. If the ice maker state is MELTING, then in step 1110 the ice maker state is set to the previous ice maker state. If the ice maker state is set to HTR_ON then in step 1112 a determination is made as to whether the fresh food compartment door has been open for longer than a set dwell time. If it has, then in step 1110 the ice maker state is set to the previous ice maker state. If has not then in step 1114 the ice maker state remains unchanged. Similarly if the ice maker state is DEFAULT in step 1108 then the ice maker state remains unchanged in step 1114.

In step 1116 a determination is made as to whether the ice maker power is on. If not, then in step 1118 the ice maker state and the ice maker's previous state are set accordingly to indicate that the power is off. In step 1120 a determination is made as to whether the ice maker's heater is on. If it is no then in step 1124 the ice maker's state is set to indicate that the heater is on. In step 1122 a determination is made as to whether the icemaker has been on less than a set dwell time. If it has, then in step 1124 the ice maker's state is set to indicate that the heater is on.

In step 1126 a determination is made has to whether the ice maker's heater has been on less than the amount of time associated with a full bin (such as 120 minutes). If it has then in step 1128 the ice maker's current state and previous state are set to indicate that the heater is off. If not, then in step 1130 the ice maker's current state and previous state are set to indicate that the bin is full.

Figure 50:
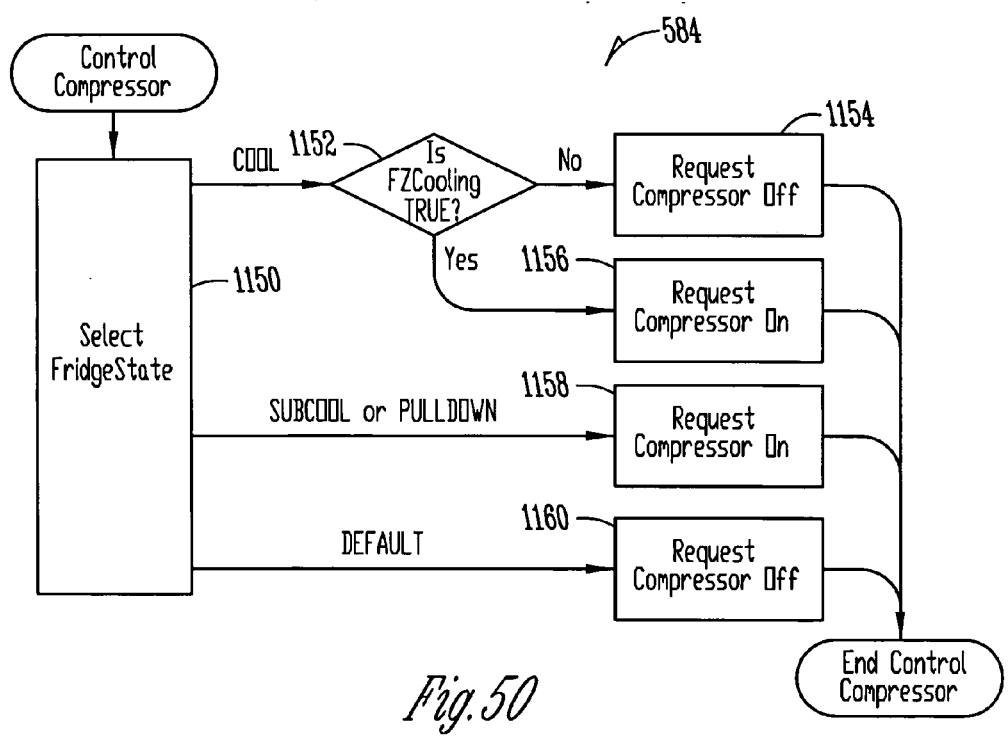
FIG. 50 illustrates one embodiment of a flow diagram for the control compressor subroutine.

FIG. 50 illustrates one embodiment of a flow diagram for the control compressor subroutine 584. In step 1150 the refrigerator's state (FridgeState) is examined. If the refrigerator is in the COOL state, then in step 1152 a determination is made as to whether the freezer cooling state is true. If it is not, then in step 1154 a request is made to turn the compressor off. If it is, then a request is made in step 1156 to request that the compressor be on. If the state is SUBCOOL or PULLDOWN, then in step 1158 a request is made to turn the compressor on. If the state is DEFAULT, then in step 1160 a request is made to turn the compressor off.

Figure 51:
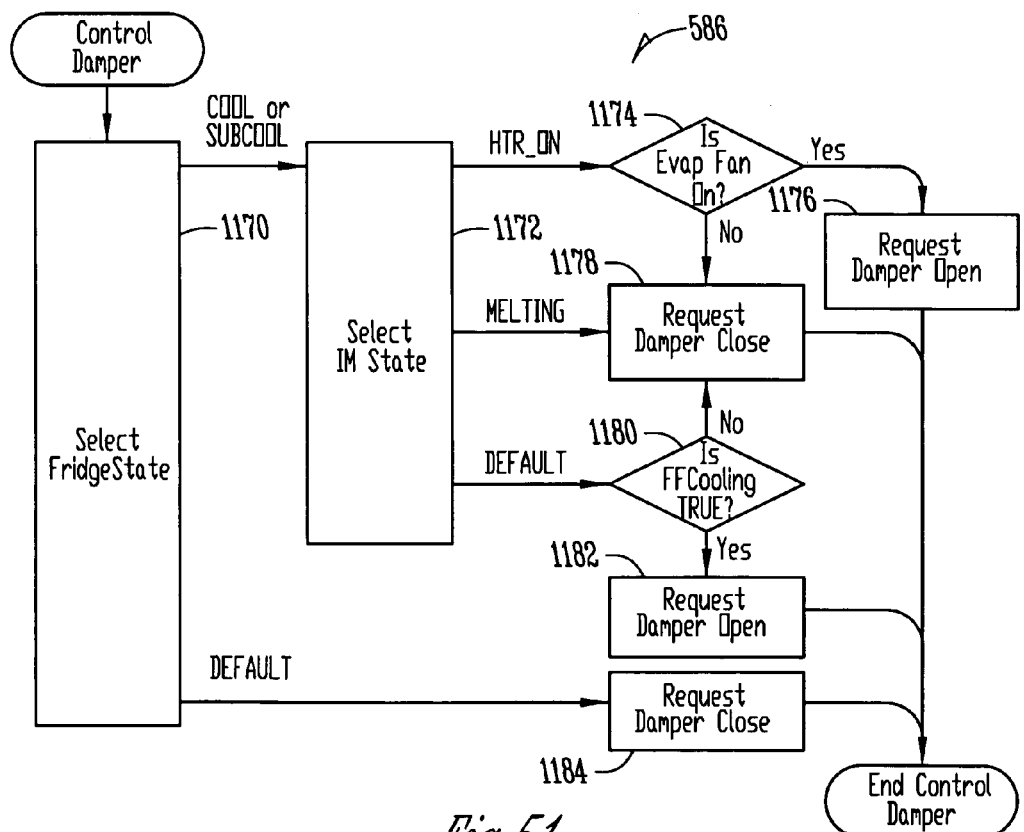
FIG. 51 illustrates one embodiment of a flow diagram for the control damper subroutine.

FIG. 51 illustrates one embodiment of a flow diagram for the control damper subroutine 586. In step 1170 the refrigerator state is selected. If the refrigerator state is COOL or SUBCOOL then in step 1172 the ice maker state is selected. IF the ice maker state is HTR_ON then in step 1174 a determination is made as to whether the evaporator fan is on. If it is then in step 1174 a request is made for the damper to be open. If not, then in step 1178 a request is made for the damper to be closed. If in step 1172 the icemaker state is MELTING<then in step 1178 a request is made for the damper to be closed. If the ice maker is in a different state (DEFAULT) then in step 1180 a determination is made as to whether the fresh food compartment is cooling. If it is not, then in step 1178 a request is made for the damper to be closed. If it is, then in step 1182 a request is made for the damper to be open. Returning to step 1170, if the refrigerator is in a DEFAULT state, then in step 1184 a request is made to close the damper.

Figure 52:
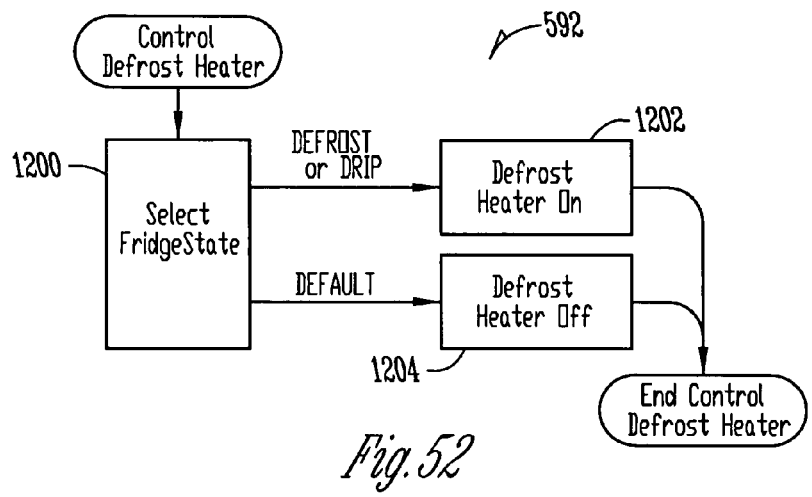
FIG. 52 illustrates one embodiment of a flow diagram for the control defrost heater subroutine.

FIG. 52 illustrates one embodiment of a flow diagram for the control defrost heater subroutine 592. In step 1200 the refrigerator state is selected. If the refrigerator state is DEFROST or DRIP, then in step 1202 the defrost heater is turned on. If the refrigerator state is a different or DEFAULT state then in step 1204 the defrost heater is turned off.

Figure 53:
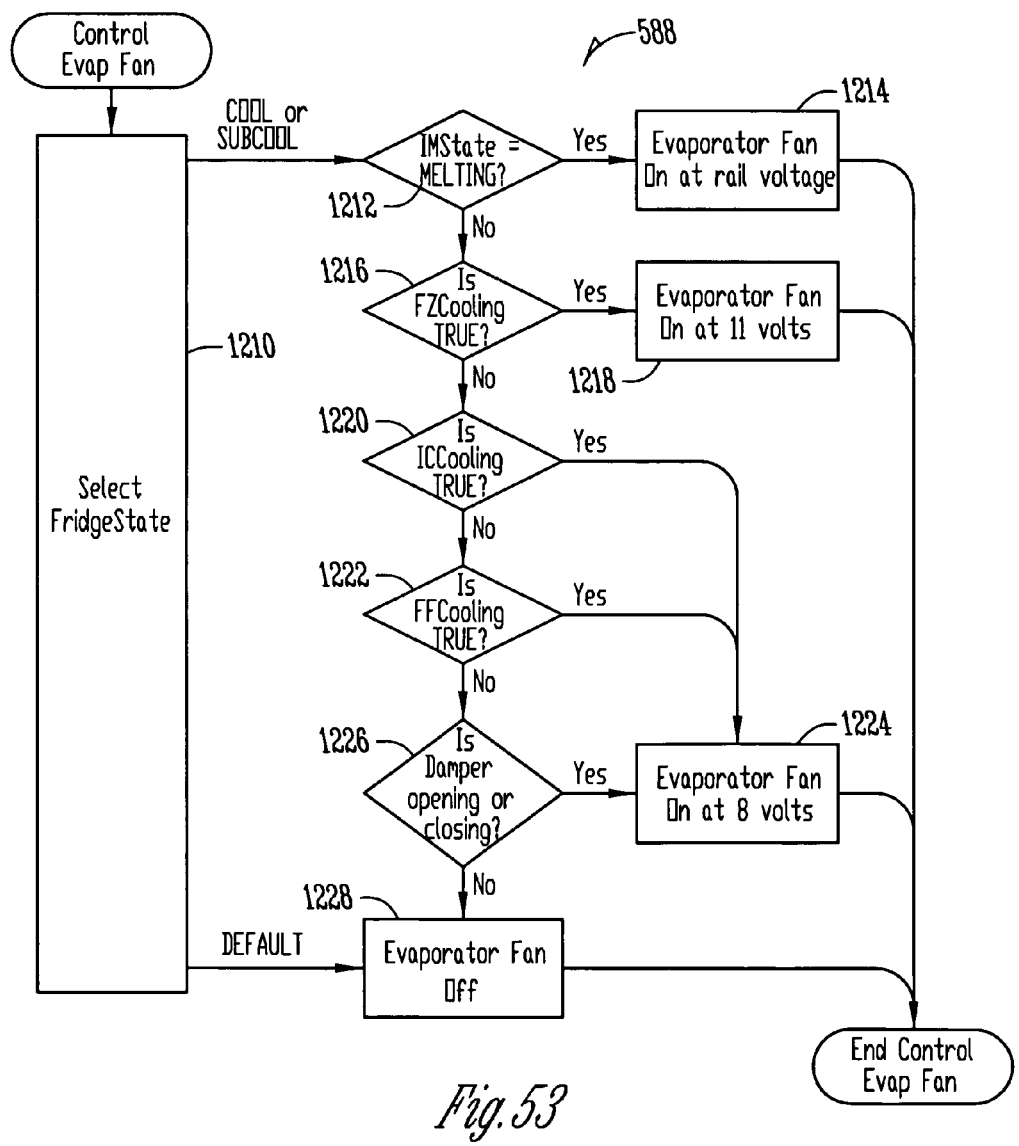
FIG. 53 illustrates one embodiment of a flow diagram for the control evaporator fan subroutine.

FIG. 53 illustrates one embodiment of a flow diagram for the control evaporator fan subroutine 588. In step 1210, the refrigerator state (FridgeState) is selected. If the state is COOL or SUBCOOL then in step 1212 a determination is made as to whether the ice maker is in the melting state (MELTING). If it is, then in step 1214, the evaporator fan is turned full-on at the rail voltage. If not, then in step 1216, a determination is made as to whether the freezer is in a cooling (FZCooling) state. If it is, then in step 1218, the evaporator fan is turned on at less than the rail voltage. If not, then in step 1220, a determination is made as to whether the ice compartment is cooling (ICCooling).

The evaporator fan motor speed is adjusted based upon the state of the ice making compartment, the freezer compartment and the fresh food compartment as shown in FIG. 53. The first step is to check the refrigerator state, if the state is cool or subcool then if the ice making compartment is above a predetermined temperature (defined as MELTING in step 1212) the fan motor is energized at the highest voltage to produce the maximum air flow. If the ice making compartment is not above the MELTING temperature, then the state of the freezer compartment is evaluated. If the freezer compartment requires cooling, the fan is energized at a high speed to provide the air flow required to adequately cool the freezer compartment, if the freezer does not require cooling, then the fresh food compartment and the ice making compartment are evaluated; if the fresh food requires cooling or if the ice making compartment requires cooling then the fan is energized at a lower voltage to maintain a continuous flow of air through the evaporator compartment without over cooling the freezer compartment. If the air damper is opening or closing then the fan is energized at the lower voltage. If none of these conditions are true, the fan is turned off.

Figure 54:
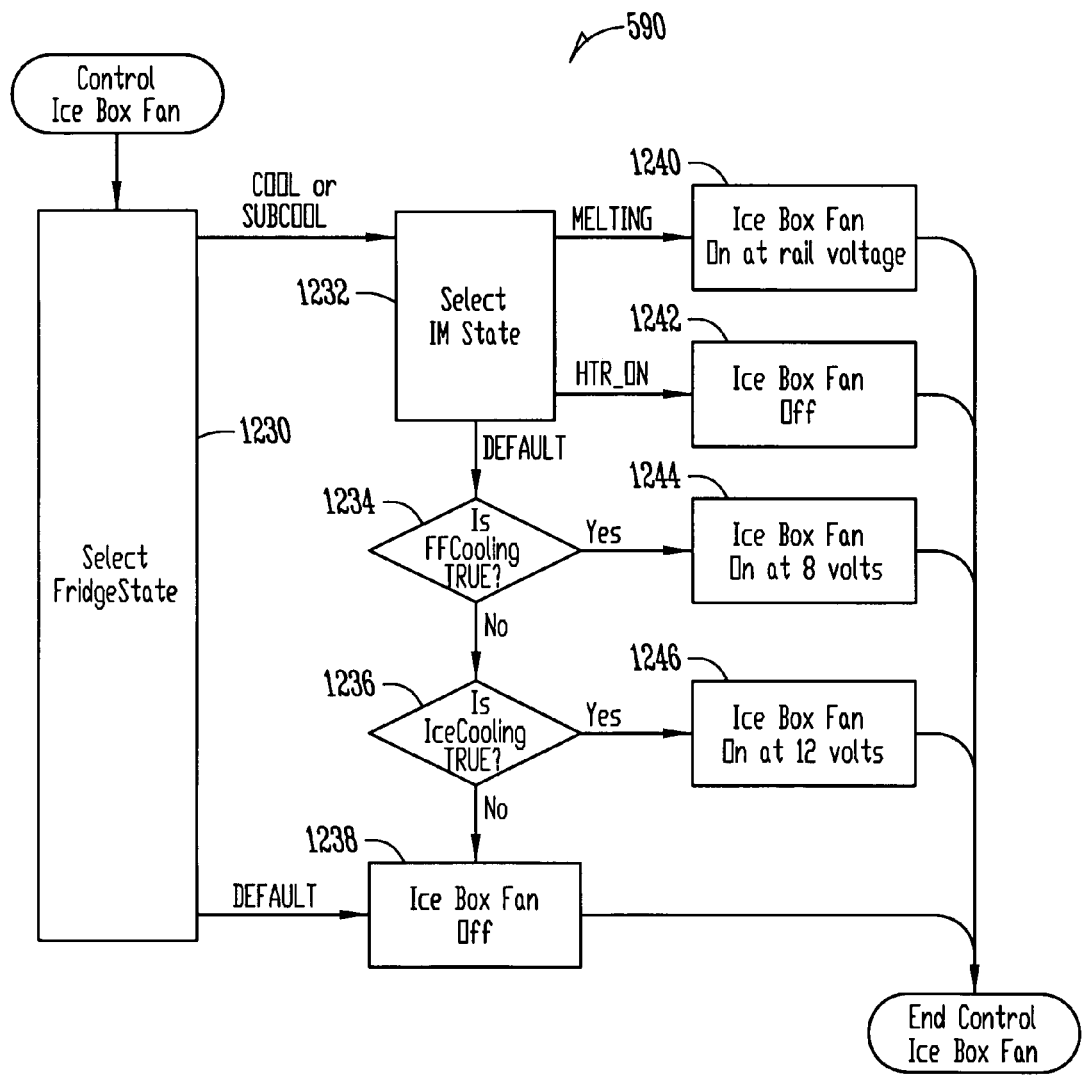
FIG. 54 illustrates one embodiment of a flow diagram for the control ice box fan subroutine.

FIG. 54 illustrates one embodiment of a flow diagram for the control ice box fan subroutine 590. In step 1230, a refrigerator state (FridgeState) is determined. If the refrigerator state is COOL or SUBCOOL, then in step 1232, the ice maker state is selected. If the ice maker state is MELTING, then the ice box fan is turned full-on in step 1240 such as by applying the rail voltages to the ice box fan. If the ice maker state indicates that the heater is on (HTR_ON), then the ice box fan is turned of in step 1242. If the ice maker state is in a different or DEFAULT state, then in step 1234 a determination is made as to whether the fresh food compartment is in a cooling (FFCooling) state. If it is, then in step 1244 the ice box fan is turned at less than full voltage to conserve energy. If not, then in step 1236 a determination is made as to whether the ice compartment is in a cooling (IceCooling) state. If it is in then in step 1246, the icebox fan is turned on at a higher voltage than in step 1244. In step 1238, if neither the fresh good compartment is cooling or the ice maker compartment is cooling, the ice box fan is turned off. Thus the ice box fan is controlled in an energy efficient manner.

Figure 55:
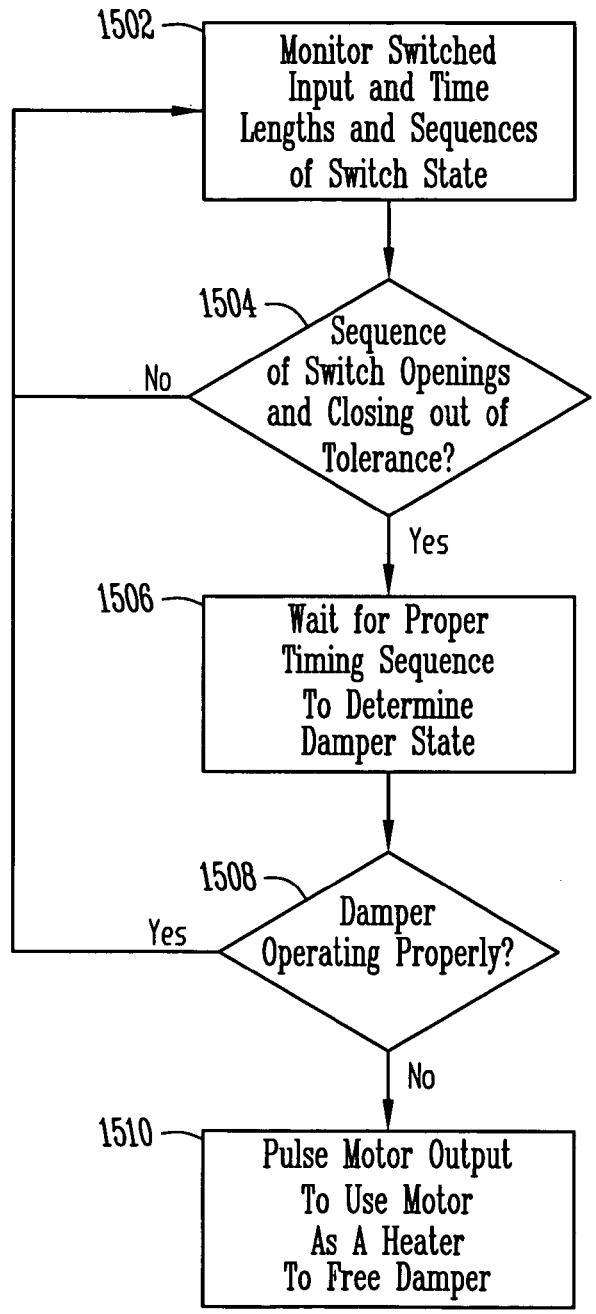
FIG. 55 illustrates one embodiment of a methodology for damper recovery.

Another aspect of the control system relates to damper operation. Referring to FIG. 40A, the damper 518 is a switched input. As shown in FIG. 55, one methodology provides for monitoring the switched input and timing the lengths and sequences of the switch state in step 1502. In step 1504 a determination is made as to whether the sequence of switch openings and closings is out of tolerance. If they are, then step 1506 provides for waiting for proper timing sequences to determine damper state. In step 1508, a determination is made as to whether or not the damper is operating properly. If the damper is not operating properly because it is frozen in place, then in step 1510 the motor output associated with the damper is pulsed. This action uses the motor as a heater to free the damper.

The invention has been shown and described above with the preferred embodiments, and it is understood that many modifications, substitutions, and additions may be made which are within the intended spirit and scope of the invention.

What is claimed is:

1. A refrigerator, comprising:
   a refrigerator cabinet;
   a fresh food compartment disposed within the cabinet;
   a freezer compartment disposed within the cabinet;
   an ice compartment disposed within the cabinet;
   an electronic control system associated with the refrigerator and adapted to monitor and control temperature in the fresh food compartment, the freezer compartment and the ice compartment;
   an ice compartment temperature sensor associated with the ice compartment and electrically connected to the electronic control system;
   a fresh food compartment temperature sensor associated with the fresh food compartment and electrically connected to the electronic control system;
   a freezer compartment temperature sensor associated with the freezer compartment and electrically connected to the electronic control system;
   an ambient temperature sensor electrically connected to the electronic control system; and
   wherein the electronic control system includes a microprocessor adapted for calculating a desired performance temperature for each of the fresh food compartment, the freezer compartment, and the ice compartment using a correlation.

2. The refrigerator of claim 1 wherein the ice compartment is positioned remotely from the freezer compartment.

3. The refrigerator of claim 1 further comprising two side-by-side fresh food compartment doors for providing access to the fresh food compartment.

4. The refrigerator of claim 3 further comprising a freezer compartment door for providing access to the freezer compartment, the freezer compartment door being positioned below the two side-by-side fresh food compartment doors.

5. The refrigerator of claim 4 further comprising a dispenser associated with one of the two side-by-side fresh food compartment doors, the dispenser adapted for dispensing ice from the ice compartment.

6. The refrigerator of claim 5 wherein the control system is adapted to disable the dispenser upon opening of the one of the fresh food compartment door associated with the dispenser.

7. The refrigerator of claim 1 wherein said correlation uses weighting at least partially based on prior testing to thereby improve temperature stability and food preservation.

8. The refrigerator of claim 1 further comprising a variable speed evaporator fan, and a variable speed evaporator fan output from the control system, the control system adapted for setting the variable speed evaporator fan to a plurality of rates.

9. The refrigerator of claim 8 wherein the control system is adapted to set the variable speed evaporator fan at a first rate when the freezer is determined to require cooling and a second rate when the freezer is determined not to require cooling and the fresh food compartment is determined to require cooling, the second rate being lower than the first rate.

10. The refrigerator of claim 8 wherein the control system is adapted to set the variable speed evaporator fan at a first rate when the freezer is determined to require cooling and a second rate when the freezer is determined not to require cooling and the ice compartment is determined to require cooling, the second rate being lower than the first rate.

11. The refrigerator of claim 1 further comprising a direct current (DC) mullion heater electrically connected to the control system for selectively providing heat to increase overall energy efficiency of the refrigerator.

12. The refrigerator of claim 1 further comprising a cavity heater associated with a door of the refrigerator, the cavity heater electrically connected to the control system for selectively providing heat to increase overall energy efficiency of the refrigerator.

13. The refrigerator of claim 1 further comprising a fresh food compartment light associated with the fresh food compartment and wherein the control system is adapted to turn the fresh food compartment light off after a set time period during which the fresh food compartment door is open.

14. The refrigerator of claim 1 further comprising a freezer compartment light associated with the freezer compartment and wherein the control system is adapted to turn the freezer compartment light off after a set time period during which the freezer compartment door is open.

15. The refrigerator of claim 1 wherein the control system is adapted to disable the ice maker and a dispenser on the fresh food compartment door when the fresh food compartment door opens.

16. The refrigerator of claim 1 wherein the correlation is arrived at by prior testing in a plurality of environments and usage conditions.

17. The refrigerator of claim 1 further comprising a damper for controlling air flow and wherein the electronic control system is adapted for monitoring damper state and if the damper state indicates the damper is not properly operating, pulsing a motor output associated with the damper to heat and thereby free the damper.

18. The refrigerator of claim 1 wherein the control system is further adapted to cycle on and off a cooling system of the refrigerator based on a cut-in temperature and a cut-out temperature associated each of the fresh food compartment, the freezer compartment, and the ice compartment and wherein the control system is further adapted to adjust the delta between cut-in temperature and the cut-out temperature during operation of the refrigerator to thereby improve temperature performance and energy efficiency of the refrigerator.

19. The refrigerator of claim 1 wherein the electronic control system being further adapted to synchronize cooling of the ice compartment, fresh food compartment, and freezer compartment to thereby provide consistent power consumption and eliminate non-uniform temperature patterns.

20. A refrigerator, comprising:
a refrigerator cabinet;
a fresh food compartment disposed within the cabinet;
a freezer compartment disposed within the cabinet;
an ice compartment disposed within the cabinet;
an electronic control system associated with the refrigerator and adapted to monitor and control temperature in the fresh food compartment, the freezer compartment and the ice compartment;
an ice compartment temperature sensor associated with the ice compartment and electrically connected to the electronic control system;
a fresh food compartment temperature sensor associated with the fresh food compartment and electrically connected to the electronic control system;
a freezer compartment temperature sensor associated with the freezer compartment and electrically connected to the electronic control system; and
an ambient temperature sensor electrically connected to the electronic control system.

21. A refrigerator, comprising:
a refrigerator cabinet;
a fresh food compartment disposed within the cabinet;
a freezer compartment disposed within the cabinet;
an ice compartment disposed within the cabinet;
an electronic control system associated with the refrigerator and adapted to monitor and control temperature in the fresh food compartment, the freezer compartment and the ice compartment;
a variable speed evaporator fan; and
a variable speed evaporator fan output from the control system; and
wherein the control system is adapted to set the van able speed evaporator fan at a first rate when the freezer is determined to require cooling and a second rate when the freezer is determined not to require cooling and the fresh food compartment is determined to require cooling, the second rate being lower than the first rate.

22. A refrigerator, comprising:
a refrigerator cabinet;
a fresh food compartment disposed within the cabinet;
a freezer compartment disposed within the cabinet;
an ice compartment disposed within the cabinet;
an electronic control system associated with the refrigerator and adapted to monitor and control temperature in the fresh food compartment, the freezer compartment and the ice compartment;
a variable speed evaporator fan; and
a variable speed evaporator fan output from the control system; and
wherein the control system is adapted to set the variable speed evaporator fan at a first rate when the freezer is determined to require cooling and a second rate when the freezer is determined not to require cooling and the ice compartment is determined to require cooling, the second rate being lower than the first rate.

23. A refrigerator, comprising:
a refrigerator cabinet;
a fresh food compartment disposed within the cabinet;
a freezer compartment disposed within the cabinet;
an ice compartment disposed within the cabinet;

an electronic control system associated with the refrigerator and adapted to monitor and control temperature in the fresh food compartment, the freezer compartment and the ice compartment;
a variable speed evaporator fan;
a variable speed evaporator fan output from the control system; and
a damper for controlling air flow, wherein the electronic control system is adapted for monitoring a damper state and if the damper state indicates the damper is not properly operating, pulsing a motor output associated with the damper to heat and thereby free the damper.

24. The refrigerator of claim 23 wherein the step of monitoring comprises monitoring lengths and sequence of a switch state associated with the damper.

25. The refrigerator of claim 24 wherein the step of monitoring further comprises determining if the sequence is outside of a tolerance level and waiting for the sequence to be within the tolerance level before determining the damper state.

26. A refrigerator, comprising:
a refrigerator cabinet;
a fresh food compartment disposed within the cabinet;
a freezer compartment disposed within the cabinet;
an ice compartment disposed within the cabinet;
an electronic control system associated with the refrigerator and adapted to monitor and control temperature in the fresh food compartment, the freezer compartment and the ice compartment; and
wherein the electronic control system is further adapted to cycle on and off a cooling system of the refrigerator based on a cut-in temperature and a cut-out temperature associated each of the fresh food compartment, the freezer compartment, and the ice compartment and wherein the electronic control system is further adapted to adjust the delta between cut-in temperature and the cut-out temperature during operation of the refrigerator to thereby improve temperature performance and energy efficiency of the refrigerator.

27. The refrigerator of claim 26 wherein the control system is further adapted to adjust the cut-in and cut-out temperature during operation to produce cycles where the observed average temperature of the previous on-off cycle is more equal to the desired set-point to thereby improve temperature performance.

28. A refrigerator, comprising:
a refrigerator cabinet;
a fresh food compartment disposed within the cabinet;
a freezer compartment disposed within the cabinet;
an ice compartment disposed within the cabinet;
an electronic control system associated with the refrigerator and adapted to monitor and control temperature in the fresh food compartment, the freezer compartment and the ice compartment;
an ice compartment temperature sensor associated with the ice compartment and electrically connected to the electronic control system;
a fresh food compartment temperature sensor associated with the fresh food compartment and electrically connected to the electronic control system; and
a freezer compartment temperature sensor associated with the freezer compartment and electrically connected to the electronic control system; and
wherein the electronic control system is further adapted to synchronize cooling of the ice compartment, fresh food compartment, and freezer compartment to thereby provide consistent power consumption and eliminate non-uniform temperature patterns.

\* \* \* \* \*

UNITED STATES PATENT AND TRADEMARK OFFICE
CERTIFICATE OF CORRECTION

PATENT NO.      : 7,591,141 B2                                    Page 1 of 1
APPLICATION NO. : 11/331941
DATED           : September 22, 2009
INVENTOR(S)     : Wetekamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Twenty-first Day of September, 2010

David J. Kappos
*Director of the United States Patent and Trademark Office*